(12) United States Patent
Beber et al.

(10) Patent No.: US 11,007,664 B2
(45) Date of Patent: *May 18, 2021

(54) FOOD PROCESSOR WITH ADJUSTABLE BLADE ASSEMBLY

(71) Applicant: WHIRLPOOL CORPORATION, Benton Harbor, MI (US)

(72) Inventors: Kevin James Beber, Granger, IN (US); Alex R. Oliveira, Lauro de Freitas (BR); Fernando R. Oliveira, Lauro de Freitas (BR); Eric Tauzer, Louisville, KY (US); Joao Paulo M. Goncalves, Midland, MI (US); David J. Gushwa, Mishawaka, IN (US); Yung Leong Hin, Tuen Mun (HK); Jeffrey Carl Loebig, New Territories (HK); Euan Skinner MacLeod, New Territories (HK); Qu Zhi Jie, Ji An (CN); Michael P. Conti, St. Joseph, MI (US); Thomas Allen Gillette, Stevensville, MI (US); Brent A. Rowland, St. Joseph, MI (US); Jeremy T. Wolters, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,959

(22) Filed: Sep. 11, 2019

(65) Prior Publication Data

US 2020/0001490 A1 Jan. 2, 2020

Related U.S. Application Data

(60) Continuation of application No. 15/370,434, filed on Dec. 6, 2016, now Pat. No. 10,449,685, which is a
(Continued)

(51) Int. Cl.
*B26D 7/26* (2006.01)
*A47J 43/07* (2006.01)
(Continued)

(52) U.S. Cl.
CPC .......... *B26D 7/2628* (2013.01); *A47J 43/046* (2013.01); *A47J 43/0722* (2013.01); *B26D 1/29* (2013.01); *B26D 7/01* (2013.01)

(58) Field of Classification Search
CPC ... A47J 43/0722; A47J 43/046; B26D 7/2628; B26D 7/01; B26D 1/29
(Continued)

(56) References Cited

U.S. PATENT DOCUMENTS

| 1,489,695 A | 4/1924 | Burns et al. |
| 2,189,199 A | 2/1940 | Criner |

(Continued)

FOREIGN PATENT DOCUMENTS

| CN | 1115128 C | 7/2003 |
| CN | 1575716 A | 2/2005 |

(Continued)

OTHER PUBLICATIONS

Wolfgang Puck Professional Series 12-Cup Food Processor Use and Care, Jul. 3, 2007, 46 pages.
(Continued)

*Primary Examiner* — Phuong T Nguyen
(74) *Attorney, Agent, or Firm* — Price Heneveld LLP

(57) ABSTRACT

A food processor includes a bowl with a removable lid. Food items are advanced into the bowl through a feed tube formed in the lid where they are cut by a blade assembly. A rotating disk is adjustable relative to the blade assembly to vary the thickness of the food items cut by the blade assembly.

21 Claims, 41 Drawing Sheets

Related U.S. Application Data continuation-in-part of application No. 14/220,203, filed on Mar. 20, 2014, now Pat. No. 10,105,864, which is a division of application No. 12/769,746, filed on Apr. 29, 2010, now Pat. No. 8,720,325, said application No. 15/370,434 is a continuation-in-part of application No. 15/000,712, filed on Jan. 19, 2016, now Pat. No. 10,582,808, which is a division of application No. 14/000,416, filed as application No. PCT/CN2011/001487 on Sep. 1, 2011, now Pat. No. 9,265,381, said application No. 15/370,434 is a continuation-in-part of application No. 14/000,413, filed as application No. PCT/CN2011/000311 on Feb. 25, 2011, now Pat. No. 9,655,474.

(51) Int. Cl.
*B26D 1/29* (2006.01)
*A47J 43/046* (2006.01)
*B26D 7/01* (2006.01)

(58) Field of Classification Search
USPC ........... 99/348, 537, 538; 241/92, 100, 277, 241/282.1, 282.2, 37.5, 278.1, 286
See application file for complete search history.

(56) References Cited

U.S. PATENT DOCUMENTS

| | | | |
|---|---|---|---|
| 2,480,717 A | 8/1949 | Dodegge | |
| 3,199,860 A | 8/1965 | Moberg | |
| 3,266,540 A | 8/1966 | Bradham | |
| 3,623,525 A | 11/1971 | Kieves | |
| 3,704,736 A | 12/1972 | Pratley | |
| 3,720,325 A | 3/1973 | Sitko | |
| 3,783,727 A | 1/1974 | Brignard et al. | |
| 3,784,118 A | 1/1974 | Hurwitz | |
| 3,931,900 A | 1/1976 | Tiby | |
| 4,190,208 A | 2/1980 | Schaeffer et al. | |
| 4,283,979 A | 8/1981 | Rakocy et al. | |
| 4,364,525 A | 12/1982 | McClean | |
| 4,369,680 A | 1/1983 | Williams | |
| 4,560,111 A | 12/1985 | Cavalli | |
| 4,570,519 A | 2/1986 | Motosko, II | |
| 4,624,166 A | 11/1986 | Kreth et al. | |
| 4,688,478 A | 8/1987 | Williams | |
| 4,706,896 A | 11/1987 | Moon-Kau | |
| 4,733,589 A | 3/1988 | Wolff | |
| 4,818,116 A | 4/1989 | Pardo | |
| 4,819,882 A | 4/1989 | Stottmann et al. | |
| 4,877,191 A | 10/1989 | Golob et al. | |
| 4,998,677 A | 3/1991 | Gallaher | |
| 5,009,510 A | 4/1991 | Pardo | |
| 5,037,033 A | 8/1991 | Slottmann et al. | |
| 5,046,252 A | 9/1991 | Ayuta et al. | |
| 5,197,681 A | 3/1993 | Liebermann | |
| 5,549,386 A | 8/1996 | Pardo et al. | |
| 5,577,430 A | 11/1996 | Gunderson et al. | |
| 6,254,019 B1 | 7/2001 | Galbreath | |
| 6,315,226 B1 | 11/2001 | Trick et al. | |
| 6,322,013 B1 | 11/2001 | Lima et al. | |
| 7,162,952 B1 | 1/2007 | Michaud | |
| 7,322,112 B2 | 1/2008 | Boemer | |
| 7,328,864 B2 | 5/2008 | Narai et al. | |
| 7,681,817 B2 | 3/2010 | Orent | |
| 7,694,615 B2 | 4/2010 | DiPietro | |
| D644,478 S | 9/2011 | Czach | |
| D644,480 S | 9/2011 | Czach et al. | |
| 8,833,683 B2 | 9/2014 | Beber et al. | |
| 8,905,342 B2 | 12/2014 | Gushwa | |
| 9,049,965 B2 | 6/2015 | Beber et al. | |
| 9,265,381 B2 | 2/2016 | Beber et al. | |
| 9,655,474 B2 | 5/2017 | Beber et al. | |
| 9,763,469 B2 | 9/2017 | Cheung et al. | |
| 10,105,864 B2 | 10/2018 | Goncalves et al. | |
| 2004/0011171 A1 | 1/2004 | Hamilton | |
| 2006/0075872 A1 | 4/2006 | Wangler | |
| 2006/0150791 A1 | 7/2006 | Chase et al. | |
| 2006/0163396 A1 | 7/2006 | Kennedy et al. | |
| 2007/0044621 A1 | 3/2007 | Rite et al. | |
| 2007/0051249 A1* | 3/2007 | Obersteiner | A47J 43/0722 99/348 |
| 2007/0158478 A1 | 7/2007 | Stager | |
| 2007/0209528 A1 | 9/2007 | Chang | |
| 2007/0261523 A1 | 11/2007 | Hussey et al. | |
| 2008/0115677 A1 | 5/2008 | Tseng et al. | |
| 2008/0156913 A1 | 7/2008 | Orent | |
| 2008/0163768 A1 | 7/2008 | Glucksman et al. | |
| 2009/0139383 A1 | 6/2009 | Tsai | |
| 2009/0158941 A1 | 6/2009 | Lee | |
| 2009/0301319 A1 | 12/2009 | Bigge et al. | |
| 2009/0314168 A1 | 12/2009 | Krasznai | |
| 2011/0139017 A1 | 6/2011 | Beber et al. | |
| 2011/0265664 A1 | 11/2011 | Goncalves et al. | |
| 2014/0014752 A1 | 1/2014 | Beber et al. | |
| 2016/0128517 A1 | 5/2016 | Beber et al. | |
| 2016/0163396 A1 | 6/2016 | Pan et al. | |
| 2018/0080592 A1 | 3/2018 | Plumptre et al. | |

FOREIGN PATENT DOCUMENTS

| | | | |
|---|---|---|---|
| CN | 1656989 A | 8/2005 | |
| CN | 201101452 Y | 8/2008 | |
| CN | 101496699 B | 12/2011 | |
| DE | 3644267 A1 | 7/1988 | |
| DE | 202004012729 U1 | 2/2005 | |
| EP | 0100755 A2 | 2/1984 | |
| EP | 0244016 A1 | 11/1987 | |
| FR | 2500737 A1 | 9/1982 | |
| FR | 2582497 A1 | 12/1986 | |
| FR | 2602660 A1 | 2/1988 | |
| FR | 2646074 A1 | 10/1990 | |
| FR | 2862199 A1 | 5/2005 | |
| GB | 1264448 | 2/1972 | |
| GB | 2075626 A | 11/1981 | |
| JP | 1153123 A | 6/1989 | |
| JP | 1299522 A | 12/1989 | |
| JP | 4099551 A | 3/1992 | |
| JP | 4099552 A | 3/1992 | |
| KR | 20090011969 U | 11/2009 | |
| WO | 20000019878 A1 | 4/2000 | |
| WO | 0221986 a1 | 3/2002 | |
| WO | 200230253 A1 | 4/2002 | |
| WO | 2003057355 A1 | 7/2003 | |
| WO | 20060128221 A1 | 12/2006 | |
| WO | 2009076585 A1 | 6/2009 | |
| WO | 2012113106 A1 | 8/2012 | |
| WO | 2012113107 A1 | 8/2012 | |
| WO | 2012113125 A1 | 8/2012 | |
| WO | 2013120145 A1 | 8/2013 | |

OTHER PUBLICATIONS

Ellie; Home Cooking in Montana: Product Review . . . Cuisinart Elite 12 cup Food Processor Model FP-12DC; Mar. 30, 2012; 6 pages.

* cited by examiner

FOOD PROCESSOR WITH ADJUSTABLE BLADE ASSEMBLY

CROSS-REFERENCE TO RELATED U.S. PATENT APPLICATIONS

The present application is a Continuation of U.S. patent application Ser. No. 15/370,434, now U.S. Pat. No. 10,449,685, filed on Dec. 6, 2016, entitled "FOOD PROCESSOR WITH ADJUSTABLE BLADE ASSEMBLY," which is a Continuation-in-Part of U.S. patent application Ser. No. 14/220,203, now U.S. Pat. No. 10,105,864, entitled "FOOD PROCESSOR WITH A LOCKABLE ADJUSTABLE BLADE ASSEMBLY," filed Mar. 20, 2014, which is a divisional of U.S. patent application Ser. No. 12/769,746, now U.S. Pat. No. 8,720,325, entitled "FOOD PROCESSOR WITH A LOCKABLE ADJUSTABLE BLADE ASSEMBLY," filed on Apr. 29, 2010.

U.S. patent application Ser. No. 15/370,434, now U.S. Pat. No. 10,449,685, is also a Continuation-in-Part of U.S. patent application Ser. No. 15/000,712, now U.S. Pat. No. 10,582,808, entitled "FOOD PROCESSING DEVICE WITH AN EXTERNALLY OPERATED ADJUSTMENT MECHANISM," filed Jan. 19, 2016, which is a divisional of U.S. patent application Ser. No. 14/000,416, now U.S. Pat. No. 9,265,381, entitled "FOOD PROCESSING DEVICE WITH AN EXTERNALLY OPERATED ADJUSTMENT MECHANISM," filed Sep. 23, 2013, which is a National Stage Entry of PCT/CN2011/001487 entitled "A FOOD PROCESSING DEVICE WITH AN EXTERNALLY OPERATED ADJUSTMENT MECHANISM," filed on Sep. 1, 2011.

U.S. patent application Ser. No. 15/370,434, now U.S. Pat. No. 10,449,685, is also a Continuation-in-Part of U.S. patent application Ser. No. 14/000,413, now U.S. Pat. No. 9,655,474, entitled "FOOD PROCESSING DEVICE WITH AN EXTERNALLY OPERATED ADJUSTMENT MECHANISM," filed on Sep. 23, 2013, which is a National Stage Entry of PCT/CN2011/000311, entitled "A FOOD PROCESSING DEVICE WITH AN EXTERNALLY OPERATED ADJUSTMENT MECHANISM," filed on Feb. 25, 2011.

Each of the above-identified applications are hereby incorporated by reference.

Cross-reference is made to U.S. Pat. No. 8,985,010, entitled "Food Processor With Cutting Blade Assembly Support," filed Apr. 29, 2010, and U.S. Pat. No. 8,439,285, entitled "Adjustable Food Processor With Guide Ramp," filed Apr. 29, 2010, each of which is assigned to the same assignee as the present application, each of which is hereby incorporated by reference.

FIELD OF THE INVENTION

The present disclosure relates generally to a domestic food processor, and more particularly to a food processor having a control for adjusting the cutting thickness of the food processor.

BACKGROUND OF THE INVENTION

A food processor is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that pieces of food cut by the blade fall through the aperture and collect in the bottom of the bowl.

SUMMARY OF THE INVENTION

According to one aspect of this disclosure, a food processor includes a base having a motor positioned therein, a removable bowl coupled to the base, and a removable lid coupled to the bowl. The lid has a feed tube that opens into the bowl. A cutting blade is positioned in the bowl and driven by the motor to cut food items advanced through the feed tube. The food processor also includes a rotating disk upwardly and downwardly movable relative to the cutting blade to adjust the distance therebetween, and a user-operated pin positioned below the rotating disk. The user-operated pin is movable between a first position in which the rotating disk is prevented from moving upwardly and downwardly relative to the cutting blade, and a second position in which the rotating disk is permitted to move upwardly and downwardly relative to the cutting blade. In some embodiments, the rotating disk may include a sleeve extending downwardly from a lower surface thereof, and the cutting blade may be coupled to a central shaft positioned in the sleeve of the rotating disk.

In some embodiments, the user-operated pin may include a pin body extending from a first end through a sidewall of the sleeve to a second end received in an aperture formed in the central shaft. In some embodiments, the sidewall of the sleeve may include a first plurality of teeth, an outer surface of the pin body may have a second plurality of teeth extending therefrom, and a number of the first plurality of teeth may be engaged with the second plurality of teeth when the user-operated pin is in the first position.

Additionally, in some embodiments, the first plurality of teeth may be spaced apart from the second plurality of teeth when the user-operated pin is moved to the second position. In some embodiments, the food processor may also include a spring having a first spring end positioned at a bottom of the aperture of the central shaft and a second spring end coupled to the second end of the user-operated pin. The spring may bias the user-operated pin in the first position. In some embodiments, a guide pin may extend outwardly from the bottom of the aperture, and the spring may extend over the guide pin.

In some embodiments, the food processor may also include a lever pivotably coupled to a sidewall of the sleeve and may have a first lever end contacting the second end of the user-operated pin. Movement of the user-operated pin between the first position and the second position may cause the lever to pivot about an axis between a first lever position and a second lever position. In some embodiments, the lever may extend from the first lever end to a second lever end. The second lever end may be coupled with the central shaft when the lever is at the first lever position. In some embodiments, the central shaft may have an outer surface with a plurality of teeth extending therefrom, and the second lever end may be engaged with a number of the plurality of teeth when the lever is at the first lever position, thereby preventing the rotating disk from moving relative to the cutting blade.

In some embodiments, the second lever end may be spaced apart from the plurality of teeth at the second lever position, thereby permitting movement of the rotating disk relative to the cutting blade. In some embodiments, the food processor may also include a spring having a first end coupled to a sidewall of the sleeve and a second end coupled to the second lever end. The spring may bias the lever in the first lever position, thereby maintaining the user-operated pin in the first position and preventing movement of the rotating disk relative to the cutting blade. Additionally, in some embodiments, a button may be secured to a first end of the user-operated pin, and depressing the button moves the user-operated pin from the first position to the second position.

According to another aspect, a food slicer assembly for a food processor is disclosed. The food slicer assembly includes a cutting blade, a rotating disk upwardly and downwardly movable relative to the cutting blade to adjust the distance therebetween, and a locking mechanism positioned below a lower surface of the rotating disk. The locking mechanism includes a user-operated pin that is movable between a first position in which the locking mechanism prevents the rotating disk from moving upwardly and downwardly relative to the cutting blade, and a second position in which the locking mechanism permits the rotating disk to move upwardly and downwardly relative to the cutting blade.

In some embodiments, the food slicer assembly may further include a sleeve extending downwardly from the lower surface of the rotating disk, and a central shaft positioned in the sleeve. The central shaft may have the cutting blade coupled thereto. In some embodiments, the locking mechanism may include a first plurality of teeth extending from a sidewall of the sleeve. The user-operated pin may extend through the sleeve into the central shaft and may have a second plurality of teeth extending therefrom. The second plurality of teeth may be engaged with a number of the first plurality of teeth when the user-operated pin is in the first position and spaced apart from the first plurality of teeth when the user-operated pin is moved to the second position.

In some embodiments, the locking mechanism may include a plurality of teeth extending from the central shaft, and a lever extending from a first end coupled to the user-operated pin to a second end. The second end of the lever may be engaged with a number of the teeth when the user-operated pin is in the first position and spaced apart from the plurality of teeth when the user-operated pin is in the second position. In some embodiments, the lever may be pivotably coupled to the sleeve.

According to another aspect, the food processor includes a base having a motor positioned therein, a removable bowl coupled to the base, a cutting blade positioned in the bowl and secured to a central shaft driven by the motor, and a rotating disk having the central shaft extending therethrough. The rotating disk is upwardly and downwardly movable between a plurality of positions relative to the cutting blade. The food processor also includes a locking mechanism positioned below a lower surface of the rotating disk. The locking mechanism includes a user-operated pin extending through the rotating disk that is movable between a first position in which the rotating disk is prevented from moving upwardly and downwardly relative to the cutting blade, and a second position in which the rotating disk is permitted to move upwardly and downwardly relative to the cutting blade.

In some embodiments, the locking mechanism may include a first plurality of teeth extending from a sidewall of the rotating disk, and the user-operated pin may have a second plurality of teeth extending therefrom. The second plurality of teeth may be engaged with a number of the first plurality of teeth when user-operated pin is in the first position and spaced apart from the first plurality of teeth when the user-operated pin is moved to the second position.

According to another aspect of this disclosure, a food processor includes a base having a motor positioned therein, a removable bowl coupled to the base, and a removable lid coupled to the bowl so as to define a processing chamber. The lid has a feed tube that opens into the bowl. The food processor also includes a blade assembly positioned in the processing chamber and driven by the motor, and the blade assembly has a flange extending therefrom. A rotating disk is movably coupled to the blade assembly, and the rotating disk has a plurality of slots formed therein. Each of the slots is sized to receive the flange of the blade assembly. The rotating disk is movable relative to the blade assembly between a plurality of cutting positions to produce cut food items of varying thicknesses, and the flange of the blade assembly is received into one of the plurality of slots at each of the plurality of cutting positions.

In some embodiments, the rotating disk may include a blade support pivotably coupled to an outer rim of the rotating disk. The plurality of slots may be formed in the blade support. In some embodiments, the blade support may be movable between a first position where the flange of the blade assembly is received in one of the plurality of slots, and a second position where the flange of the blade assembly is spaced apart from each of the plurality of slots. Additionally, in some embodiments, the rotating disk may be prevented from moving relative to the blade assembly when the blade support is placed in the first position, and the rotating disk may be permitted to move relative to the blade assembly when the blade support is placed in the second position.

In some embodiments, the outer rim of the rotating disk may have an opening defined therein, and the blade support may have a body positioned in the opening when the blade support is placed in the first position. The body of the blade support may extend outwardly from the opening when the blade support is placed in the second position.

In some embodiments, the rotating disk may include a locking device configured to maintain the blade support in the first position. In some embodiments, the locking device may include a tab extending from the blade support, and the tab may be received in a recess formed in the outer rim of the rotating disk when the blade support is placed in the first position.

In some embodiments, the plurality of slots may include at least five slots. Additionally, in some embodiments, the blade assembly may include a cutting blade secured to a mounting arm extending from a central shaft. In some embodiments, the flange of the blade assembly received in one of the plurality of slots may be an outer edge of the cutting blade when the rotating disk is placed at a first cutting position, and the flange of the blade assembly received in one of the plurality of slots may be an arcuate lip of the mounting arm when the rotating disk is placed at a second cutting position.

According to another aspect, a food slicer assembly for a food processor is disclosed. The food slicer assembly includes a cutting blade having an outer edge, and a rotating disk movable to a plurality of positions relative to the cutting blade to adjust the distance therebetween. The rotating disk has an outer rim positioned adjacent to the outer edge of the cutting blade, and a blade support coupled to the outer rim, the blade support includes a plurality of slots, each of which is sized to receive the outer edge of the cutting blade. The outer edge of the cutting blade is received in a first slot at a first position of the rotating disk.

In some embodiments, the food slicer assembly may further include a central shaft secured to an inner edge of the cutting blade, and a mounting arm secured to the central shaft and positioned below the cutting blade. In some embodiments, the mounting arm may have an arcuate lip extending parallel to the outer edge of the cutting blade. The lip may be received in the first slot of the blade support at a second position of the rotating disk.

In some embodiments, the blade support may include a body extending from a first end, and the first end may be hinged to the outer rim of the rotating disk such that the blade support is rotatable about a vertical axis. In some embodiments, when the rotating disk is at the first position, the outer edge of the cutting blade may be received in the first slot when the blade support is placed at a first position about the vertical axis, and the outer edge of the cutting blade may be spaced apart from each of the plurality of slots when the blade support is placed at a second position about the vertical axis.

Additionally, the first end of the body of the blade support may be coupled to the outer rim of the rotating disk via a pivot joint. The pivot joint may have the vertical axis extending therethrough.

According to another aspect, a food processor includes a base having a motor positioned therein, a removable bowl coupled to the base, a removable lid coupled to the bowl. The lid has a feed tube that opens into the bowl. A blade assembly is positioned in the bowl and is driven by the motor, and a rotating disk is movable between a plurality of cutting positions relative to the blade assembly. The rotating disk has a blade support that includes a slot corresponding to each of the plurality of cutting positions, each slot being sized to receive a flange of the blade assembly.

In some embodiments, the blade assembly may include a cutting blade having an outer edge. The rotating disk may have an outer rim positioned adjacent to the outer edge of the cutting blade, and the blade support may be pivotably coupled to the outer rim. In some embodiments, the blade support may be pivotable between a first position where the outer edge of the cutting blade is received in one slot of the blade support, and a second position where the outer edge of the cutting blade may be spaced apart from the blade support.

In some embodiments, the flange of the blade assembly received in one of the plurality of slots may be the outer edge of the cutting blade when the rotating disk is placed at a first cutting position.

According to another aspect of the disclosure, a food processing device is disclosed. The food processing device includes a base having a motor positioned therein, a removable bowl coupled to the base, and a removable lid coupled to the bowl so as to define a processing chamber. The lid has a feed tube that opens into the bowl. The food processing device also includes a blade assembly positioned in the processing chamber, which is driven by the motor and includes a cutting blade to cut food items advanced through the feed tube, and a rotating disk upwardly and downwardly movable relative to the cutting blade to adjust the distance between an upper surface of the rotating disk and the cutting blade. The food processing device also includes an adjustment assembly operable to move the rotating disk relative to the cutting blade. The adjustment assembly includes a control knob coupled to the blade assembly and is positioned above the upper surface of the rotating disk, and a threaded sleeve coupled to the rotating disk and is positioned in the control knob.

In some embodiments, the rotating disk may divide the processing chamber into an upper compartment and a lower compartment, and the blade assembly may include a mounting arm having a ramp defined therein to guide food items from the upper compartment to the lower compartment. In some embodiments, the ramp may have an inclined surface extending outwardly in a radial direction from a first end to a second end.

The inclined surface may have a first angle of inclination at the first end and a second angle of inclination at the second end. In some embodiments, the first angle of inclination may be greater than or equal to the second angle of inclination. Additionally, in some embodiments, the first angle of inclination may be approximately 25 degrees. In some embodiments, the second angle of inclination may be approximately 15 degrees.

In some embodiments, the rotating disk may have a counterweight secured thereto, and the threaded sleeve may be positioned between the mounting arm and the counterweight. In some embodiments, rotation of the control knob in a first direction may cause upward movement of the rotating disk, and rotation of the control knob in a second direction may cause downward movement of the rotating disk.

In some embodiments, the blade assembly may include a central shaft coupled to the control knob, and the central shaft may be received in the threaded sleeve. Rotation of the control knob may cause the threaded sleeve to move upwardly and downwardly along the central shaft.

According to another aspect, a food slicer assembly for a food processor is disclosed. The food slicer assembly includes a cutting blade, a mounting arm, which has a ramp defined therein, that is positioned below the cutting blade, and a rotating disk movable to a plurality of positions relative to the cutting blade to adjust the distance between its upper surface and the cutting blade. An adjustment assembly is operable to move the rotating disk relative to the cutting blade. The adjustment assembly includes an internally-threaded control knob positioned above the upper surface of the rotating disk, and an externally-threaded sleeve coupled to the rotating disk that is positioned in the control knob.

In some embodiments, the food slicer assembly may further include a central shaft that is coupled at an upper end to the control knob and is positioned in the sleeve. The mounting arm may extend outwardly from a first end secured to the central shaft to a second end positioned adjacent to an outer rim of the rotating disk. In some embodiments, the ramp may have an inclined surface extending in a radial direction from the first end of the mounting arm to the second end of the mounting arm. The inclined surface may have a first angle of inclination at the first end that is greater than or equal to a second angle of inclination at the second end. In some embodiments, the rotating disk may include a counterweight, and the sleeve may be positioned between the counterweight and the mounting arm.

According to another aspect, a food processor includes a base having a motor positioned therein, a removable bowl coupled to the base, and a removable lid coupled to the bowl so as to define a processing chamber. The lid has a feed tube that opens into the bowl. A cutting blade is positioned in the bowl and driven by the motor to cut food items advanced through the feed tube. A rotating disk is upwardly and downwardly movable relative to the cutting blade to adjust the distance therebetween. The rotating disk divides the processing chamber into an upper compartment and a lower compartment. A ramp is positioned below the cutting blade to guide food items from the upper compartment into the lower compartment. The food processor further includes an adjustment assembly operable to move the rotating disk relative to the cutting blade. The adjustment assembly includes a user-operated control device positioned above the rotating disk.

In some embodiments, the adjustment assembly may include an externally-threaded sleeve coupled to the rotating disk, and the user-operated control device may include an internally-threaded control knob having a grip.

According to another aspect of the disclosure, a food processor includes a base having a motor positioned therein, a removable bowl coupled to the base, and a removable lid coupled to the bowl so as to define a processing chamber. The removable lid has a feed tube that opens into the bowl. The food processor also includes a cutting assembly positioned in the processing chamber that is driven by the motor to cut food items advanced through the feed tube. The cutting assembly is positionable between a plurality of cutting positions to produce cut food items of varying thicknesses. The food processor also includes an adjustment assembly positioned in the base. The adjustment assembly includes a first sleeve secured to the base, a second sleeve rotatably coupled to the first sleeve, and a user-operated control device operable to rotate the second sleeve relative to the first sleeve to move the cutting assembly between the plurality of cutting positions. In some embodiments, the first sleeve may have an externally-threaded body, and the second sleeve may have an internally-threaded body positioned over the externally-threaded body of the first sleeve.

In some embodiments, the cutting assembly may include a cutting blade and a rotating disk that may be supported by the second sleeve. In some embodiments, rotation of the second sleeve in a first direction may cause upward movement of the second sleeve and the rotating disk relative to the cutting blade, and rotation of the second sleeve in a second direction may cause downward movement of the second sleeve and the rotating disk relative to the cutting blade.

Additionally, in some embodiments, the food processor may further include a drive shaft connected at a first end to the motor and at a second end to the cutting assembly to transmit a driving force from the motor to the cutting assembly. In some embodiments, the first sleeve may include a bearing rotatably supporting the drive shaft, and the drive shaft may extend through an opening defined in the second sleeve. The opening may be sized such that the drive shaft does not contact the second sleeve.

In some embodiments, the food processor may further include a first adaptor removably coupled to the rotating disk, and a second adaptor secured to a lower end of the first adaptor. The second sleeve may include a bearing rotatably supporting the second adaptor. In some embodiments, the lower end of the first adaptor may include a first plurality of teeth, and the second adaptor may include a second plurality of teeth interdigitated with the first plurality of teeth to secure the second adaptor to the first adaptor.

Additionally, in some embodiments, the adjustment assembly may further comprise a gear assembly positioned in the base and coupled to the second sleeve. The gear assembly may be operable to rotate the second sleeve relative to the first sleeve. The user-operated control device may be coupled to the gear assembly and be configured to operate the gear assembly such that the second sleeve is rotated relative to the first sleeve to move the cutting assembly between the plurality of cutting positions.

In some embodiments, the second sleeve may have a groove defined therein. The gear assembly may have a first gear including a first plurality of teeth defined on an outer surface and a spline extending from an inner surface thereof. The spline may be received in the groove of the second sleeve. A second gear including a second plurality of teeth may be interdigitated with the first plurality of teeth. The user-operated control device may cause rotation of the second gear and the first gear.

In some embodiments, the user-operated control device may include a lever extending outwardly from the base and positionable between a plurality of adjustment positions relative to the base. The lever may be coupled to the second gear such that movement of the lever between the plurality of adjustment positions may cause rotation of the second sleeve relative to the first sleeve to move the cutting assembly between the plurality of cutting positions.

In some embodiments, the food processor may further include a locking mechanism to inhibit movement of the lever. Additionally, in some embodiments, the locking mechanism may include a plurality of notches formed in the second gear, and each notch may correspond to one of the plurality of adjustment positions. The locking mechanism may also include a pin positioned below the second gear that is configured to be received in each of the plurality of notches, and a spring coupled to the pin. The spring may bias the pin into the notch corresponding to a present adjustment position of the lever to inhibit movement of the lever.

According to another aspect, the food processor includes a base having a motor positioned therein, a removable bowl coupled to the base, and a removable lid coupled to the bowl so as to define a processing chamber. The lid has a feed tube that opens into the bowl. The food processor also includes a cutting assembly, which is positioned in the processing chamber and driven by the motor to cut food items advanced through the feed tube. The cutting assembly includes a cutting blade and a rotating disk having an upper surface. The rotating disk is upwardly and downwardly movable relative to the cutting blade to adjust the distance between the upper surface of the rotating disk and the cutting blade. The food processor also has an adjustment assembly including a screw-type drive assembly positioned in the base. The screw-type drive assembly is operable to move the rotating disk relative to the cutting blade while the rotating disk and the cutting assembly is driven by the motor.

In some embodiments, the screw-type drive assembly may support the rotating disk. Rotation of the screw-type drive assembly in a first direction may cause upward movement of the rotating disk, and rotation of the screw-type drive assembly in a second direction may cause downward movement of the rotating disk.

In some embodiments, the screw-type drive assembly may include an externally-threaded first sleeve and an internally-threaded second sleeve positioned over the first sleeve. The rotating disk may be supported by the second sleeve such that rotation of the second sleeve in the first direction may cause upward movement of the second sleeve and the rotating disk and rotation of the second sleeve in the second direction may cause downward movement of the second sleeve and the rotating disk.

In some embodiments, the adjustment assembly may further include a gear assembly positioned in the base and coupled to the second sleeve. The gear assembly may be configured to rotate the second sleeve relative to the first sleeve. Additionally, in some embodiments, the adjustment assembly may further include a lever coupled to the screw-type drive assembly. The lever may extend outwardly from the base and be movable relative to the base, and movement of the lever may cause the screw-type drive assembly to move the rotating disk relative to the cutting blade. In some embodiments, the food processor may include a locking mechanism to inhibit movement of the lever.

According to another aspect, the food processor includes a base having a motor positioned therein, a removable bowl coupled to the base, and a removable lid coupled to the bowl so as to define a processing chamber. The lid has a feed tube that opens into the bowl. A cutting assembly is positioned in the processing chamber and driven by the motor to cut food items advanced through the feed tube. The cutting assembly is positionable between a plurality of cutting positions to produce cut food items of varying thicknesses. An adjustment assembly is positioned in the base that is operable to move the cutting assembly between the plurality of cutting positions while the cutting assembly is driven by the motor.

In some embodiments, the adjustment assembly may include a lever extending outwardly from the base. The lever may be positionable between a plurality of adjustment positions corresponding to the plurality of cutting positions of the cutting assembly such that movement of the lever between the plurality of adjustment positions moves the cutting assembly between the plurality of cutting positions. In some embodiments, the adjustment assembly may include a screw-type drive assembly operable to move the cutting assembly between the plurality of cutting positions, and a second motor rotatably coupled to the screw-type drive assembly. The second motor may be configured to operate the screw-type drive assembly to move the cutting assembly between the plurality of cutting positions when the second motor is energized.

According to another aspect, a food processor includes a base having a motor positioned therein, a bowl removably coupled to the base, and a lid removably coupled to the bowl so as to define a processing chamber. The lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor includes an adjustment assembly that is operable to move the cutting assembly between the plurality of cutting positions while the cutting assembly is driven by the motor. The adjustment assembly includes a sleeve rotatably coupled to the base, a gear assembly positioned in the base and operable to rotate the sleeve, and a user-operated control device configured to operate the gear assembly to rotate the sleeve. In the food processor, rotation of the sleeve causes the cutting assembly to move between the plurality of cutting positions while the cutting assembly is driven by the motor.

In some embodiments, the user-operated control device may include a control knob having a grip and a shaft extending inwardly from the control knob into the base.

In some embodiments, the cutting assembly may include a cutting blade and a rotating disk. Rotation of the sleeve in a first direction may cause upward movement of the rotating disk relative to the cutting blade, and rotation of the sleeve in a second direction may cause downward movement of the rotating disk relative to the cutting blade.

Additionally, in some embodiments, the gear assembly may include a first gear including a first plurality of teeth, and the first gear may be movably coupled to the sleeve such that rotation of the first gear causes rotation of the sleeve.

The gear assembly may also include a second gear including a second plurality of teeth interdigitated with the first plurality of teeth such that rotation of the second gear causes rotation of the first gear. In some embodiments, the first gear may be a worm gear.

In some embodiments, the user-operated control device may include a grip formed on the second gear, and the grip may be operable by a user to rotate the second gear.

In some embodiments, the user-operated control device may include a ring having a third plurality of teeth defined on an inner surface. The third plurality of teeth may be interdigitated with a number of the second plurality of teeth such that rotation of the ring causes rotation of the second gear. In some embodiments, the bowl may include a lower rim and the ring may be rotatably coupled to the lower wall of the bowl. In some embodiments, the ring may have a grip formed thereon that is operable by a user to rotate the ring.

Additionally, in some embodiments, the food processor may also include a drive shaft configured to transmit a driving force from the motor to the cutting assembly. The drive shaft may extend through an opening defined in the sleeve, and the opening may be sized such that the sleeve is spaced apart from the drive shaft.

In some embodiments, the user-operated control device may include a lever extending outwardly from the base and movable relative to the base. The lever may be coupled to the gear assembly such that movement of the lever relative to the base causes the gear assembly to rotate the sleeve.

According to another aspect, the food processor includes a base having a motor positioned therein, a bowl removably coupled to the base, and a lid removably coupled to the bowl so as to define a processing chamber. The lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor also includes an adjustment assembly having a user-operated control device that is operable to move the cutting assembly between the plurality of cutting positions while the cutting assembly is driven by the motor. The user-operated control device includes a shaft extending outwardly from the base and a control knob coupled to the shaft, and rotation of the control knob causes the cutting assembly to move between the plurality of cutting positions while the cutting assembly is driven by the motor.

In some embodiments, the adjustment assembly may include a gear assembly located in the base that is operable to move the cutting assembly between the plurality of cutting positions. Rotation of the control knob may cause the gear assembly to move the cutting assembly between the plurality of cutting positions.

In some embodiments, the adjustment assembly may further include an adaptor having a first end coupled to the cutting assembly, and a sleeve rotatably coupled to the base and to a second end of the adaptor. The sleeve may have an inner surface with a groove defined therein. The gear assembly of the food processor may include a first gear including a first plurality of teeth defined on an outer surface and a spline extending from an inner surface. The spline may be received in the groove of the sleeve such that rotation of the first gear causes rotation of the sleeve.

In some embodiments, the gear assembly may include a rack and pinion configured to translate rotation of the control knob into rotation of the first gear. In some embodiments, the rack may include a second plurality of teeth interdigitated with the first plurality of teeth of the first gear. Additionally, in some embodiments, the control knob may be secured to a first end of the shaft and the pinion may be secured to a second end of the shaft. The pinion may include a third plurality of teeth interdigitated with a fourth plurality of teeth defined on the rack.

In some embodiments, the first gear may be a worm gear and the gear assembly may include a second gear including a second plurality of teeth interdigitated with a number of the first plurality of teeth of the worm gear.

In some embodiments, the cutting assembly may include a cutting blade and a rotating disk, and rotation of the control knob in a first direction may cause upward movement of the rotating disk relative to the cutting blade, and rotation of the control knob in a second direction may cause downward movement of the rotating disk relative to the cutting blade.

According to another aspect, a food processor includes a base having a motor positioned therein, a bowl removably coupled to the base, and a lid removably coupled to the bowl so as to define a processing chamber. The lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor also includes an adjustment assembly that has a gear assembly positioned in the base and a user-operated control device. The gear assembly is operable to move the cutting assembly between the plurality of cutting positions while the cutting assembly is driven by the motor. The user-operated control device includes a thumbwheel positioned in a slot defined in the base. The thumbwheel is configured to operate the gear assembly to move the cutting assembly.

According to another aspect, a food processor includes a base having a motor positioned therein, a bowl removably coupled to the base, and a lid removably coupled to the bowl so as to define a processing chamber. The bowl is configured to rotate relative to the base about an axis, and the lid has a feed tube that opens into the bowl. The food processor also includes a cutting assembly positioned in the processing chamber and driven by the motor to cut food items advanced through the feed tube. The cutting assembly includes a cutting blade and a rotating disk having an upper surface. The rotating disk is movable relative to the cutting blade to adjust a distance defined between the upper surface of the rotating disk and the cutting blade. The food processor also includes an adjustment assembly positioned in the base. The adjustment assembly is operable to move the rotating disk relative to the cutting blade while the cutting assembly is driven by the motor. The bowl is configured to engage the adjustment assembly such that rotation of the bowl in a first direction about the axis causes upward movement of the rotating disk relative to the cutting blade, and rotation of the bowl in a second direction causes downward movement of the rotating disk relative to the cutting blade.

In some embodiments, the adjustment assembly may include an adaptor coupled to the rotating disk, a sleeve rotatably coupled to the adaptor and to the base, and a gear assembly positioned in the base. The gear assembly may be configured to translate rotation of the bowl into rotation of the sleeve. Rotation of the sleeve may cause movement of the rotating disk relative to the cutting blade.

In some embodiments, the sleeve may have a groove defined therein. The gear assembly may include a first gear including a first plurality of teeth defined on an outer surface and a spline extending from an inner surface. The spline may be received in the groove of the sleeve such that rotation of the first gear causes rotation of the sleeve. The gear assembly may also include a second gear including a second plurality of teeth interdigitated with the first plurality of teeth such that rotation of the second gear causes rotation of the first gear.

Additionally, in some embodiments, the bowl may include a third plurality of teeth that are interdigitated with a number the second plurality of teeth of the second gear such that rotation of the bowl about the axis causes rotation of the second gear. In some embodiments, the bowl may include an inner wall and an arm extending inwardly from the inner wall to a first end. The first end of the arm may have the third plurality of teeth defined thereon.

In some embodiments, the base may have a slot defined therein sized to receive the first end of the arm. Additionally, in some embodiments, the slot may include a first section in which the bowl is engaged with the adjustment assembly and a second section in which the bowl is disengaged with the adjustment assembly.

In some embodiments, the food processor may further include a drive shaft configured to transmit a driving force from the motor to the cutting assembly, and the drive shaft may extend through an opening defined in the sleeve. The opening may be sized such that the sleeve is spaced apart from the drive shaft. Additionally, in some embodiments, the food processor may include a drive stem coupled to the drive shaft. The cutting assembly may further include a blade carrier having the cutting blade secured thereto, and the drive stem may have a keyed end that is received in a corresponding socket defined in the blade carrier. In some embodiments, the lid may include a sleeve that contacts an upper end of the blade carrier to position the blade carrier on the drive stem.

In some embodiments, the food processor may further include a locking mechanism configured to inhibit rotation of the bowl about the axis. In some embodiments, the locking mechanism may include a pin extending from a lower surface of the bowl, and a plurality of notches defined in an upper surface of base. Each notch may be sized to receive the pin of the bowl.

According to another aspect, a food processor includes a base having a motor positioned therein, a bowl removably coupled to the base, and a lid removably coupled to the bowl so as to define a processing chamber. The bowl is configured to rotate relative to the base about an axis, and the lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor includes an adjustment assembly attached to the base. The adjustment assembly is operable to move the cutting assembly between the plurality of cutting positions while the cutting assembly is driven by the motor. The bowl is configured to engage the adjustment assembly such that rotation of the bowl about the axis operates the adjustment assembly to move the cutting assembly between the plurality of cutting positions.

In some embodiments, the adjustment assembly may include an adaptor coupled to the cutting assembly, a sleeve rotatably coupled to the adaptor and to the base, and a gear rotatably coupled to the base. The gear may be configured to translate rotation of the bowl into rotation of the sleeve, and rotation of the sleeve may cause movement of the cutting assembly between the plurality of cutting positions.

In some embodiments, the sleeve may have a groove defined therein, and the gear may include a first plurality of teeth defined on an outer surface and a spline extending from an inner surface. The spline may be received in the groove of the sleeve such that rotation of the gear causes rotation of the sleeve, and the bowl may include a second plurality of teeth that are interdigitated with the first plurality of teeth such that rotation of the bowl causes rotation of the gear.

In some embodiments, the adaptor may include a first adaptor removably coupled to the cutting assembly and a second adaptor torsionally secured to a lower end of the first adaptor. The sleeve may include a bearing rotatably supporting the second adaptor. Additionally, in some embodiments, the lower end of the first adaptor may include a first plurality of teeth. The second adaptor may include a second plurality of teeth interdigitated with the first plurality of teeth to torsionally secure the second adaptor to the first adaptor.

In some embodiments, the gear may be a first gear movably coupled to the sleeve such that rotation of the first gear causes rotation of the sleeve. The first gear may include a first plurality of teeth, and the adjustment assembly may further include a second gear including a second plurality of teeth interdigitated with the first plurality of teeth such that rotation of the second gear causes rotation of the first gear.

In some embodiments, the bowl may include an inner wall and an arm extending inwardly from the inner wall to a first end. The first end of the arm may have a third plurality of teeth defined thereon that are interdigitated with the second plurality of teeth of the second gear such that rotation of the bowl about the axis causes rotation of the second gear.

According to another aspect, a food processor includes a base having a motor positioned therein, a bowl removably coupled to the base, and a lid removably coupled to the bowl so as to define a processing chamber. The bowl is configured to rotate about an axis relative to the base, and the lid has a feed tube that opens into the bowl. A cutting assembly is positioned in the processing chamber and driven by the motor to cut food items advanced through the feed tube. The cutting assembly is positionable between a plurality of cutting positions to produce cut food items of varying thicknesses. The food processor also includes an adjustment assembly having a gear assembly positioned in the base, and the gear assembly is operable to move the cutting assembly between the plurality of cutting positions while the cutting assembly is driven by the motor. The bowl is configured to engage the gear assembly such that rotation of the bowl about the axis relative to the base operates the adjustment assembly to move the cutting assembly between the plurality of cutting positions.

BRIEF DESCRIPTION OF THE DRAWINGS

The detailed description particularly refers to the following figures, in which.

DETAILED DESCRIPTION OF THE PREFERRED EMBODIMENTS

Figure 1:
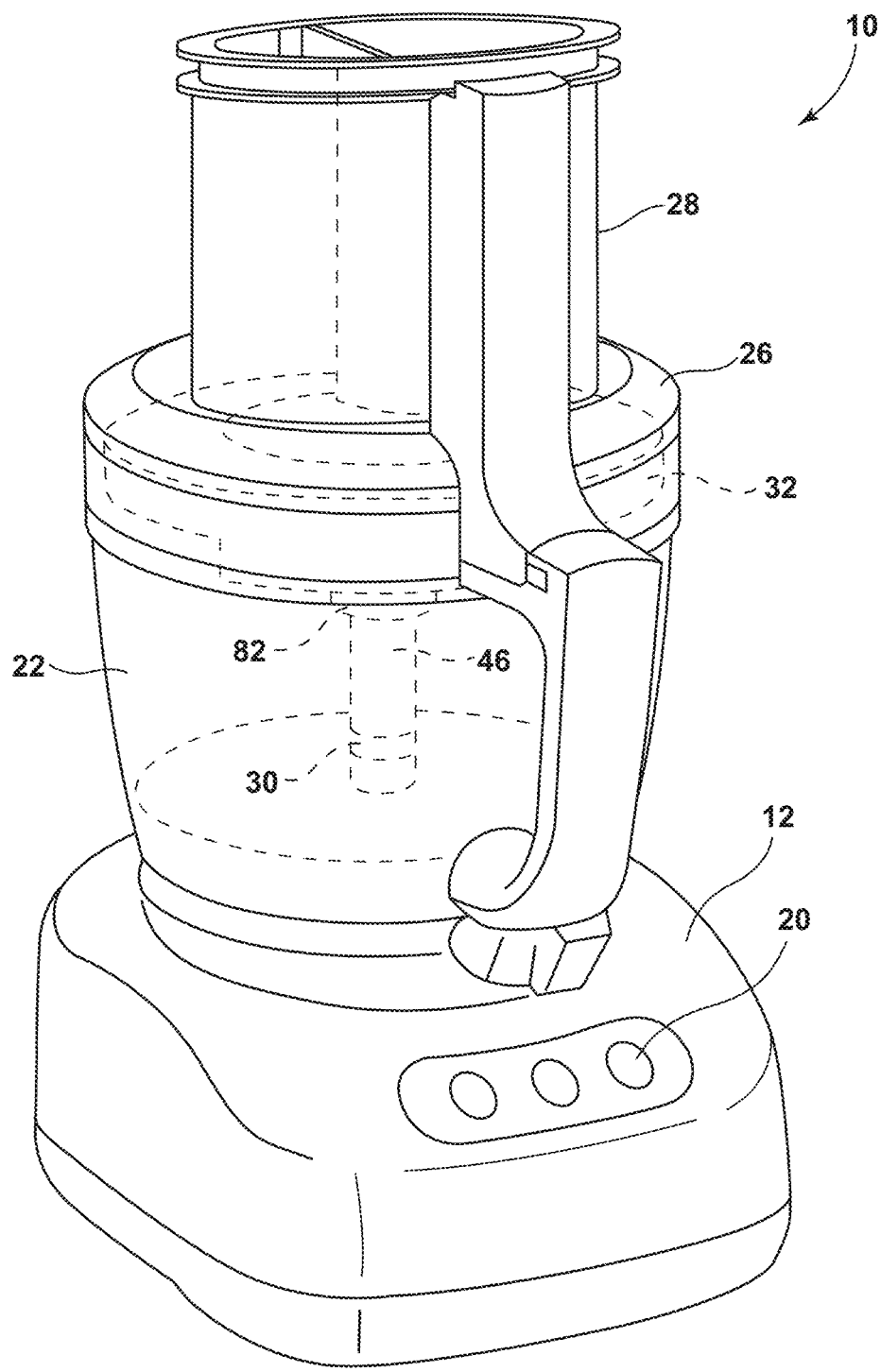
FIG. 1 is a perspective view of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIGS. 1-6, a food processor 10 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 10 has a base 12 that houses a motor 14 (shown schematically in FIG. 2) and a control unit (not shown). Under the control of the control unit, the motor's output shaft 16 drives a cutting blade 18 (see FIG. 2) to cut food items such as cheeses, meats, fruits, and vegetables. The base 12 also includes one or more buttons, switches, dials, or other types of controls 20. A user operates the controls 20 to control the operation of the motor 14 and hence the food processor 10. For instance, one of the controls 20 may be operable to turn the motor 14 on and off, while another control 20 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable bowl 22 is secured to the base 12. The bowl's handle facilitates placement of the bowl 22 on the base 12. The bowl 22 includes a removable lid 26 secured to its upper peripheral edge. The lid 26 has a feed tube 28 formed thereon through which food items such as cheeses, meats, fruits, and vegetables are inserted into the bowl 22 to be processed by the food processor 10. Collectively, the lid 26 and the bowl 22 define a processing chamber 24 where food items are processed by the cutting blade 18.

The bowl 22, lid 26, and feed tube 28 are generally made of a transparent or translucent plastic material, so that the contents of the food processor 10 can be viewed by a user without removing the lid 26 from the bowl 22. Moreover, one or more locking mechanisms may be used to lock the bowl to the base 12 and the lid 26 to the bowl 22.

Figure 2:
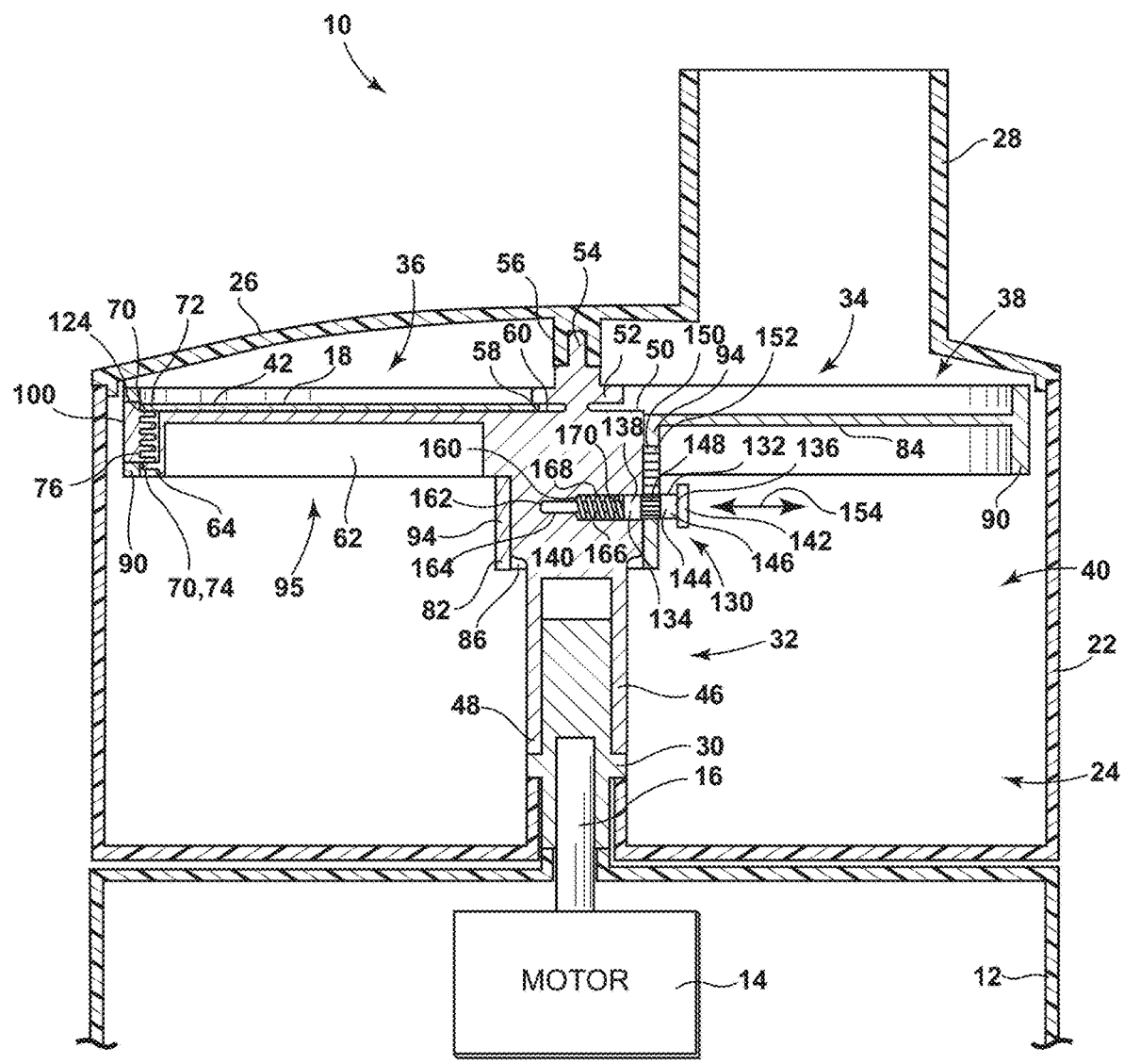
FIG. 2 is a partial cross-sectional view of the food processor of FIG. 1.
Figure 3:
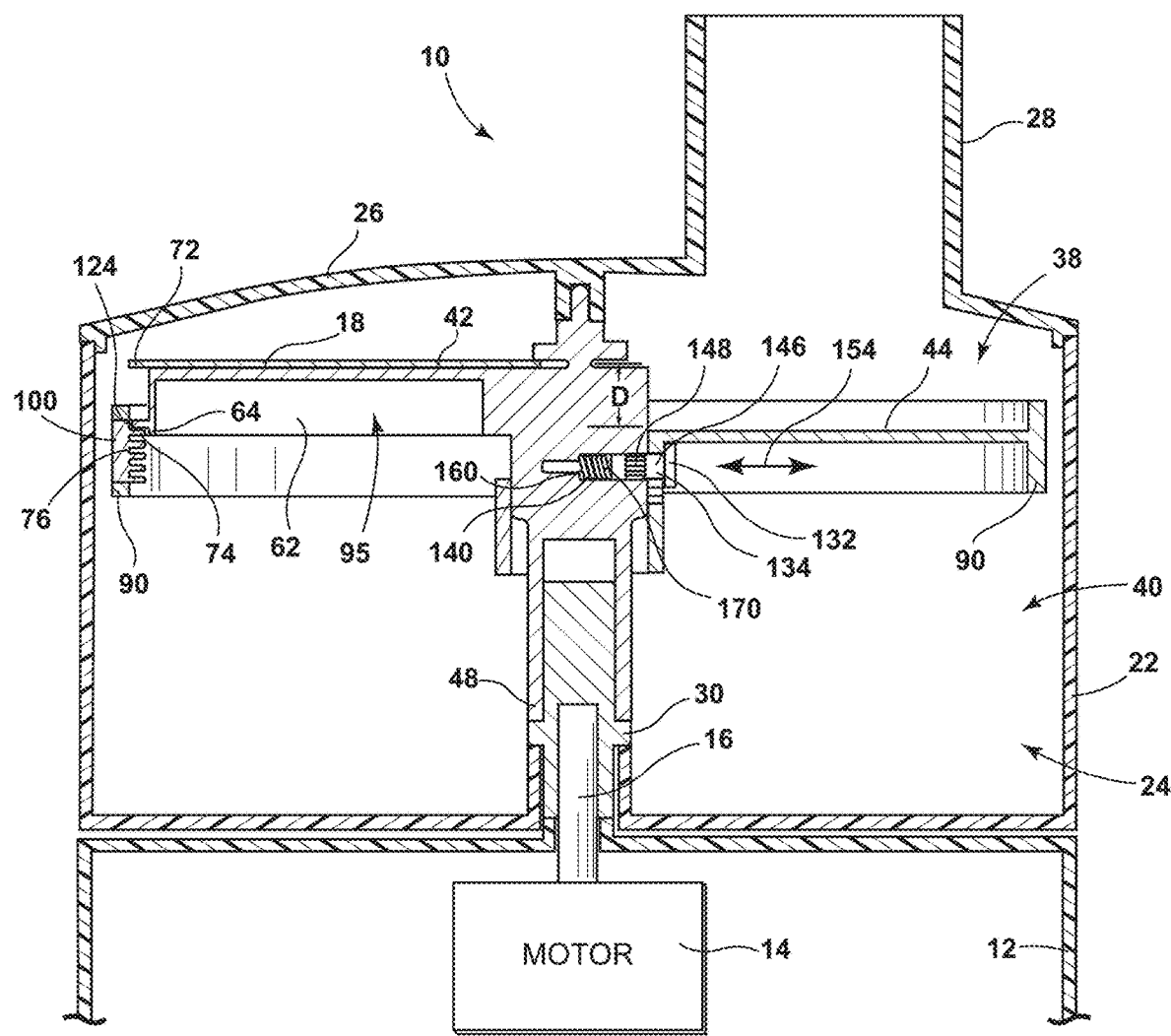
FIG. 3 is a view similar to FIG. 2, showing the rotating disk of the food slicer assembly of FIG. 2 in another position relative to the cutting blade.
Figure 4:
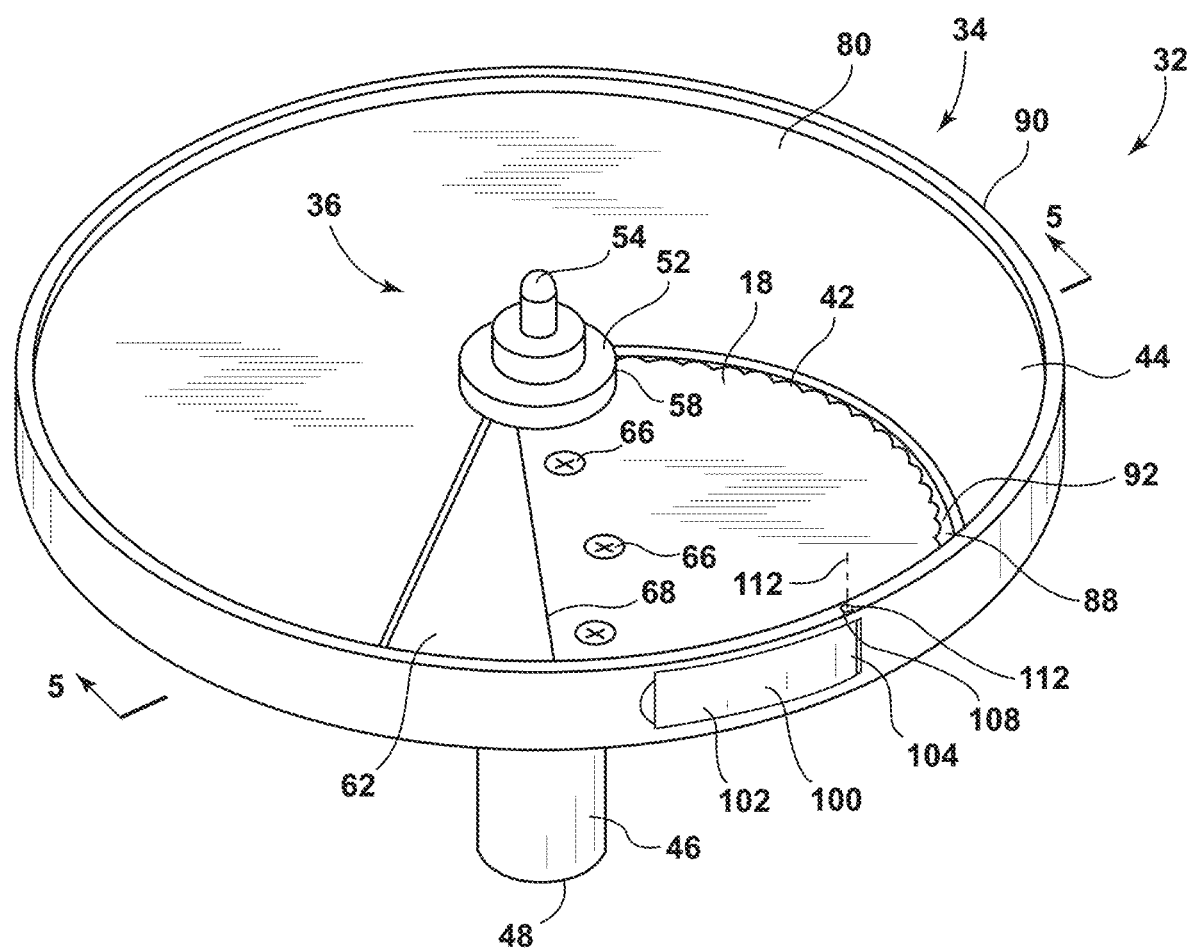
FIG. 4 is a perspective view of the food slicer assembly of FIG. 2.

As shown in FIGS. 2 and 3, when the removable bowl 22 is secured to the base 12, the output shaft 16 of the motor 14 is coupled to a drive stem 30. The drive stem 30 is in turn coupled to a food slicer assembly 32. As shown in FIGS. 2-4, the food slicer assembly 32 includes a rotating disk 34 and a blade assembly 36, with the cutting blade 18 being one component thereof. The rotating disk 34 effectively divides the processing chamber 24 into an upper compartment 38 located between the disk 34 and the lid 26, and a lower compartment 40 located below the rotating disk 34. A vertical distance, D, between the cutting edge 42 of the cutting blade 18 and the upper surface 44 of the rotating disk 34 defines a cutting thickness. In other words, the thickness of the pieces of food items cut by the food processor 10 is determined by the distance D between the cutting edge 42 of the cutting blade 18 and the upper surface 44 of the rotating disk 34. When the distance D between the cutting edge 42 of the cutting blade 18 and the upper surface 44 of the rotating disk 34 is increased, thicker pieces of food items are created, with thinner pieces of food items being created when the distance D between the cutting edge 42 of the cutting blade 18 and the upper surface 44 of the rotating disk 34 is decreased. As will be discussed in greater detail below, the rotating disk 34 is movable upwardly or downwardly between a plurality of cutting positions relative to the cutting blade 18 to vary the cutting thickness of the food processor 10, thereby creating thicker or thinner pieces of cut food items.

As shown in FIGS. 2-5, the blade assembly 36 includes a central shaft 46 that extends from a lower end 48 to an upper end 50. The lower end 48 receives the drive stem 30, thereby coupling the slicer assembly 32 to the output shaft 16 such that the slicer assembly 32 may be driven by the motor 14. The blade assembly 36 also includes a hub 52 positioned at the upper end 50 of the central shaft 46. As shown in FIG. 2, a tip 54 of the hub 52 is received in a guide sleeve 56 extending downward from the underside of the lid 26.

An inner edge 58 of the cutting blade 18 is received in a slot 60 formed between the hub 52 and the upper end 50 of the central shaft 46. As shown in FIGS. 2 and 3, the cutting blade 18 is secured within the slot 60 such that substantial deflection of the cutting blade 18 is inhibited when the cutting blade 18 cuts food items in the processing chamber 24. The cutting blade 18 is also secured to a mounting arm 62 extending away from the upper end 50 of the central shaft 46 to an end 64. A number of fasteners 66 (i.e., screws) positioned at a rear edge 68 of the cutting blade 18 extend into the mounting arm 62, thereby rigidly securing the cutting blade 18 to the mounting arm 62. It will be appreciated that in other embodiments the fasteners 66 may take the form of T-stakes, pins, posts, or other structures capable of securing the cutting blade 18 to the mounting arm 62. Additionally, the mounting arm 62 may include an overmold that receives the cutting blade 18.

As shown in FIGS. 2 and 3, the blade assembly 36 also includes a pair of flanges 70 extending beyond the end 64 of the mounting arm 62. One of the flanges 70 is an outer edge 72 of the cutting blade 18. Another flange 70 is an arcuate-shaped lip 74 extending outwardly from the end 64 of the mounting arm 62 that is parallel to the outer edge 72 of the cutting blade 18. As will be discussed in greater detail below, at least one of the flanges 70 is received in one of a plurality of slots 76 formed in the rotating disk 34 at each of the cutting positions.

The rotating disk 34 includes a planar body 80 and a central sleeve 82 extending downwardly from a lower surface 84 thereof. It will be appreciated that one or more of the components of the rotating disk 34 may be formed from plastic or a metallic material. The rotating disk 34 includes a passageway 86 that extends through the sleeve 82 and receives the central shaft 46 of the blade assembly 36. The planar body 80 also has a contoured opening 88 extending from the upper surface 44 to the lower surface 84. The contoured opening 88 is sized to receive the mounting arm 62 of the blade assembly 36. When the blade assembly 36 is positioned in the rotating disk 34, a gap or throat 92 is defined between the cutting edge 42 and the body 80, as shown in FIG. 4.

During operation, the motor 14 causes the blade assembly 36 to rotate. The blade assembly 36 acts on a sidewall 94 of the sleeve 82 such that the rotating disk 34 and the blade assembly 36 rotate together. Food items inserted through the feed tube 28 are urged into contact with the upper surface 44 of the rotating disk 34 while being acted upon (i.e., cut) by the cutting blade 18. Cut food items, along with other food items small enough to fit within the throat 92, pass from the upper compartment 38 into the lower compartment 40 through the throat 92.

Figure 5:
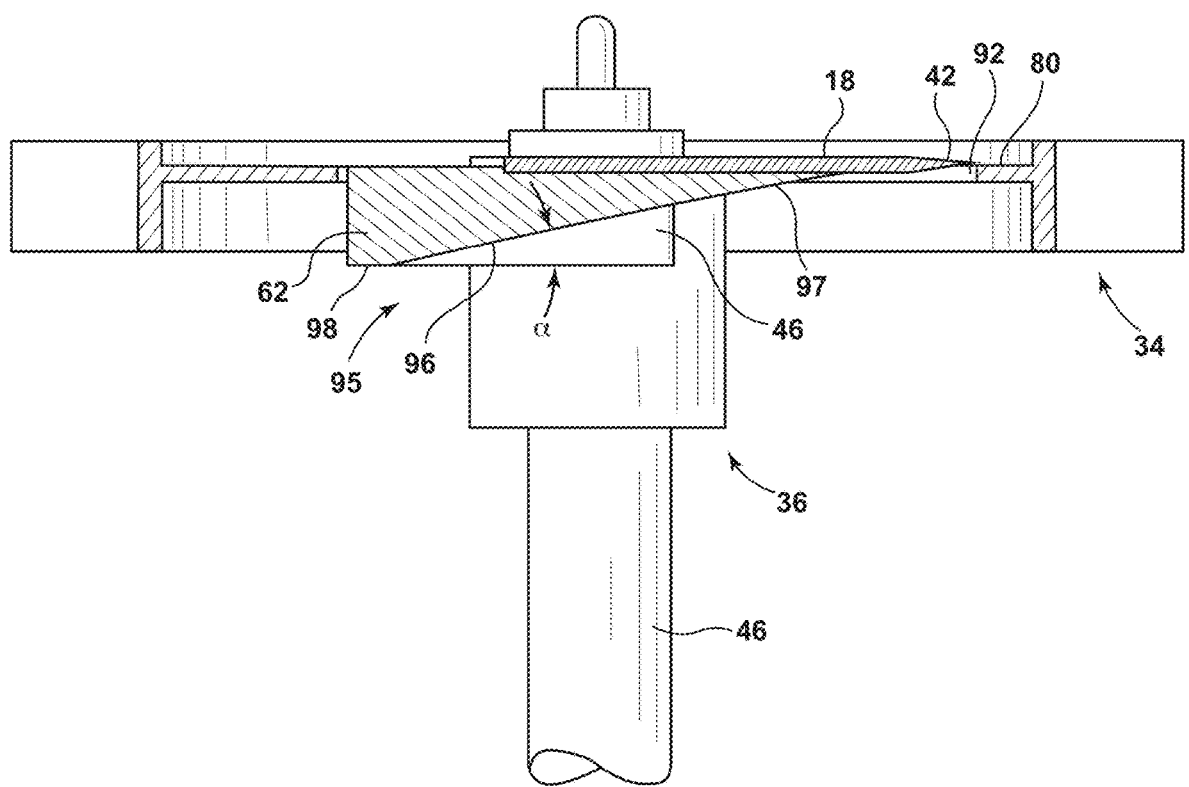
FIG. 5 is a partial cross-sectional view of the food slicer assembly of FIG. 2 taken along the line 5-5 shown in FIG. 4.

As best seen in FIGS. 2, 3 and 5, the mounting arm 62 has a ramp 95 defined therein, which guides food items from the throat 92 into the lower compartment 40 of the bowl 22. The surface 96 of the ramp 95 is sloped downward from an upper end 97 positioned adjacent to the cutting edge 42 to a lower end 98. As shown in FIG. 5, the surface 96 extends radially outward from the central shaft 46 to the end 64 of the mounting arm 62. The angle of inclination or slope of the surface 96 changes along the radially length of the surface 96, increasing from approximately 15 degrees at the end 64 to approximately 25 degrees near the central shaft 46. As shown in FIG. 5, the surface 96 has an angle of inclination α of approximately 22 degrees. In other embodiments, the surface 96 may be convex or concave in one or more directions. The central shaft 46 and the end 64 of the mounting arm 62 act as sidewalls for the surface 96 such that food items entering the throat 92 are guided down the ramp 95. In that way, the surface 96 is encapsulated or captured, thereby reducing the potential for food items to travel outside of the processing path and thus reducing unwanted debris.

A rim 90 extends upwardly from the outer perimeter of the disk's planar body 80. The rotating disk 34 has a diameter that is slightly less than the inner diameter of the bowl 22 such that the rim 90 is positioned adjacent to, but spaced slightly apart from, the inner wall of the bowl to permit rotation of the disk 34 within the bowl 22. The rotating disk 34 also includes a blade support 100 pivotably coupled to the rim 90.

Figure 6:
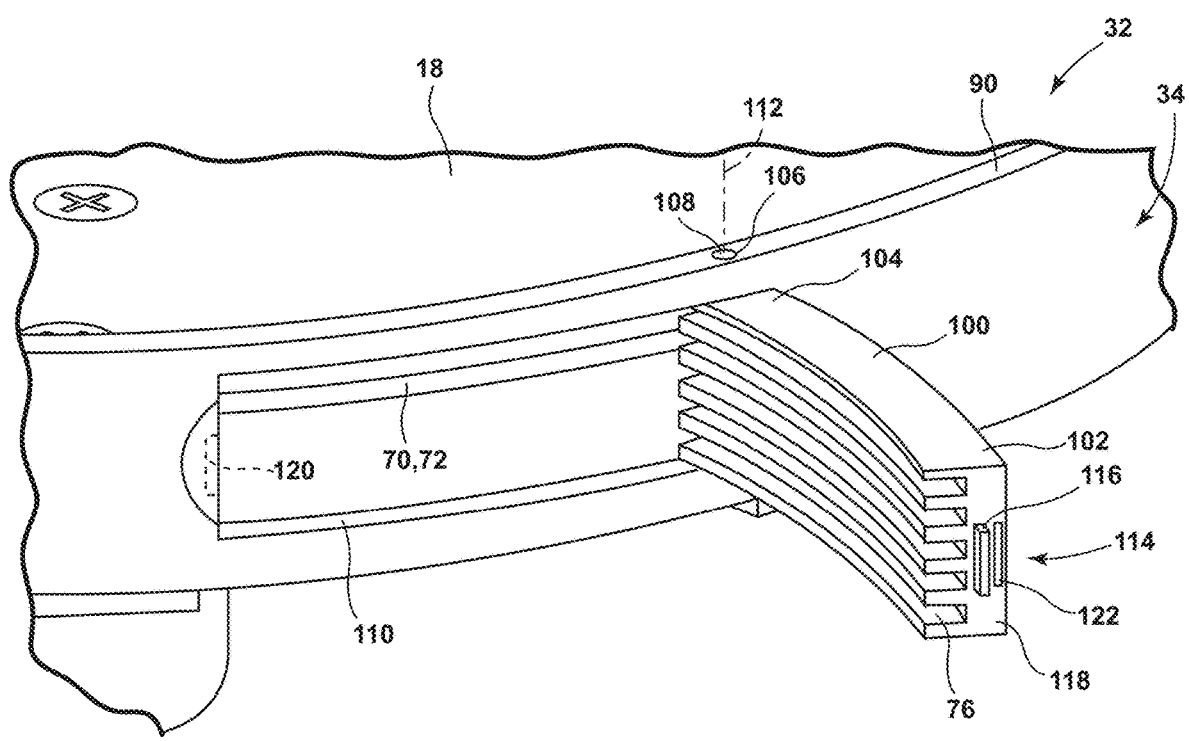
FIG. 6 is a fragmentary perspective view of a blade support of the food slicer assembly of FIG. 2.

As best seen in FIG. 6, the blade support 100 has the plurality of slots 76 formed therein. Each of the slots 76 extends parallel to the outer edge 72 of the cutting blade 18, and each of the slots 76 is sized to receive one of the flanges 70. In the illustrative embodiment, five slots 76 are formed in the blade support 100, and the slots 76 are spaced apart from each other by two millimeters. It will be appreciated that in other embodiments the blade support 100 may include additional or fewer slots and the spacing between the slots may be adjusted.

The blade support 100 has a body 102 extending from an end 104 hinged to the rim 90 at a pivot joint 106. The pivot joint 106 includes a cylindrical pivot pin 108 that extends through, and is positioned in, the rim 90 and the end 104. It will be appreciated that in other embodiments the pivot pin 108 may be formed as part of the blade support 100. As shown in FIGS. 4 and 6, the blade support 100 pivots relative to the rim 90 about an axis 112 defined by the pivot joint 106 between an engaged position and a disengaged position.

When the blade support 100 is in the engaged position (see FIGS. 2 and 3), one of the flanges 70 of the blade assembly 36 is received in a corresponding slot 76. In the engaged position, the body 102 is fully positioned in an opening 110 formed in the rim 90. When the blade support 100 is pivoted to the disengaged position, the body 102 extends outwardly from the opening 110, as shown in FIG. 6. In the disengaged position, the slots 76 are spaced apart from the flanges 70 of the blade assembly 36.

The rotating disk 34 includes a locking device 114 that secures the blade support 100 in the engaged position. In the illustrative embodiment, the locking device 114 includes a rectangular tab 116 extending from an end 118 of the body 102. When the blade support 100 is in the engaged position, the tab 116 is received in a recess 120 formed in the rim 90. Another recess 122 formed in the end 118 of the body 102 permits a user to apply sufficient force to release the blade support 100. It will be appreciated that in other embodiments the locking device 114 may take the form of a latch, pin, or other mechanism configured to maintain the blade support 100 in the engaged position.

As discussed above, the rotating disk 34 is movable upwardly and downwardly between a plurality of cutting positions relative to the cutting blade 18. As shown in FIG. 2, in one cutting position of the rotating disk 34, the outer edge 72 of the cutting blade 18 is received in the upper slot 124 of the blade support 100. In another cutting position, the lip 74 of the mounting arm 62 is received in the upper slot 124 of the blade support 100. In other cutting positions, the lip 74 may be positioned in any of the other slots 76 of the blade support 100. It will be appreciated that in other embodiments both flanges 70 of the blade assembly 36 may be received in slots 76 of the rotating disk 34. Additionally, in other embodiments, the blade assembly 36 may include only a single flange 70, such as, for example, the outer edge 72 of the cutting blade, which is received in a slot 76 at each of the cutting positions. In addition to providing support to the cutting blade 18, the engagement of one of the flanges 70 with one of the slots 76 inhibits or prevents the upward and downward movement of the rotating disk 34 when the blade support 100 is in the engaged position.

As shown in FIGS. 2 and 3, the food slicer assembly 32 includes a separate locking mechanism 130 positioned below the lower surface 84 of the rotating disk 34 that is configured to prevent the upward and downward movement of the rotating disk 34. In that way, the rotating disk 34 can be locked at one cutting position relative to the cutting blade 18. In the illustrative embodiment, the locking mechanism 130 is also configured to prevent the blade assembly 36 from rotating relative to the rotating disk 34.

As shown in FIGS. 2 and 3, the locking mechanism 130 includes a user-operated pin 132. The term "user-operated pin" as used herein refers to a pin that is manually operated by the user without the use of a tool. This is distinct from, and in contrast to, a set screw, hex bolt, or other fastener that is operated by the user through the use of a wrench, screw driver, or other tool. The user-operated pin 132 includes an elongated shaft 134 extending from an end 136 positioned outside of the sleeve 82 to an end 138 positioned in an aperture 140 defined in the central shaft 46. A button-head 142 sized to receive a finger of a user is formed at the end 136 of the shaft 134. The outer surface 144 of the shaft 134 includes a smooth section 146 and another section having a plurality of teeth 148 extending therefrom.

The shaft 134 of the user-operated pin 132 extends through a vertically-extending slot 150 defined in the sidewall 94 of the sleeve 82. The sidewall 94 includes a plurality of teeth 152 that extend into the slot 150. As indicated by arrow 154 in FIG. 2, the shaft 134 is movable between a locked position, in which the teeth 148 of the shaft 134 interdigitate or engage with a number of the teeth 152 of the sidewall 94, and an unlocked position, in which the teeth 148 of the user-operated pin are spaced apart from the teeth 152 of the sleeve. In the locked position, the rotating disk 34 is prevented from moving upward and downward relative to the cutting blade 18. It will be appreciated that in other embodiments the central shaft 46 may have a number of teeth configured to engage with the teeth 148 of the user-operated pin 132. It will also be appreciated that in other embodiments the user-operated pin 132, central shaft 46, and sleeve 82 may have any combination of slots, grooves, flanges, or other structures suitable for locking the rotating disk 34 in position relative to the cutting blade 18.

As shown in FIGS. 2 and 3, the aperture 140 defined in the central shaft 46 extends inwardly to a bottom 160. A cylindrical guide pin 162 is positioned in an opening 164 formed at the bottom 160 of the aperture 140 and extends away from the bottom 160 to an end. A spring 168 extends over the guide pin 162 is coupled at a spring end 170 to the end 138 of the user-operated pin 132. It will be appreciated that in other embodiments the guide pin 162 may take the form of a cross, hexagon, or other shape to provide guidance and stability to the spring 168. The spring 168 biases the user-operated pin 132 away from the bottom 160 of the aperture 140 thereby engaging the teeth 148 of the user-operated pin with the teeth 152 of the sleeve.

To change the distance D between the cutting edge 42 of the cutting blade 18 and the upper surface 44 of the rotating disk 34, the user unlocks the blade support 100 from the rim 90 and pivots the blade support 100 about the axis 112 from the engaged position to the disengaged position. The user then presses the button-head 142 to depress the user-operated pin 132. The spring 168 is compressed and the teeth 148 are moved out of contact with the teeth 152 of the sleeve 82. When the teeth 148 of the user-operated pin are spaced apart from the teeth 152 of the sleeve, the user may slide the rotating disk 34 upwardly or downwardly to another cutting position.

Once the rotating disk 34 is at the desired cutting position, the user releases the button-head 142, and the spring 168 urges the user-operated pin 132 away from the bottom 160 of the aperture 140, thereby reengaging the teeth 148 with the teeth 152 and locking the rotating disk 34 into the desired cutting position. The user pivots the blade support 100 from the disengaged position back to the engaged position, thereby preventing substantial deflection of the cutting blade 18 and providing an additional locking feature to prevent the upward/downward movement of the rotating disk 34 relative to the cutting blade 18.

It will be appreciated that in other embodiments the slicer assembly 32 may not include the blade support 100. In such embodiments, changing the distance D between the cutting edge 42 of the cutting blade 18 and the upper surface 44 of the rotating disk 34 would involve operating only the user-operated pin 132 of the locking mechanism 130. Similarly, in other embodiments including the blade support 100, the locking mechanism 130 may be omitted and replaced with a different thickness adjustment assembly operable by a user to vary the cutting thickness of the food processor 10. In those embodiments, changing the distance D between the cutting edge 42 of the cutting blade 18 and the upper surface 44 of the rotating disk 34 would involve, first, moving the blade support 100 to the disengaged position, which would release the rotating disk 34 for upward and downward movement, and, second, operating the thickness adjustment assembly.

Figure 7:
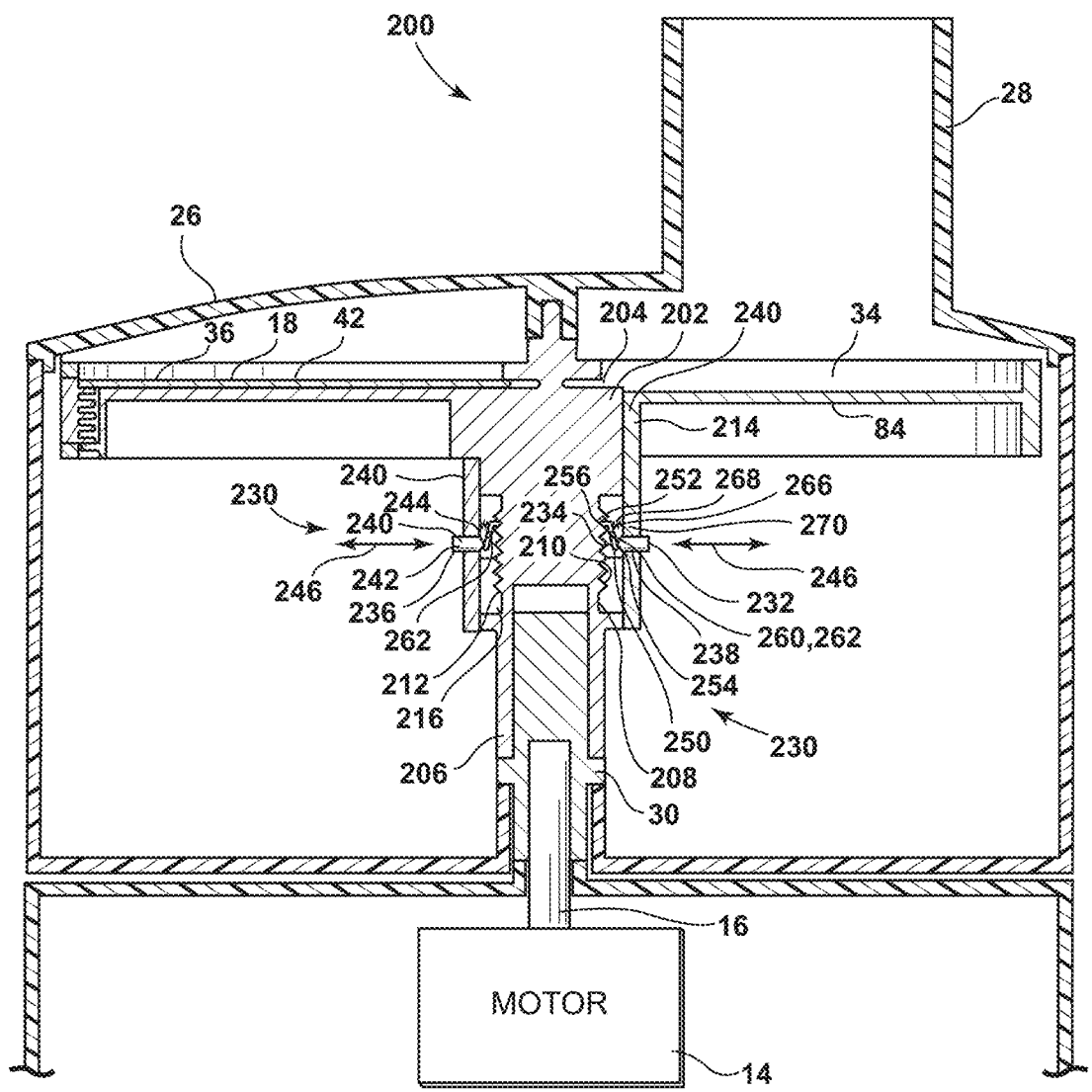
FIG. 7 is a partial cross-sectional view of another embodiment of a food processor.
Figure 8:
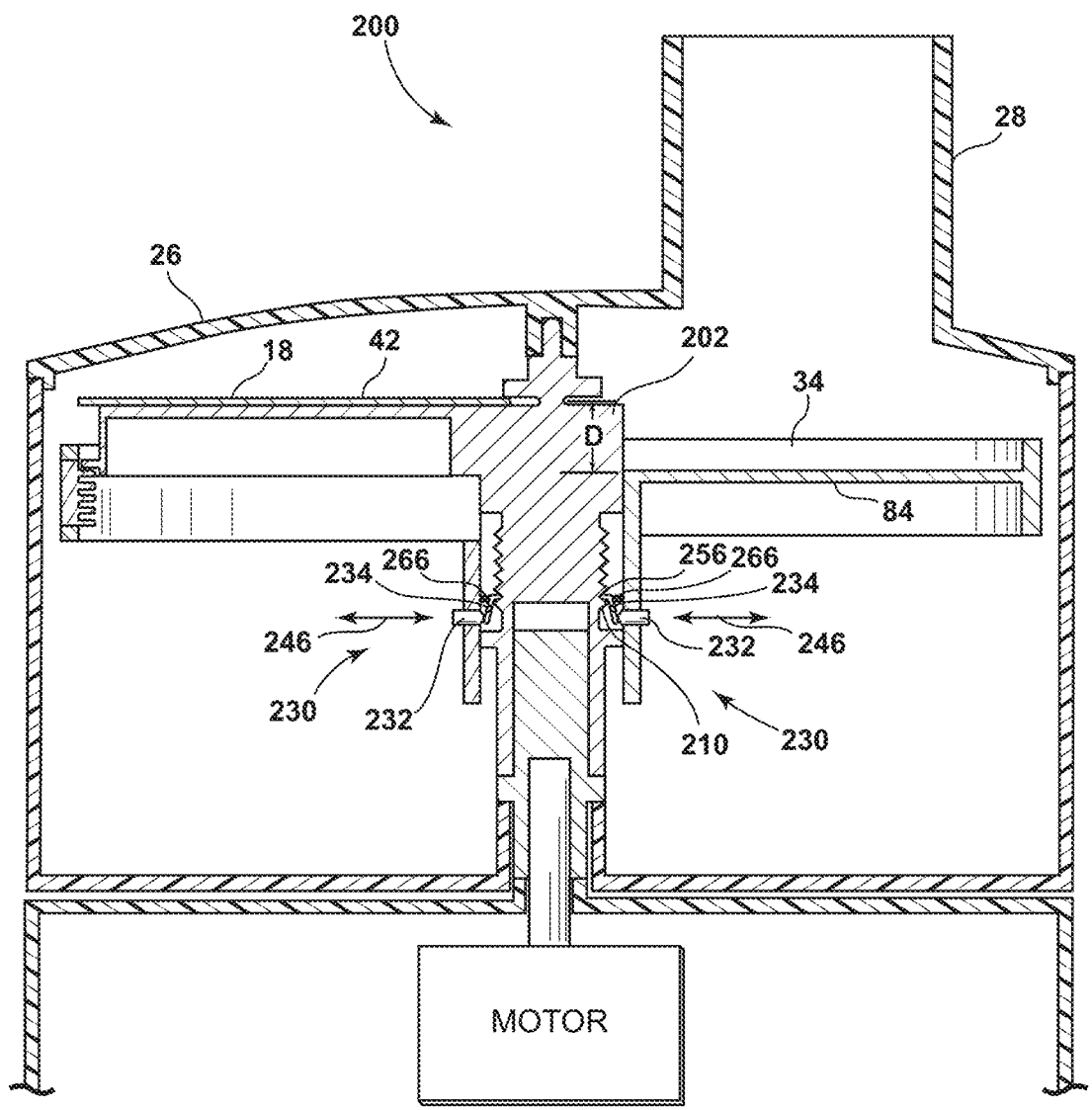
FIG. 8 is a view similar to FIG. 7, showing the rotating disk of the food slicer assembly of FIG. 7 in another position relative to the cutting blade.
Figure 9:
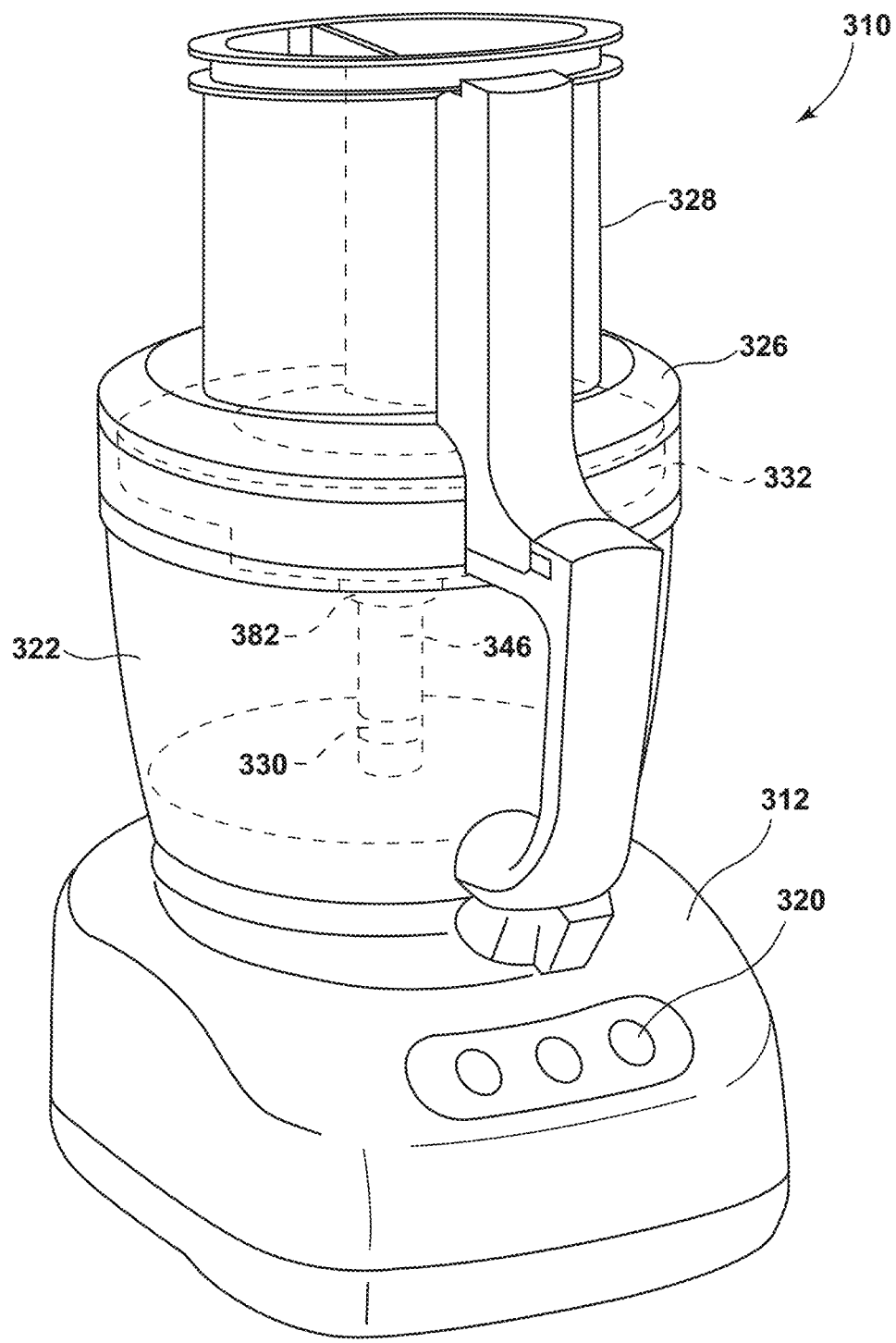
FIG. 9 is a perspective view of a food processor.

Referring now to FIGS. 7 and 8, another embodiment of a food slicer assembly is shown in a food processor. Many of the components of the food processor of FIGS. 7 and 8 are common with the components of the food processor of FIGS. 1-6. Such common components have common reference numerals. The food processor of FIGS. 7 and 8 is essentially the same as the food processor of FIGS. 1-6 except that the food slicer assembly (hereinafter food slicer assembly 200) includes a different locking mechanism to prevent the upward and downward movement rotating disk 34 relative to the cutting blade 18.

The slicer assembly 200, like the slicer assembly 32 described above in reference to FIGS. 1-6, includes a blade assembly 36 and a rotating disk 34. In addition to the cutting blade 18, the blade assembly 36 includes a central shaft 202 extending from an upper end 204 to a lower end 206. The lower end 206 receives the drive stem 30, thereby coupling the slicer assembly 200 to the motor 14. As shown in FIGS. 7 and 8, one section 208 of central shaft 202 has a plurality of teeth 210 extending outwardly from an outer surface 212 thereof.

The rotating disk 34 includes a central sleeve 214 extending downwardly from a lower surface 84 thereof. A passageway 216 extends through the sleeve 214 and receives the central shaft 202 of the blade assembly 36. Similar to the locking mechanism 130 described above in reference to FIGS. 1-6, a pair of locking mechanisms 230 are positioned below the lower surface 84 of the rotating disk 34.

Each locking mechanism 230 includes a user-operated pin 232 and a lever 234 coupled thereto. The user-operated pin 232 includes a shaft 236 that is positioned in a through-hole 238 formed in a sidewall 240 of the sleeve 214. The shaft 236 extends from an end 242 positioned outside of the sleeve 214 to an end 244 positioned in the passageway 216. The user-operated pin 232 moves back and forth within the through-hole 238, as indicated by arrow 246, between a locked position and an unlocked position.

The lever 234 is positioned within the passageway 216 and is pivotably coupled to the sidewall 240 of the sleeve 214. The lever 234 has a lever body 250 that extends from an upper end 252 to a lower end 254. The upper end 252 of lever body 250 includes a tip 256 that is sized to engage with the teeth 210 formed on the central shaft 202. The lower end 254 is coupled to the end 244 of the user-operated pin 232. As shown in FIGS. 7 and 8, the ends 244, 254 are in contact but are not fixed to each other. It will be appreciated that in other embodiments the ends 244, 254 may be pivotably fastened together.

The lever body 250 is pivotably coupled to the sidewall 240 at a pivot joint 260. The pivot joint 260 includes a cylindrical pivot pin 262 that extends through lever body 250 and the sidewall 240. The lever body 250 pivots about an axis defined by the pivot joint 260 between an engaged position and a disengaged position. In the engaged position, the tip 256 of the lever 234 is engaged with a number of the teeth 210 of the central shaft 202. When the lever 234 is in the engaged position, the rotating disk 34 is prevented from moving relative to the cutting blade 18. In the disengaged position, the tip 256 of the lever is spaced apart from the teeth 210 of the central shaft 202 such that the lever 234 does not prevent the rotating disk 34 from being moved to another cutting position.

A spring 266 is positioned in the passageway 216 of the sleeve 214 and is coupled to the upper end 252 of the lever body 250. The spring 266 extends from a spring end 268 coupled to the lever body 250 to a spring end 270 coupled to the sidewall 240 of the sleeve 214. The spring 266 biases the upper end 252 of the lever 234 toward the central shaft 202 thereby engaging the tip 256 with the teeth 210 of the central shaft 202.

When the user depresses the user-operated pin 232 of each locking mechanism 230, the user-operated pin 232 is moved from the locked position to the unlocked position. The shaft 236 of the user-operated pin 232 acts on the lower end 254 of the lever 234, thereby causing the lever 234 to pivot from the engaged position to the disengaged position. As the upper end 252 moves away from the central shaft 202, the spring 266 is compressed. Thus, when the user-operated pin 232 is in the unlocked position, the lever 234 is in the disengaged position.

When the user releases the user-operated pin 232, the spring 266 urges the upper end 252 toward the central shaft 202 thereby re-engaging the tip 256 with the teeth 210. As the lever 234 moves back to the engaged position, the lever body 250 urges the user-operated pin 232 back to the locked position.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food slicers, dicers, ice shavers and the like. Similarly, the blade support could be removable from the rotating disk 34 instead of being pivotably coupled to the rim. Additionally, the rotating disk could be directly coupled to the motor, and the blade could be movable relative to the rotating disk.

Referring to FIGS. 9-14, a food processor 310 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 310 has a base 312 that houses a motor 314 (shown schematically in FIG. 10) and a control unit (not shown). Under the control of the control unit, the motor's output shaft 316 drives a cutting blade 318 (see FIG. 10) to cut food items such as cheeses, meats, fruits, and vegetables. The base 312 also includes one or more buttons, switches, dials, or other types of controls 320. A user operates the controls 320 to control the operation of the motor 314 and hence the food processor 310. For instance, one of the controls 320 may be operable to turn the motor 314 on and off, while another control 320 may change the motor's speed.

As will be understood by those skilled in the art, the control unit may comprise analog and/or digital circuitry to process electrical signals received from the motor 314 (or other components of the food processor 310) and provide electrical control signals to the motor or other components of the food processor 310. For example, the control unit may be embodied as a microcontroller that executes firmware routines to control the operation of the food processor 310.

A removable bowl 322 is secured to the base 312. The bowl's handle facilitates placement of the bowl 322 on the base 312. The bowl 322 includes a removable lid 326 secured to its upper peripheral edge. The lid 326 has a feed tube 328 formed thereon through which food items such as cheeses, meats, fruits, and vegetables are inserted into the bowl 322 to be processed by the food processor 310. Collectively, the lid 326 and the bowl 322 define a processing chamber 324 where food items are processed by the cutting blade 318.

The bowl 322, lid 326, and feed tube 328 are generally made of a transparent or translucent plastic material, so that the contents of the food processor 310 can be viewed by a user without removing the lid 326 from the bowl 322. Moreover, one or more locking mechanisms may be used to lock the bowl to the base 312 and the lid 326 to the bowl 322.

Figure 10:
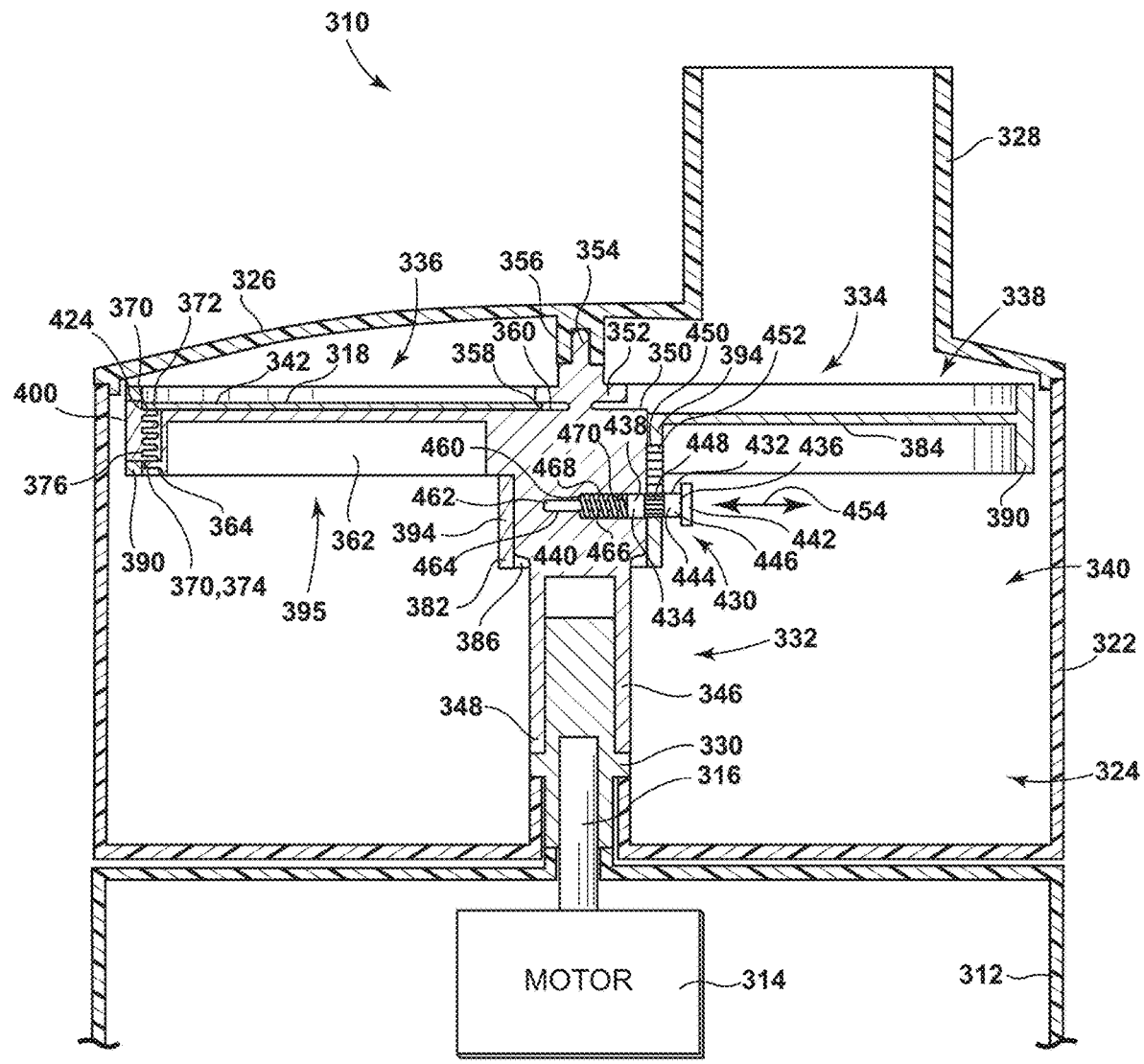
FIG. 10 is a partial cross-sectional view of the food processor of FIG. 1.
Figure 11:
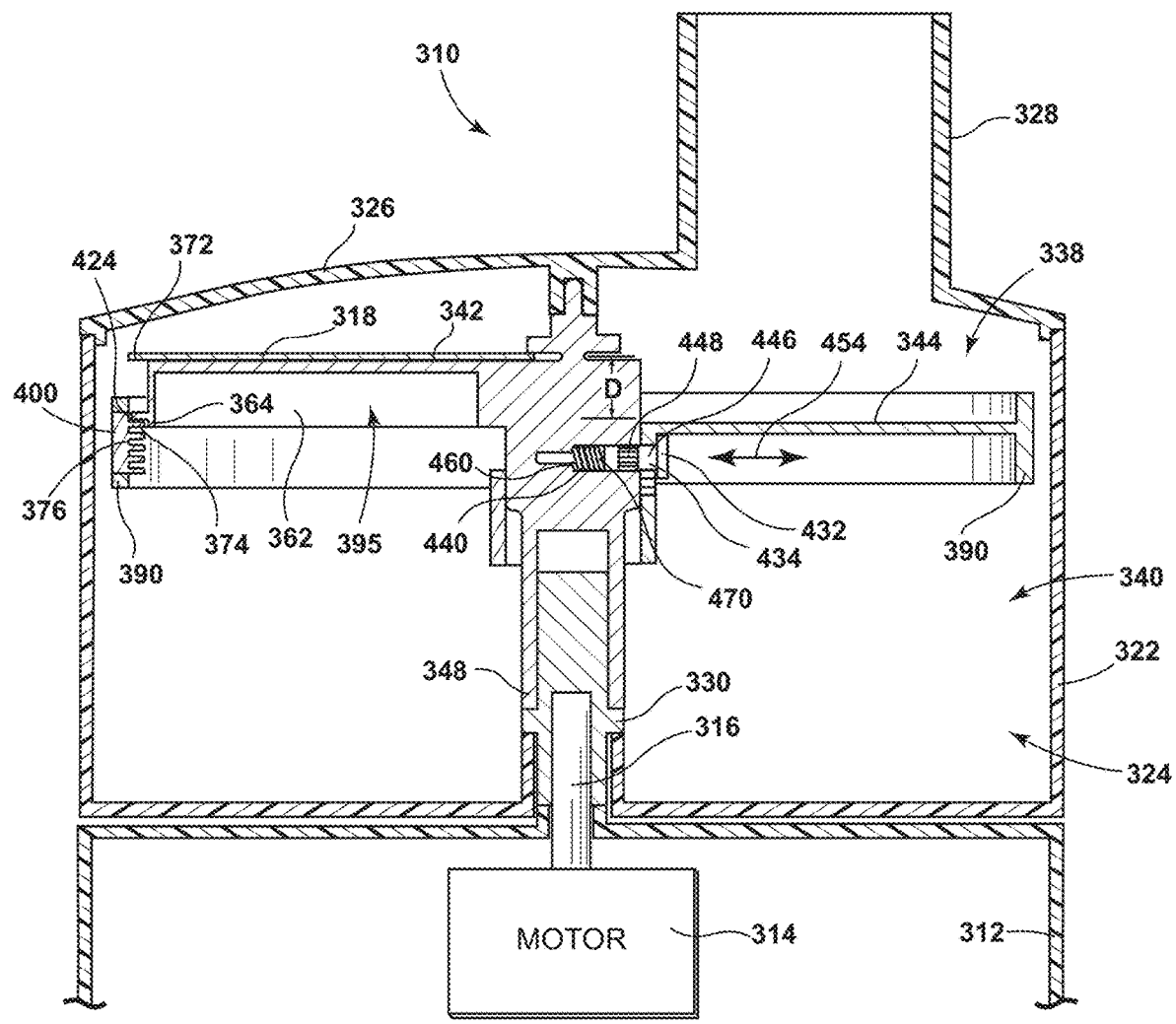
FIG. 11 is a view similar to FIG. 10, showing the rotating disk of the food slicer assembly of FIG. 10 in another position relative to the cutting blade.
Figure 12:
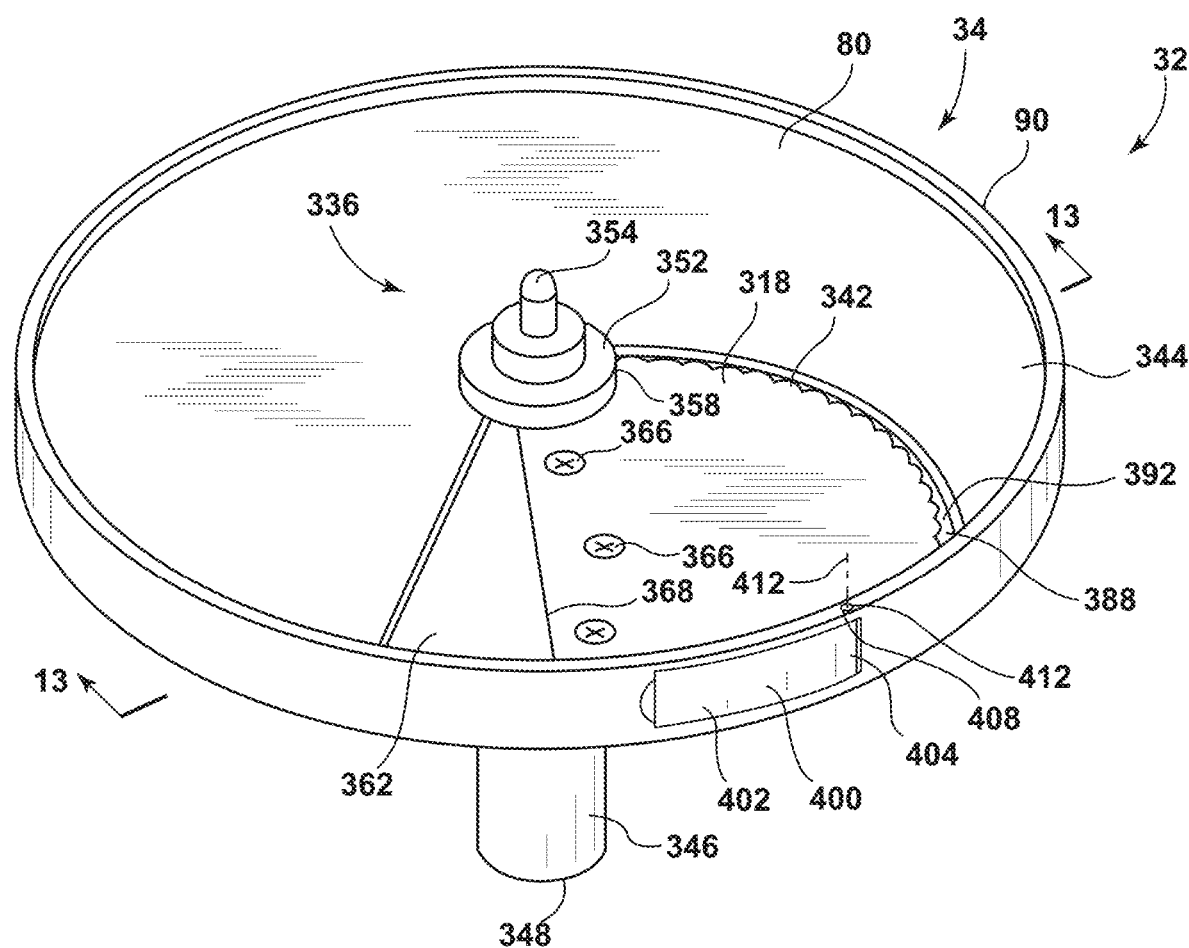
FIG. 12 is a perspective view of the food slicer assembly of FIG. 10.

As shown in FIGS. 10 and 11, when the removable bowl 322 is secured to the base 312, the output shaft 316 of the motor 314 is coupled to a drive stem 330. The drive stem 330 is in turn coupled to a food slicer assembly 332. As shown in FIGS. 10-12, the food slicer assembly 332 includes a rotating disk 334 and a blade assembly 336, with the cutting blade 318 being one component thereof. The rotating disk 334 effectively divides the processing chamber 324 into an upper compartment 338 located between the disk 334 and the lid 326, and a lower compartment 340 located below the rotating disk 334. A vertical distance, D, between the cutting edge 342 of the cutting blade 318 and the upper surface 344 of the rotating disk 334 defines a cutting thickness. In other words, the thickness of the pieces of food items cut by the food processor 310 is determined by the distance D between the cutting edge 342 of the cutting blade 18 and the upper surface 344 of the rotating disk 334. When the distance D between the cutting edge 342 of the cutting blade 318 and the upper surface 344 of the rotating disk 334 is increased, thicker pieces of food items are created, with thinner pieces of food items being created when the distance D between the cutting edge 342 of the cutting blade 318 and the upper surface 344 of the rotating disk 334 is decreased. As will be discussed in greater detail below, the rotating disk 334 is movable upwardly or downwardly between a plurality of cutting positions relative to the cutting blade 318 to vary the cutting thickness of the food processor 310, thereby creating thicker or thinner pieces of cut food items.

As shown in FIGS. 10-13, the blade assembly 336 includes a central shaft 346 that extends from a lower end 348 to an upper end 350. The lower end 348 receives the drive stem 330, thereby coupling the slicer assembly 332 to the output shaft 316 such that the slicer assembly 332 may be driven by the motor 314. The blade assembly 336 also includes a hub 352 positioned at the upper end 350 of the central shaft 346. As shown in FIG. 10, a tip 354 of the hub 352 is received in a guide sleeve 356 extending downward from the underside of the lid 326.

An inner edge 358 of the cutting blade 318 is received in a slot 360 formed between the hub 352 and the upper end 350 of the central shaft 346. As shown in FIGS. 10 and 11, the cutting blade 318 is secured within the slot 360 such that substantial deflection of the cutting blade 318 is inhibited when the cutting blade 318 cuts food items in the processing chamber 324. The cutting blade 318 is also secured to a mounting arm 362 extending away from the upper end 350 of the central shaft 346 to an end 364. A number of fasteners 366 (i.e., screws) (FIG. 12) positioned at a rear edge 368 of the cutting blade 318 extend into the mounting arm 362, thereby rigidly securing the cutting blade 318 to the mounting arm 362. It will be appreciated that in other embodiments the fasteners 366 may take the form of T-stakes, pins, posts, or other structures capable of securing the cutting blade 18 to the mounting arm 362. Additionally, the mounting arm 362 may include an overmold that receives the cutting blade 318.

As shown in FIGS. 10 and 11, the blade assembly 336 also includes a pair of flanges 370 extending beyond the end 364 of the mounting arm 362. One of the flanges 370 is an outer edge 372 of the cutting blade 318. Another flange 370 is an arcuate-shaped lip 374 extending outwardly from the end 364 of the mounting arm 362 that is parallel to the outer edge 372 of the cutting blade 318. As will be discussed in greater detail below, at least one of the flanges 370 is received in one of a plurality of slots 376 formed in the rotating disk 334 at each of the cutting positions.

The rotating disk 334 includes a planar body 380 and a central sleeve 382 extending downwardly from a lower surface 384 thereof. It will be appreciated that one or more of the components of the rotating disk 334 may be formed from plastic or a metallic material. The rotating disk 334 includes a passageway 386 that extends through the sleeve 382 and receives the central shaft 346 of the blade assembly 336. The planar body 380 also has a contoured opening 388 extending from the upper surface 344 to the lower surface 384. The contoured opening 388 is sized to receive the mounting arm 362 of the blade assembly 336. When the blade assembly 336 is positioned in the rotating disk 334, a gap or throat 392 is defined between the cutting edge 342 and the body 380, as shown in FIG. 12.

During operation, the motor 314 causes the blade assembly 336 to rotate. The blade assembly 336 acts on a sidewall 394 of the sleeve 382 such that the rotating disk 334 and the blade assembly 336 rotate together. Food items inserted through the feed tube 328 are urged into contact with the upper surface 344 of the rotating disk 334 while being acted upon (i.e., cut) by the cutting blade 318. Cut food items, along with other food items small enough to fit within the throat 392, pass from the upper compartment 338 into the lower compartment 340 through the throat 392.

Figure 13:
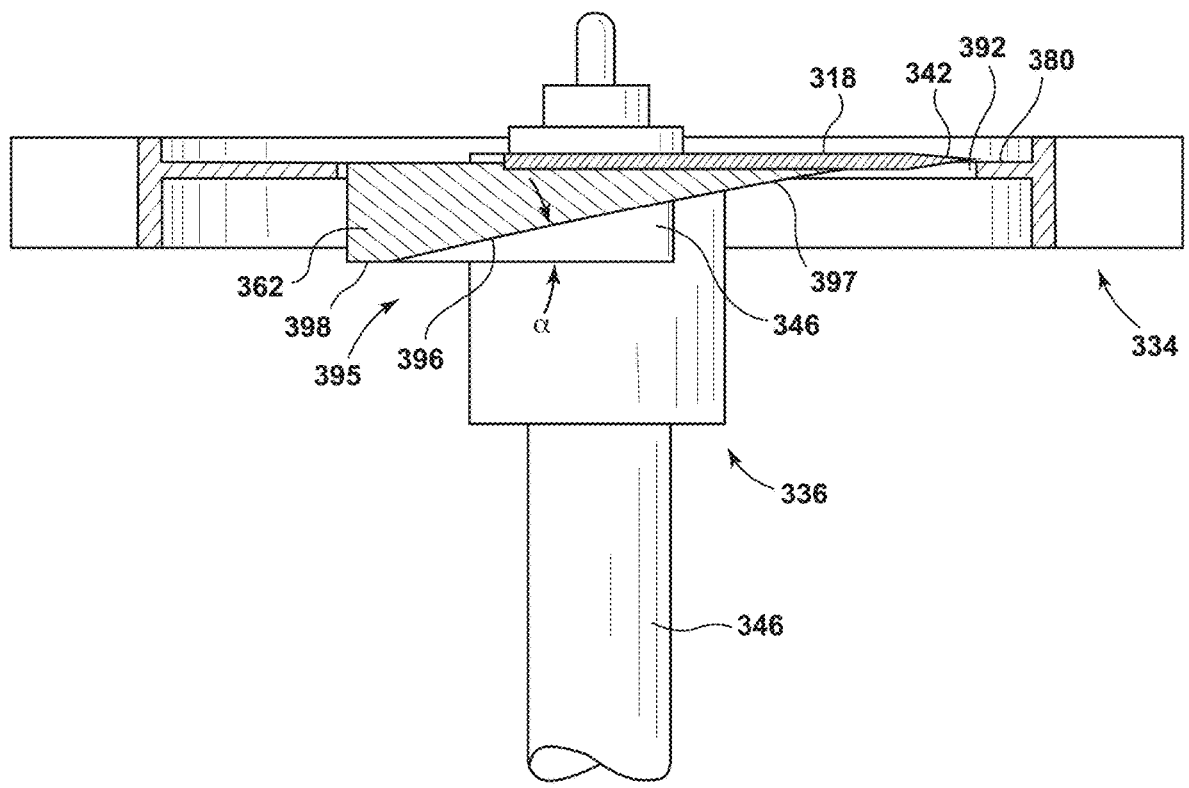
FIG. 13 is a partial cross-sectional view of the food slicer assembly of FIG. 10 taken along the line 13-13 shown in FIG. 12.

As best seen in FIG. 13, the mounting arm 362 has a ramp 395 defined therein, which guides food items from the throat 392 into the lower compartment 340 of the bowl 322. The surface 396 of the ramp 395 is sloped downward from an upper end 397 positioned adjacent to the cutting edge 342 to a lower end 398. As shown in FIGS. 10 and 11, the surface 396 extends radially outward from the central shaft 346 to the end 364 of the mounting arm 362. The angle of inclination or slope of the surface 396 changes along the radially length of the surface 396, increasing from approximately 15 degrees at the end 364 to approximately 25 degrees near the central shaft 346. As shown in FIG. 13, the surface 396 has an angle of inclination α of approximately 22 degrees. In other embodiments, the surface 396 may be convex or concave in one or more directions. The central shaft 346 and the end 364 of the mounting arm 362 act as sidewalls for the surface 396 such that food items entering the throat 392 are guided down the ramp 395. In that way, the surface 396 is encapsulated or captured, thereby reducing the potential for food items to travel outside of the processing path and thus reducing unwanted debris.

A rim 390 extends upwardly from the outer perimeter of the disk's planar body 380. The rotating disk 334 has a diameter that is slightly less than the inner diameter of the bowl 322 such that the rim 390 is positioned adjacent to, but spaced slightly apart from, the inner wall of the bowl to permit rotation of the disk 334 within the bowl 322. The rotating disk 334 also includes a blade support 400 pivotably coupled to the rim 90.

Figure 14:
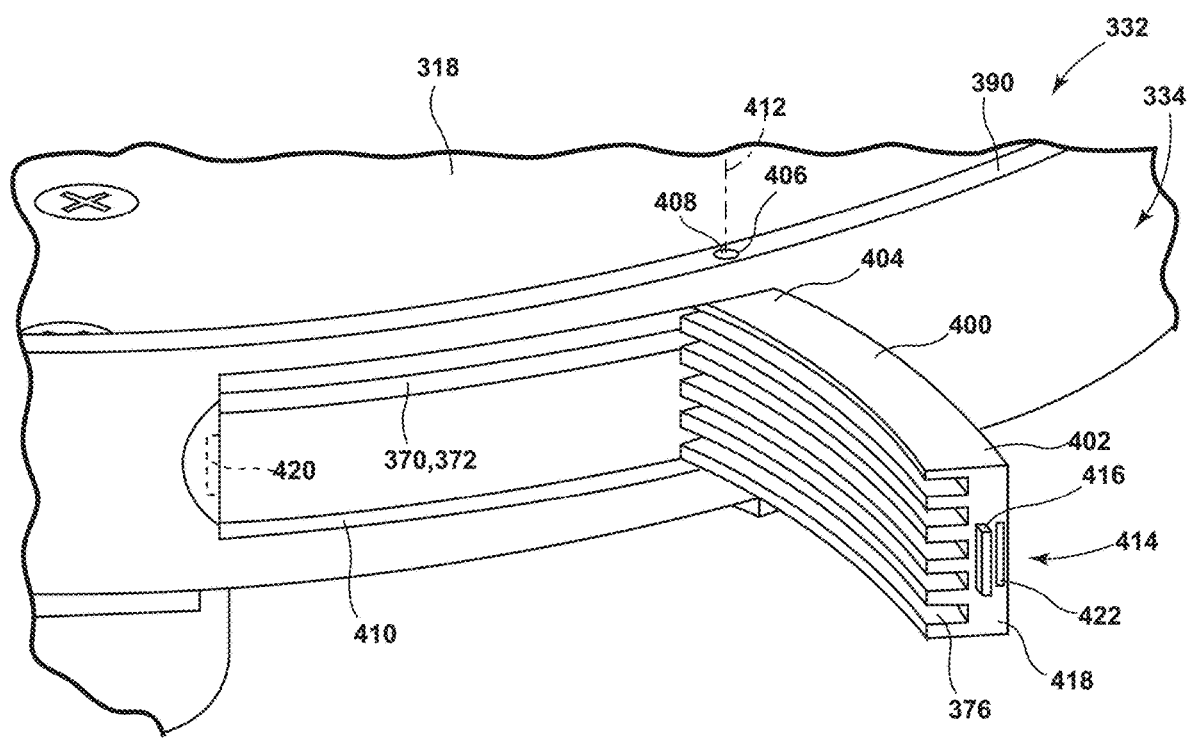
FIG. 14 is a fragmentary perspective view of a blade support of the food slicer assembly of FIG. 10.

As best seen in FIG. 14, the blade support 400 has the plurality of slots 376 formed therein. Each of the slots 376 extends parallel to the outer edge 372 of the cutting blade 318, and each of the slots 376 is sized to receive one of the flanges 370. In the illustrative embodiment, five slots 376 are formed in the blade support 400, and the slots 376 are spaced apart from each other by two millimeters. It will be appreciated that in other embodiments the blade support 400 may include additional or fewer slots and the spacing between the slots may be adjusted.

The blade support 400 has a body 402 extending from an end 404 hinged to the rim 390 at a pivot joint 406. The pivot joint 406 includes a cylindrical pivot pin 408 that extends through, and is positioned in, the rim 390 and the end 404. It will be appreciated that in other embodiments the pivot pin 408 may be formed as part of the blade support 400. As shown in FIGS. 12 and 14, the blade support 400 pivots relative to the rim 390 about an axis 412 defined by the pivot joint 406 between an engaged position and a disengaged position.

When the blade support 400 is in the engaged position (see FIGS. 10 and 11), one of the flanges 370 of the blade assembly 336 is received in a corresponding slot 376. In the engaged position, the body 402 is fully positioned in an opening 410 formed in the rim 390. When the blade support 400 is pivoted to the disengaged position, the body 402 extends outwardly from the opening 410, as shown in FIG. 14. In the disengaged position, the slots 376 are spaced apart from the flanges 370 of the blade assembly 336.

The rotating disk 334 includes a locking device 414 that secures the blade support 400 in the engaged position. In the illustrative embodiment, the locking device 414 includes a rectangular tab 416 extending from an end 418 of the body 402. When the blade support 400 is in the engaged position, the tab 416 is received in a recess 420 formed in the rim 390. Another recess 422 formed in the end 418 of the body 402 permits a user to apply sufficient force to release the blade support 400. It will be appreciated that in other embodiments the locking device 414 may take the form of a latch, pin, or other mechanism configured to maintain the blade support 400 in the engaged position.

As discussed above, the rotating disk 334 is movable upwardly and downwardly between a plurality of cutting positions relative to the cutting blade 318. As shown in FIG. 10, in one cutting position of the rotating disk 334, the outer edge 372 of the cutting blade 318 is received in the upper slot 424 of the blade support 400. In another cutting position, the lip 374 of the mounting arm 362 is received in the upper slot 424 of the blade support 400. In other cutting positions, the lip 374 may be positioned in any of the other slots 376 of the blade support 400. It will be appreciated that in other embodiments both flanges 370 of the blade assembly 336 may be received in slots 376 of the rotating disk 334. Additionally, in other embodiments, the blade assembly 336 may include only a single flange 370, such as, for example, the outer edge 372 of the cutting blade, which is received in a slot 376 at each of the cutting positions. In addition to providing support to the cutting blade 318, the engagement of one of the flanges 370 with one of the slots 376 inhibits or prevents the upward and downward movement of the rotating disk 334 when the blade support 400 is in the engaged position.

As shown in FIGS. 10 and 11, the food slicer assembly 332 includes a separate locking mechanism 430 positioned below the lower surface 384 of the rotating disk 334 that is configured to prevent the upward and downward movement of the rotating disk 334. In that way, the rotating disk 334 can be locked at one cutting position relative to the cutting blade 318. In the illustrative embodiment, the locking mechanism 430 is also configured to prevent the blade assembly 336 from rotating relative to the rotating disk 334.

As shown in FIGS. 10 and 11, the locking mechanism 430 includes a user-operated pin 432. The term "user-operated pin" as used herein refers to a pin that is manually operated by the user without the use of a tool. This is distinct from, and in contrast to, a set screw, hex bolt, or other fastener that is operated by the user through the use of a wrench, screw driver, or other tool. The user-operated pin 432 includes an elongated shaft 434 extending from an end 436 positioned outside of the sleeve 382 to an end 438 positioned in an aperture 440 defined in the central shaft 346. A button-head 442 sized to receive a finger of a user is formed at the end 436 of the shaft 434. The outer surface 444 of the shaft 434 includes a smooth section 446 and another section having a plurality of teeth 448 extending therefrom.

The shaft 434 of the user-operated pin 432 extends through a vertically-extending slot 450 defined in the sidewall 394 of the sleeve 382. The sidewall 394 includes a plurality of teeth 452 that extend into the slot 450. As indicated by arrow 454 in FIG. 10, the shaft 434 is movable between a locked position, in which the teeth 448 of the shaft 434 interdigitate or engage with a number of the teeth 452 of the sidewall 394, and an unlocked position, in which the teeth 348 of the user-operated pin are spaced apart from the teeth 352 of the sleeve. In the locked position, the rotating disk 334 is prevented from moving upward and downward relative to the cutting blade 318. It will be appreciated that in other embodiments the central shaft 346 may have a number of teeth configured to engage with the teeth 448 of the user-operated pin 432. It will also be appreciated that in other embodiments the user-operated pin 432, central shaft 346, and sleeve 382 may have any combination of slots, grooves, flanges, or other structures suitable for locking the rotating disk 334 in position relative to the cutting blade 318.

As shown in FIGS. 10 and 11, the aperture 440 defined in the central shaft 346 extends inwardly to a bottom 460. A cylindrical guide pin 462 is positioned in an opening 464 formed at the bottom 460 of the aperture 440 and extends away from the bottom 460 to an end. A spring 368 extends over the guide pin 462 and is coupled at a spring end 470 to the end 438 of the user-operated pin 432. It will be appreciated that in other embodiments the guide pin 462 may take the form of a cross, hexagon, or other shape to provide guidance and stability to the spring 468. The spring 468 biases the user-operated pin 432 away from the bottom 460 of the aperture 440 thereby engaging the teeth 448 of the user-operated pin with the teeth 452 of the sleeve.

To change the distance D between the cutting edge 442 of the cutting blade 418 and the upper surface 344 of the rotating disk 334, the user unlocks the blade support 400 from the rim 390 and pivots the blade support 400 about the axis 412 from the engaged position to the disengaged position. The user then presses the button-head 442 to depress the user-operated pin 432. The spring 468 is compressed and the teeth 448 are moved out of contact with the teeth 452 of the sleeve 382. When the teeth 448 of the user-operated pin are spaced apart from the teeth 452 of the sleeve, the user may slide the rotating disk 334 upwardly or downwardly to another cutting position.

Once the rotating disk 334 is at the desired cutting position, the user releases the button-head 442, and the spring 468 urges the user-operated pin 432 away from the bottom 460 of the aperture 440, thereby reengaging the teeth 448 with the teeth 452 and locking the rotating disk 334 into the desired cutting position. The user pivots the blade support 400 from the disengaged position back to the engaged position, thereby preventing substantial deflection of the cutting blade 318 and providing an additional locking feature to prevent the upward/downward movement of the rotating disk 334 relative to the cutting blade 318.

It will be appreciated that in other embodiments the slicer assembly 332 may not include the blade support 400. In such embodiments, changing the distance D between the cutting edge 342 of the cutting blade 318 and the upper surface 344 of the rotating disk 334 would involve operating only the user-operated pin 432 of the locking mechanism 430. Similarly, in other embodiments including the blade support 400, the locking mechanism 430 may be omitted and replaced with a different thickness adjustment assembly operable by a user to vary the cutting thickness of the food processor 310. In those embodiments, changing the distance D between the cutting edge 342 of the cutting blade 318 and the upper surface 344 of the rotating disk 334 would involve, first, moving the blade support 400 to the disengaged position, which would release the rotating disk 334 for upward and downward movement, and, second, operating the thickness adjustment assembly.

Figure 15:
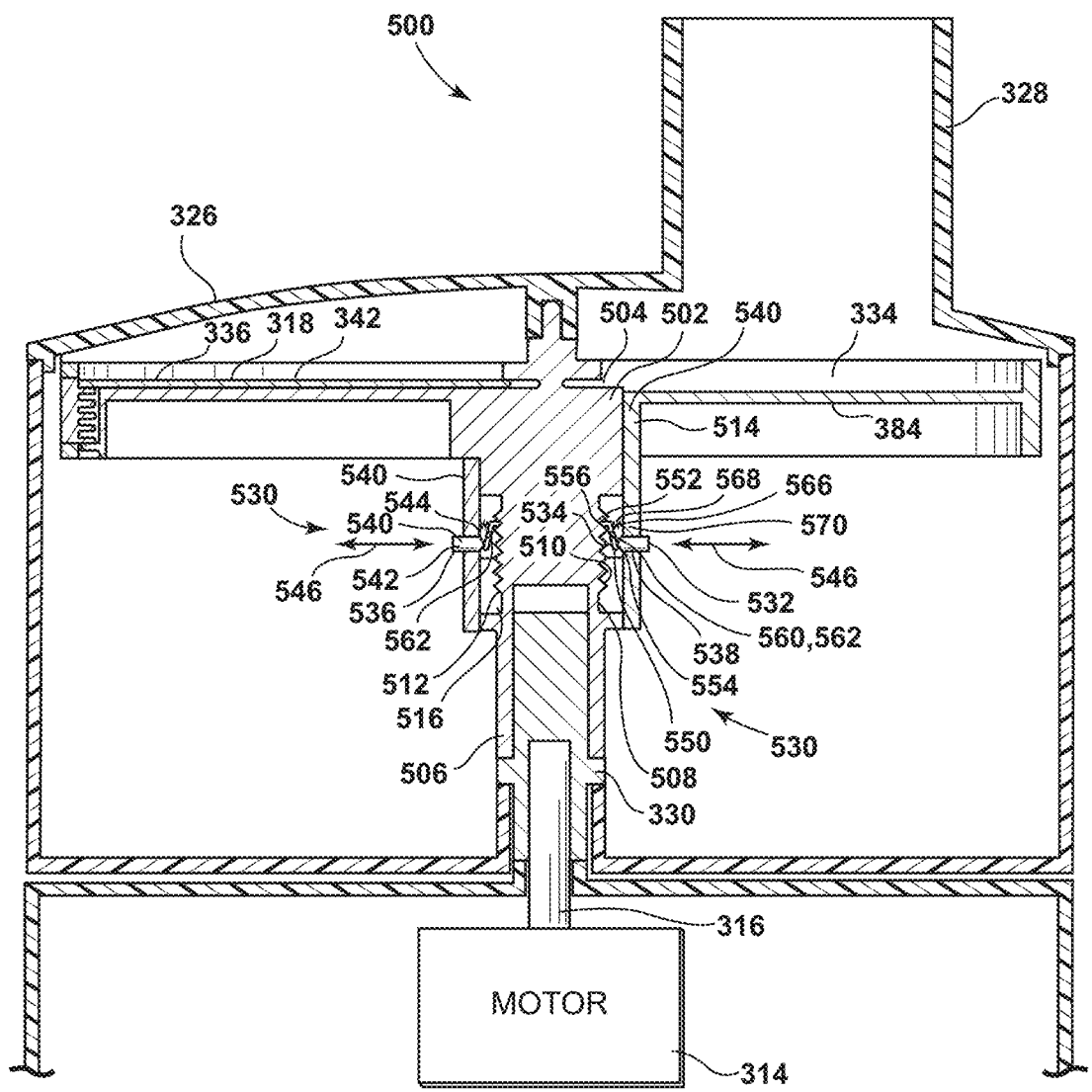
FIG. 15 is a partial cross-sectional view of another embodiment of a food processor.
Figure 16:
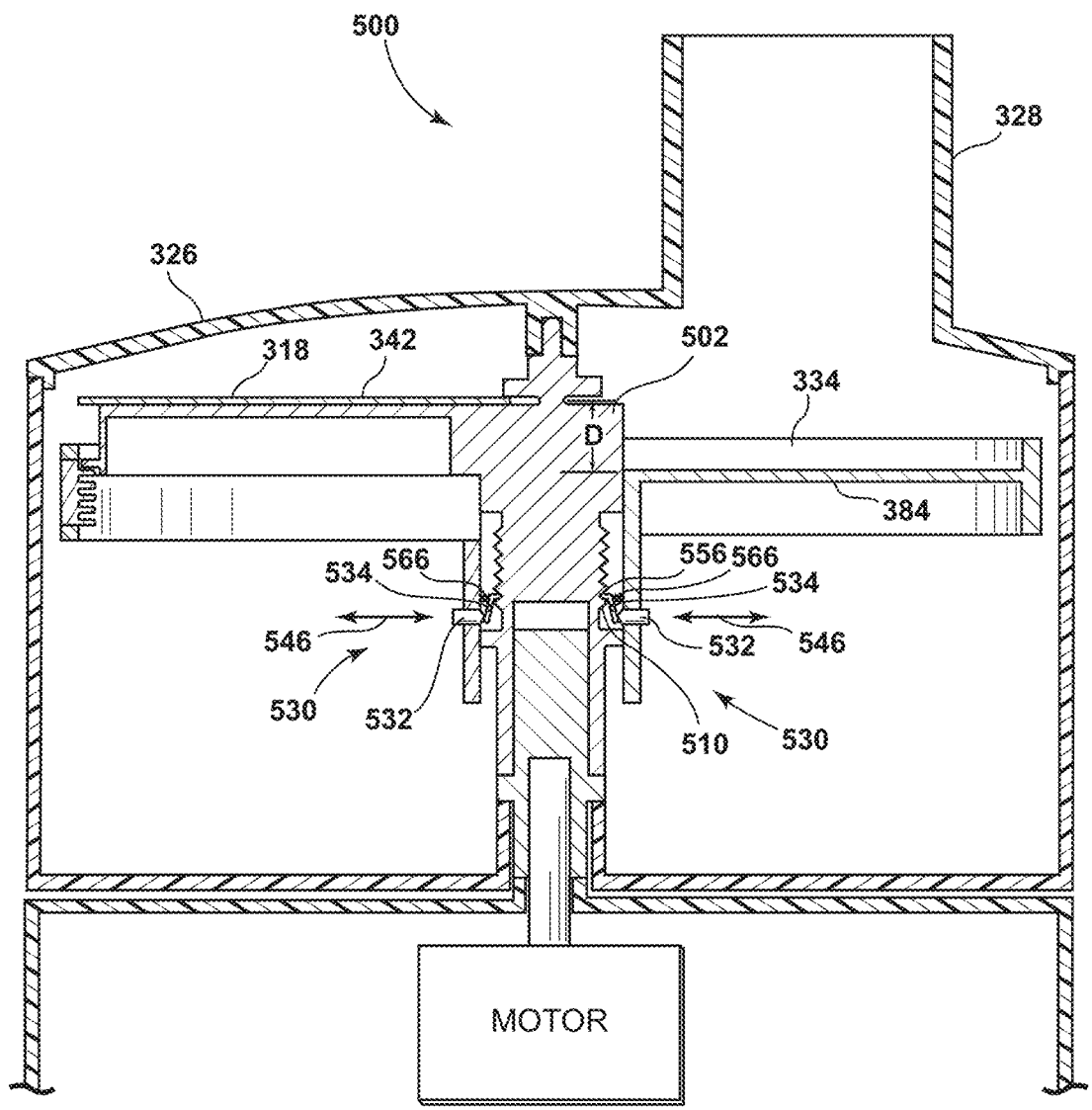
FIG. 16 is a view similar to FIG. 15, showing the rotating disk of the food slicer assembly of FIG. 15 in another position relative to the cutting blade.

Referring now to FIGS. 15 and 16 another embodiment of a food slicer assembly is shown in a food processor. Many of the components of the food processor of FIGS. 15 and 16 are common with the components of the food processor of FIGS. 9-14. Such common components have common reference numerals. The food processor of FIGS. 15 and 16 is essentially the same as the food processor of FIGS. 9-14 except that the food slicer assembly (hereinafter food slicer assembly 500) includes a different locking mechanism to prevent the upward and downward movement rotating disk 334 relative to the cutting blade 318.

The slicer assembly 500, like the slicer assembly 332 described above in reference to FIGS. 9-14, includes a blade assembly 336 and a rotating disk 334. In addition to the cutting blade 318, the blade assembly 336 includes a central shaft 502 extending from an upper end 504 to a lower end 506. The lower end 506 receives the drive stem 330, thereby coupling the slicer assembly 500 to the motor 314. As shown in FIGS. 15 and 16, one section 508 of central shaft 502 has a plurality of teeth 510 extending outwardly from an outer surface 512 thereof.

The rotating disk 334 includes a central sleeve 514 extending downwardly from a lower surface 384 thereof. A passageway 516 extends through the sleeve 514 and receives the central shaft 502 of the blade assembly 336. Similar to the locking mechanism 430 described above in reference to FIGS. 9-14, a pair of locking mechanisms 530 are positioned below the lower surface 384 of the rotating disk 334.

Each locking mechanism 530 includes a user-operated pin 532 and a lever 534 coupled thereto. The user-operated pin 532 includes a shaft 536 that is positioned in a through-hole 538 formed in a sidewall 540 of the sleeve 514. The shaft 536 extends from an end 542 positioned outside of the sleeve 514 to an end 544 positioned in the passageway 516. The user-operated pin 532 moves back and forth within the through-hole 538, as indicated by arrow 546, between a locked position and an unlocked position.

The lever 534 is positioned within the passageway 516 and is pivotably coupled to the sidewall 541 of the sleeve 514. The lever 534 has a lever body 550 that extends from an upper end 552 to a lower end 554. The upper end 552 of lever body 550 includes a tip 556 that is sized to engage with the teeth 510 formed on the central shaft 502. The lower end 554 is coupled to the end 544 of the user-operated pin 532. As shown in FIGS. 15 and 16, the ends 544, 554 are in contact but are not fixed to each other. It will be appreciated that in other embodiments the ends 544, 354 may be pivotably fastened together.

The lever body 550 is pivotably coupled to the sidewall 540 at a pivot joint 560. The pivot joint 560 includes a cylindrical pivot pin 562 that extends through lever body 550 and the sidewall 540. The lever body 550 pivots about an axis defined by the pivot joint 560 between an engaged position and a disengaged position. In the engaged position, the tip 556 of the lever 534 is engaged with a number of the teeth 510 of the central shaft 502. When the lever 534 is in the engaged position, the rotating disk 334 is prevented from moving relative to the cutting blade 318. In the disengaged position, the tip 556 of the lever is spaced apart from the teeth 510 of the central shaft 502 such that the lever 534 does not prevent the rotating disk 334 from being moved to another cutting position.

A spring 566 is positioned in the passageway 516 of the sleeve 514 and is coupled to the upper end 552 of the lever body 550. The spring 566 extends from a spring end 568 coupled to the lever body 550 to a spring end 570 coupled to the sidewall 540 of the sleeve 514. The spring 566 biases the upper end 552 of the lever 534 toward the central shaft 502 thereby engaging the tip 556 with the teeth 510 of the central shaft 502.

When the user depresses the user-operated pin 532 of each locking mechanism 530, the user-operated pin 532 is moved from the locked position to the unlocked position. The shaft 536 of the user-operated pin 532 acts on the lower end 554 of the lever 534, thereby causing the lever 534 to pivot from the engaged position to the disengaged position. As the upper end 552 moves away from the central shaft 502, the spring 566 is compressed. Thus, when the user-operated pin 532 is in the unlocked position, the lever 534 is in the disengaged position.

When the user releases the user-operated pin 532, the spring 566 urges the upper end 552 toward the central shaft 502 thereby re-engaging the tip 556 with the teeth 510. As the lever 534 moves back to the engaged position, the lever body 550 urges the user-operated pin 532 back to the locked position.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 310 is herein illustrated as a conventional domestic food processor, the features and aspects disclosed herein can also be implemented in other types of food processing devices such as automatic food slicers, dicers, ice shavers and the like. Similarly, the blade support could be removable from the rotating disk 334 instead of being pivotably coupled to the rim. Additionally, the rotating disk could be directly coupled to the motor, and the blade could be movable relative to the rotating disk.

Figure 17:
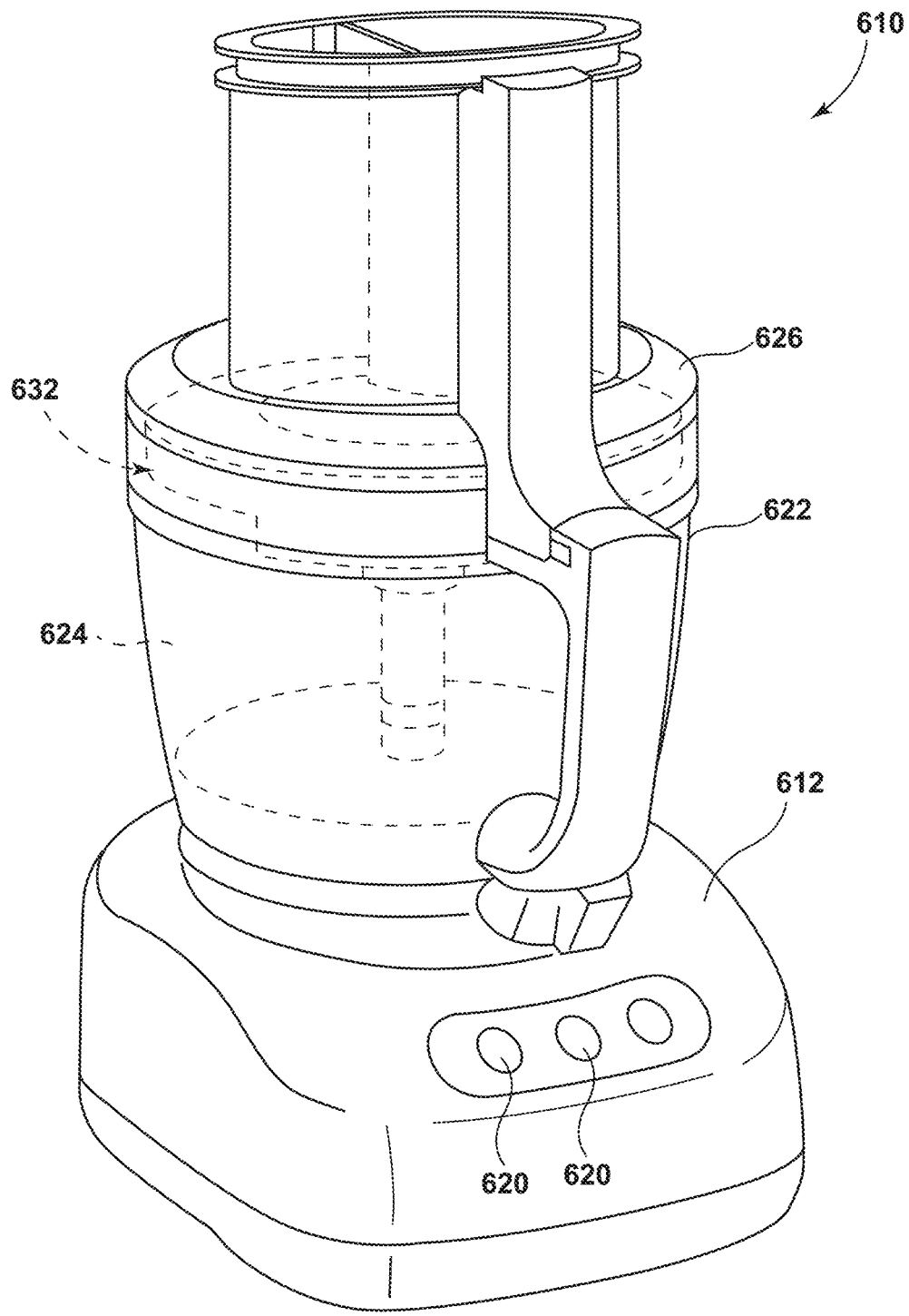
FIG. 17 is a perspective view of a food processor.

Referring to FIG. 17, a food processing device or food processor 610 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 610 has a base 612 that houses a motor 614 (shown schematically in FIG. 18) and a control unit (not shown). Under the control of the control unit, the motor's output shaft 616 drives a cutting blade 618 (see FIG. 18) to cut food items such as cheeses, meats, fruits, and vegetables. The base 612 also includes one or more buttons, switches, dials, or other types of controls 620. A user operates the controls 620 to control the operation of the motor 614 and hence the food processor 610. For instance, one of the controls 620 may be operable to turn the motor 614 on and off, while another control 620 may change the motor's speed.

As will be understood by those skilled in the art, the control unit may comprise analog and/or digital circuitry to process electrical signals received from the motor 614 (or other components of the food processor 610) and provide electrical control signals to the motor or other components of the food processor 610. For example, the control unit may be embodied as a microcontroller that executes firmware routines to control the operation of the food processor 610.

A removable bowl 622 is secured to the base 612. The bowl's handle facilitates placement of the bowl 622 on the base 612. The bowl 622 includes a removable lid 626 secured to its upper peripheral edge. The lid 626 has a feed tube 628 formed thereon through which food items such as fruits and vegetables are inserted into the bowl 622 to be processed by the food processor 610. Collectively, the lid 626 and the bowl 622 define a processing chamber 624 where food items are processed by the cutting blade 618.

The bowl 622, lid 626, and feed tube 628 are generally made of a transparent or translucent plastic material, so that the contents of the food processor 610 can be viewed by a user without removing the lid 626 from the bowl 622. Moreover, one or more locking mechanisms may be used to lock the bowl to the base 612 and the lid 626 to the bowl 622.

Figure 18:
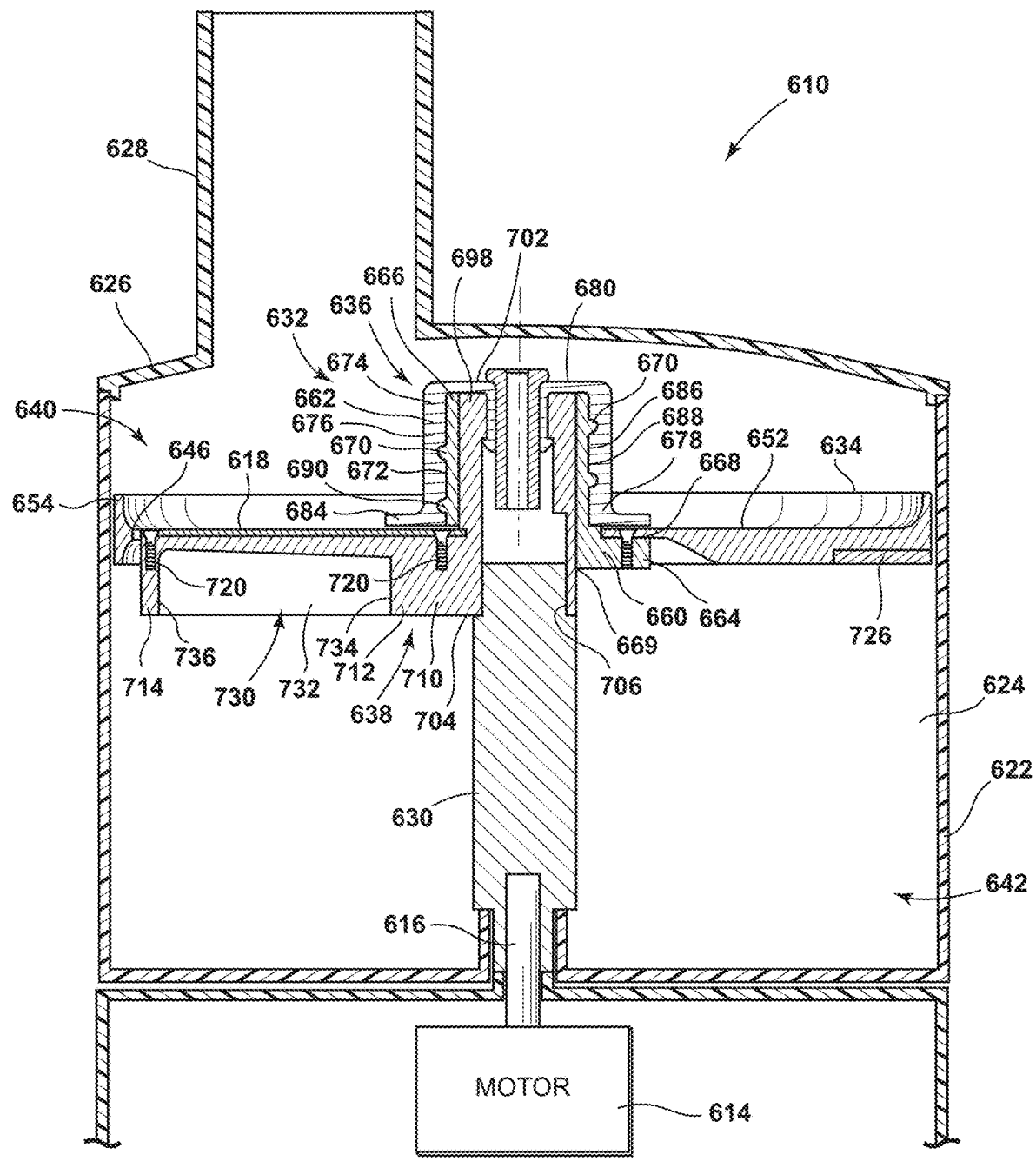
FIG. 18 is a partial cross-sectional view of the food processor of FIG. 17.
Figure 19:
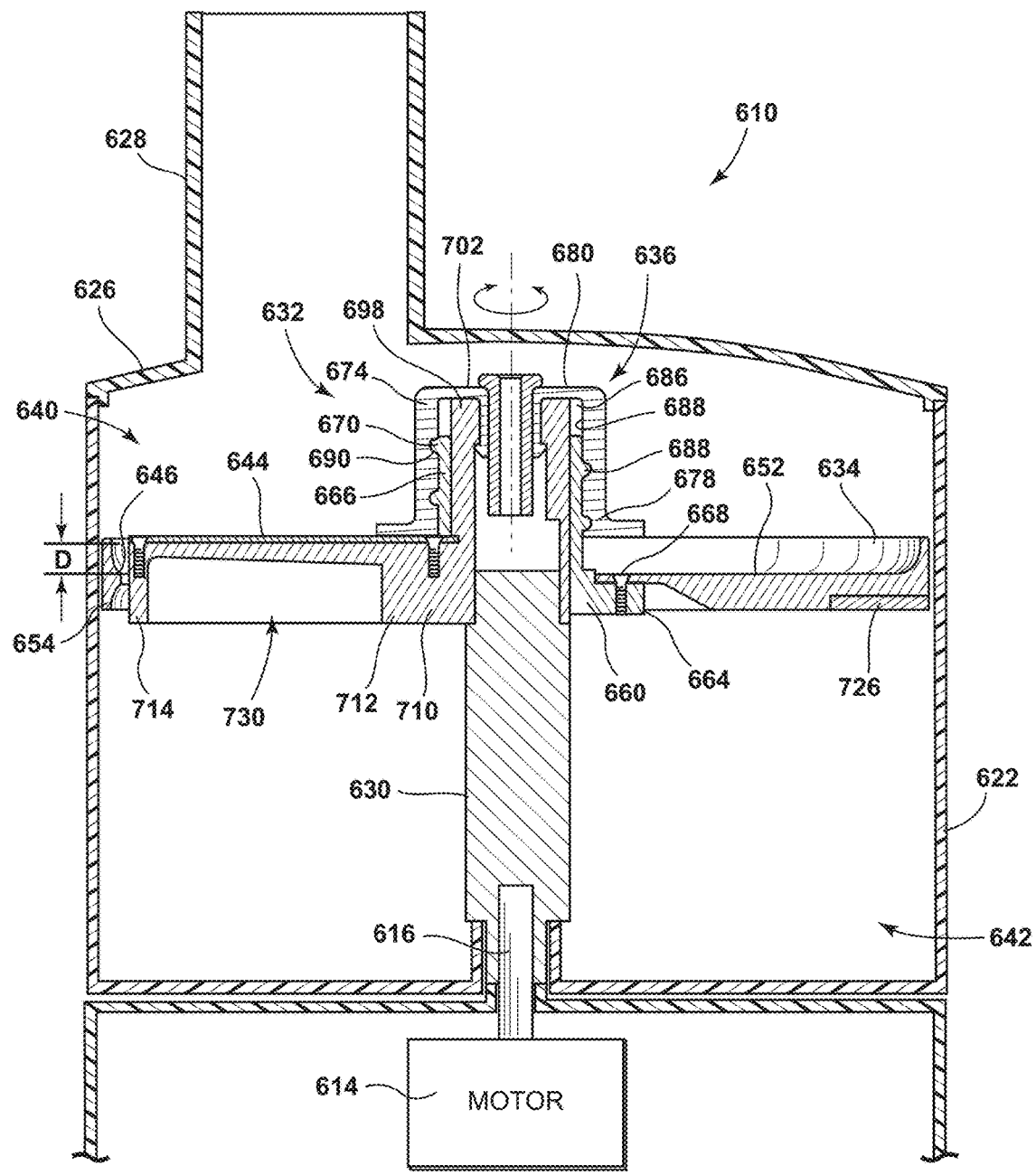
FIG. 19 is a view similar to FIG. 18, showing the rotating disk of the food slicer assembly in another position relative to the cutting blade.
Figure 20:
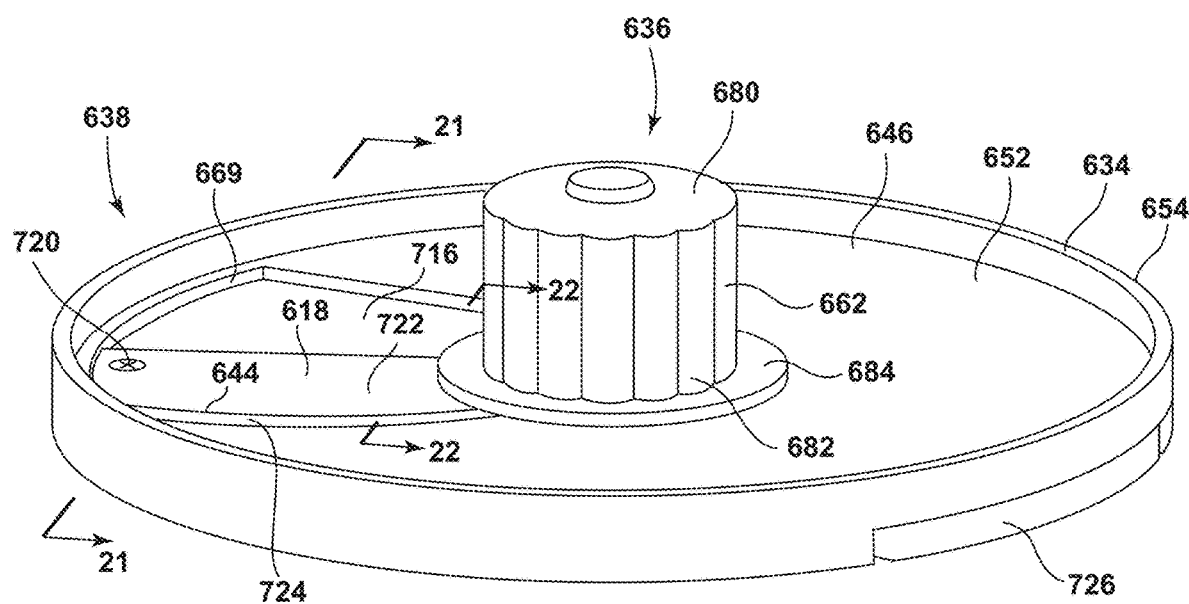
FIG. 20 is a perspective view of a food slicer assembly of the food processor of FIG. 17.

As shown in FIGS. 18 and 19, when the removable bowl 622 is secured to the base 612, the output shaft 616 of the motor 614 is coupled to a drive stem 630. The drive stem 630 is in turn coupled to a food slicer assembly 632. As shown in FIGS. 18-20, the food slicer assembly 632 includes a rotating disk 634, a thickness adjustment assembly 636, and a blade assembly 638, with the cutting blade 618 being one component thereof. The rotating disk 634 effectively divides the processing chamber 624 into an upper compartment 640 located between the disk 634 and the lid 626, and a lower compartment 642 located below the rotating disk 634. A vertical distance, D, between the cutting edge 644 of the cutting blade 618 and the upper surface 646 of the rotating disk 634 defines a cutting thickness. In other words, the thickness of the pieces of food items cut by the food processor 610 is determined by the distance D between the cutting edge 644 of the cutting blade 618 and the upper surface 646 of the rotating disk 634. When the distance D between the cutting edge 644 of the cutting blade 618 and the upper surface 646 of the rotating disk 634 is increased, thicker pieces of food items are created, with thinner pieces of food items being created when the distance D between the cutting edge 644 of the cutting blade 618 and the upper surface 646 of the rotating disk 634 is decreased.

The rotating disk 634 includes a planar body 652 and a rim 654 that extends upwardly from the outer perimeter of the planar body 652. The rotating disk 634 has a diameter that is slightly less than the inner diameter of the bowl 622 such that the rim 654 is positioned adjacent to, but spaced slightly apart from, the inner wall of the bowl to permit rotation of the disk 634 within the bowl 622. In the exemplary embodiment described herein, the rotating disk 634 is embodied as a monolithic structure (e.g., a single molded or cast part). However, it should be appreciated that the components of the rotating disk 634 (e.g., body 652 and rim 654) may be embodied as separate components secured to one another by an adhesive or other suitable fastener.

The thickness adjustment assembly 636 is operable by a user to vary the cutting thickness of the food processor 610 thereby creating thicker or thinner pieces of cut food items. The adjustment assembly 636 includes a hub 660 and a user-operated control device 662. The hub 660 includes a base 664 and a hollow sleeve 666 extending upwardly therefrom. A number of fasteners 668 (i.e., screws) extend through the planar body 652 into the base 664, thereby rigidly securing the rotating disk 634 to the hub 660. It will be appreciated that in other embodiments the hub 660 and the rotating disk 634 may be integrally formed as a monolithic structure. As shown in FIGS. 18 and 19, the sleeve 666 extends through an opening 669 formed in the planar body 652. External threads 670 are defined on a portion of an outer surface 672 of the sleeve 666.

The user-operated control device 662 is positioned above the upper surface 646 of the rotating disk 634. As shown in FIGS. 18-20, the user-operated control device 662 includes a control knob 674. The control knob 674 has a body 676 that extends from a lower end 678 to an upper end 680. The body 676 includes a knurled grip 682 formed in the upper end 680 and an annular flange 684 extending outwardly from the lower end 678. It should be appreciated that other user-activated control devices, such as levers, dials, buttons, or the like, may be substituted for the control knob.

As shown in FIGS. 18 and 19, the body 676 of the control knob 674 has an aperture 686 formed in the lower end 678 that receives the sleeve 666 of the hub 660. The inner surface 688 of the aperture 686 has internal threads 690 defined therein that correspond to the external threads 670 of the hub 660. The internal threads 690 of the control knob 674 threadingly engage the external threads 670 of the hub 660 to move the hub 660 (and hence the rotating disk 634) upwardly and downwardly relative to the cutting blade 618. For example, clockwise rotation of the control knob 674 causes upward movement of the hub 660 (and hence the rotating disk 634), while counter-clockwise rotation of the control knob 674 causes downward movement of the hub 660 (and hence the rotating disk 634).

As shown in FIGS. 18 and 19, a central shaft 698 of the blade assembly 638 is received in the hollow sleeve 666 of the adjustment assembly 636 and is secured at an upper end 702 to the control knob 674. The central shaft 698 extends from the upper end 702 to a lower end 704, which is has an opening 706 that receives the drive stem 630. In that way, the slicer assembly 632 is coupled to the output shaft 616 such that the slicer assembly 632 may be driven by the motor 614. The blade assembly 638 also includes a mounting arm 710 extending from an inner end 712, which is secured to the lower end 704 of the central shaft 698, to an outer end 714, which is positioned adjacent to the rim 654 of the rotating disk 634. In the illustrative embodiment, the central shaft 698 and mounting arm 710 are formed as a single monolithic component from a plastic or metallic material. It should be appreciated that in other embodiments the shaft 698 and arm 710 may be formed as separate components that are joined during final assembly by an adhesive or other suitable fastener.

The cutting blade 618 is secured to an upper surface 716 of the mounting arm 710. A number of fasteners 720 (i.e., screws) positioned at a rear edge 722 of the cutting blade 618 extend into the mounting arm 710, thereby rigidly securing the cutting blade 618 to the mounting arm 710. It will be appreciated that in other embodiments the fasteners 720 may take the form of T-stakes, pins, posts, or other structures capable of securing the cutting blade 618 to the mounting arm 710. Additionally, the mounting arm 710 may include an overmold that receives the cutting blade 618.

Figure 21:
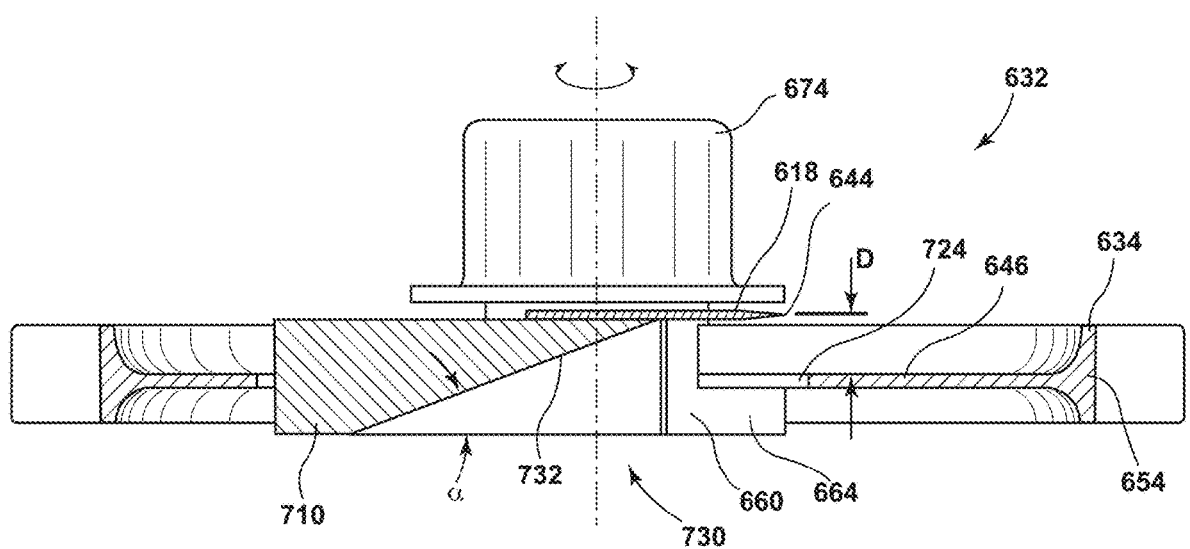
FIG. 21 is a partial cross sectional view of the food slicer assembly of FIG. 20 taken along the line 21-21.

As shown in FIG. 20, the opening 669 formed in the planar body 652 extends radially outward and receives the mounting arm 710 and the cutting blade 618. When the food slicer assembly 632 is assembled, a gap or throat 724 is defined between the cutting edge 644 and the body 652, as best seen in FIGS. 20 and 21. The food slicer assembly 632 also includes a counterweight 726 coupled to the planar body 652 adjacent to the outer perimeter of the rotating disk 634. As shown in FIGS. 18 and 19, the hub 660 is positioned between the counterweight 726 and the cutting blade 618. The counterweight 726 is sized to offset the weight of the mounting arm 710 and the cutting blade 618. In that way, the counterweight 726 balances the slicer assembly 632 as it is rotated. In other embodiments, the separate counterweight 726 may be omitted and additional material may be added to the rim 654 and the planar body 652 such that the counterweight is incorporated into the rotating disk 634.

During operation, the user may change the cutting position of the rotating disk 634 using the control knob 674. When the control knob 674 is rotated, the hub 660 translates upwardly and downwardly along the central shaft 698 to change the thickness of the food items being processed by the food processor 610. In particular, counter-clockwise rotation of the control knob 674 causes downward movement of the hub 660 (and hence rotating disk 634), which increases the distance D between the cutting edge 644 of the cutting blade 618 and the upper surface 646 of the rotating disk 634 and thereby produces thicker pieces of food items. Oppositely, when the control knob 674 is rotated clockwise, the hub 660 is moved upwardly along the central shaft 698 and the distance D between the cutting edge 644 of the cutting blade 618 and the upper surface 646 of the rotating disk 634 is decreased, thereby producing thinner pieces of food items.

When the food processor 610 is activated, the motor 614 causes the blade assembly 638 to rotate. The blade assembly 638 acts on the hub 660 secured to the rotating disk 634 such that the rotating disk 634 and the blade assembly 638 rotate together. Food items inserted through the feed tube 628 are urged into contact with the upper surface 646 of the rotating disk 634 while being acted upon (i.e., cut) by the cutting blade 618. Cut food items, along with other food items small enough to fit within the throat 724, pass from the upper compartment 640 through the throat 724.

A ramp 730 defined in the mounting arm 710 guides food items from the upper compartment 640 to the lower compartment 642. As shown in FIG. 21, the ramp 730 is positioned adjacent to and below the cutting blade 618 and includes an inclined surface 732 extending downwardly from the underside of cutting blade 618. The inclined surface 732 extends from the inner end 712 of the mounting arm 710 radially outward to the outer end 714 of the mounting arm 710. As shown in FIGS. 18 and 19, the inner end 712 defines an inner sidewall 734 for the ramp 730, while the outer end 714 of the mounting arm 710 defines an outer sidewall 736. In that way, the inclined surface 732 is encapsulated or captured between the sidewalls 734, 736, thereby reducing the potential for food items to travel outside of the processing path and thus reducing unwanted debris.

Figure 22:
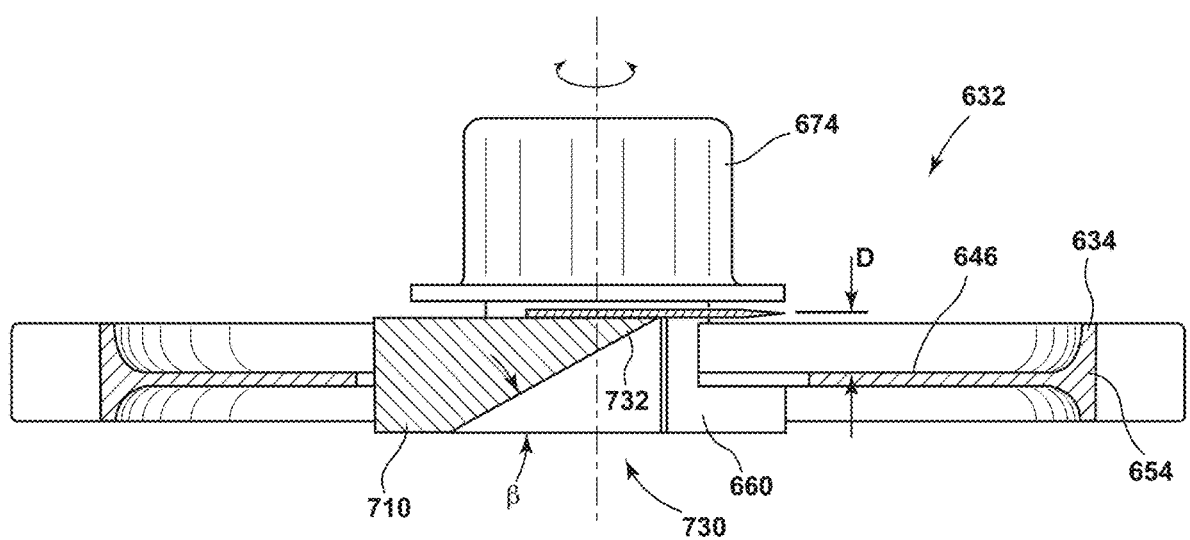
FIG. 22 is a partial cross sectional view of the food slicer assembly of FIG. 20 taken along the line 22-22 showing the angle of inclination of the ramp.

As shown in FIGS. 21 and 22, the slope or angle of the inclined surface 732 relative to the cutting blade 618 changes as the inclined surface 732 extends radially outward. As shown in FIG. 21, which is a cross-section of the slicer assembly 632 taken at the outer end 714 of the mounting arm 710, the inclined surface 732 has an angle of inclination α at the outer end 714. As shown in FIG. 22, which is a cross-section of the slicer assembly 632 taken at the inner end 712 of the mounting arm 710, the inclined surface 732 has an angle of inclination ß that is greater than the angle α. In the illustrative embodiment, the angle α is approximately 15 degrees, and the angle ß is approximately 25 degrees. It will be appreciated that in other embodiments the angles α, ß may be greater than or less than those of the illustrative embodiment. Additionally, in some embodiments, the angles α, ß may be equal. In still other embodiments, the inclined surface 732 may be convex or concave in one or more directions.

Figure 23:
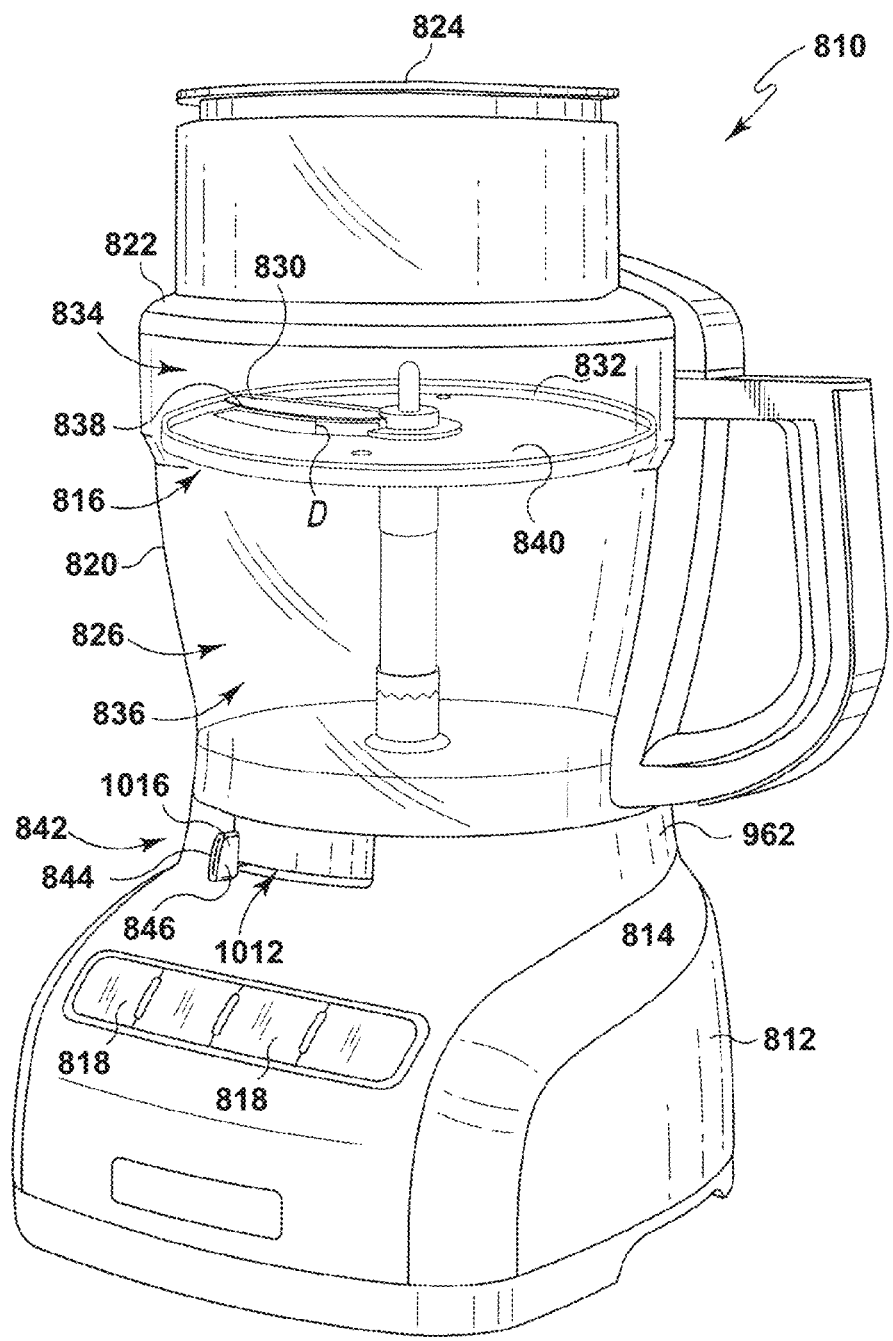
FIG. 23 is a perspective view of a food processor.

Referring to FIG. 23, a food processing device or food processor 810 is shown. The food processor 810 has a base 812 that houses a motor 814 and a control unit. Under the control of the control unit, the motor 814 drives a cutting assembly 816 to cut food items such as cheeses, meats, fruits, and vegetables. The base 812 also includes one or more buttons, switches, dials, or other types of controls 818. A user operates the controls 818 to control the operation of the motor 814 and hence the food processor 810. For example, one of the controls 818 may be operable to turn the motor 814 on and off while another control 818 may change the motor's speed.

As will be understood by those skilled in the art, the control unit may comprise analog and/or digital circuitry to process electrical signals received from the motor 814 (or other components of the food processor 810) and provide electrical control signals to the motor or other components of the food processor 810. For example, the control unit may be embodied as a microcontroller that executes firmware routines to control the operation of the food processor 810.

A removable receptacle or bowl 820 is secured to the base 812. The bowl's handle facilitates placement of the bowl 820 on the base 812. The bowl 820 includes a removable lid 822 secured to its upper peripheral edge. The lid 822 has a feed tube 824 formed thereon through which food items such as fruits and vegetables are inserted into the bowl 820 to be processed by the food processor 810. Collectively, the lid 822 and the bowl 820 define a processing chamber 826 where food items are processed by the cutting assembly 816.

The bowl 820, lid 822, and feed tube 824 are generally made of a transparent or translucent plastic material so that the contents of the food processor 810 can be viewed by a user without removing the lid 822 from the bowl 820. Moreover, one or more locking mechanisms may be used to lock the bowl to the base 812 and the lid 822 to the bowl 820.

As shown in FIG. 23, the cutting assembly 816 includes a cutting blade 830 and a rotating disk 832, which effectively divides the processing chamber 826 into an upper compartment 834 located between the disk 832 and the lid 822, and a lower compartment 836 located underneath the disk 832. A vertical distance, D, between the cutting edge 838 of the cutting blade 830 and the upper surface 840 of the rotating disk 832 defines a cutting thickness of food items processed by the cutting assembly 816. In other words, the thickness of the pieces of food items cut by the food processor 810 is determined by the distance D between the cutting edge 838 of the cutting blade 830 and the upper surface 840 of the rotating disk 832. As the distance D between the cutting edge 838 of the cutting blade 830 and the upper surface 840 of the rotating disk 832 increases, thicker pieces of food items are created; while thinner pieces of food items are created when the distance D between the cutting edge 838 of the cutting blade 830 and the upper surface 840 of the rotating disk 832 decreases. The cutting assembly 816 has a number of cutting positions in which the distance D between the cutting edge 838 of the cutting blade 830 and the upper surface 840 of the rotating disk 832 is preset.

A thickness adjustment assembly 842 is operable by a user to vary the cutting thickness of the food processor 810 while the cutting assembly 816 is driven by the motor 814, thereby creating thicker or thinner pieces of cut food items during a cutting operation. The adjustment assembly 842 includes a user-operated control device 844 that is located outside of the processing chamber 826 defined by the bowl 820 and the lid 822. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted while the cutting assembly 816 is driven by the motor 814.

For example, in the illustrative embodiment described herein, the external control device 844 is embodied as a control lever 846 that extends outwardly from the base 812 and is movable relative to the base 812 to change the cutting thickness of the cutting assembly 816 without removing the lid 822 from the bowl 820. In such a configuration, the user moves the control lever 846 one direction or the other to change (i.e., increase or decrease) the distance D between the cutting edge 838 of the cutting blade 830 and the upper surface 840 of the rotating disk 832. It should be appreciated that other user-operated control devices, such as knobs, dials, buttons, servo-motors, or the like, may be substituted for the control lever 846.

Figure 24:
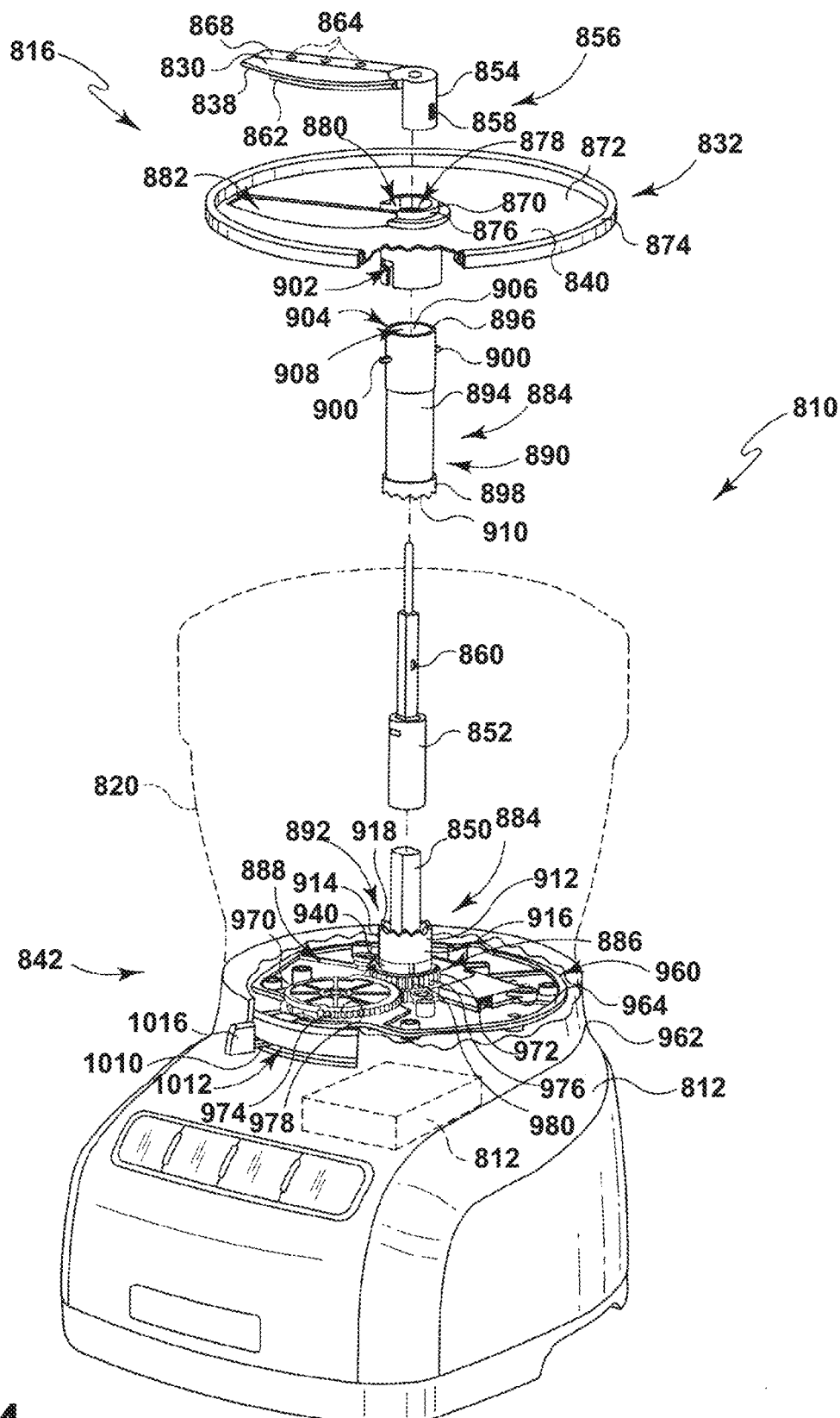
FIG. 24 is an exploded, partial cross-sectional perspective view of the food processor of FIG. 23.
Figure 25:
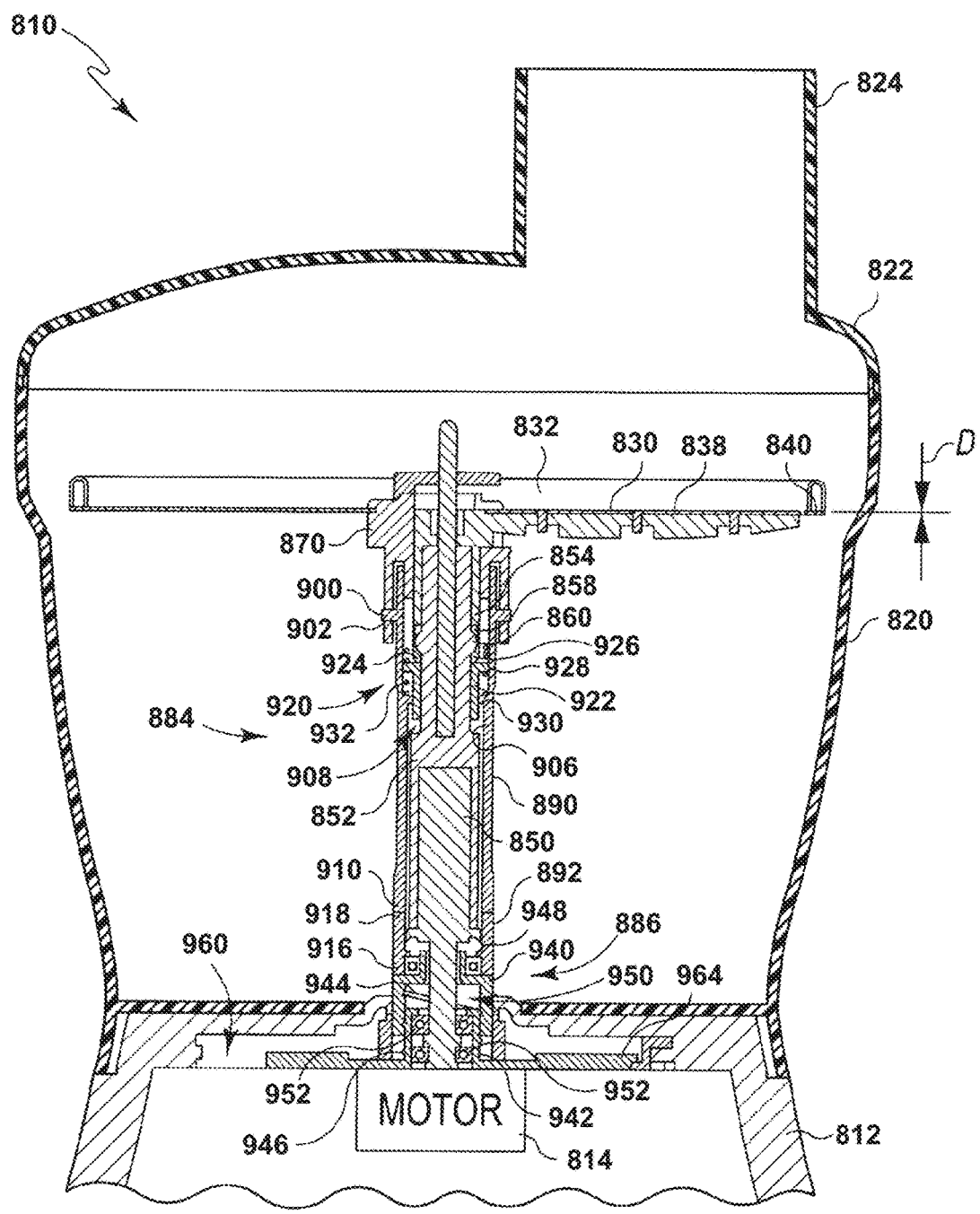
FIG. 25 is a partial cross-sectional side elevation view of the food processor of FIG. 23 showing a cutting assembly that includes a rotating disk and a cutting blade.
Figure 26:
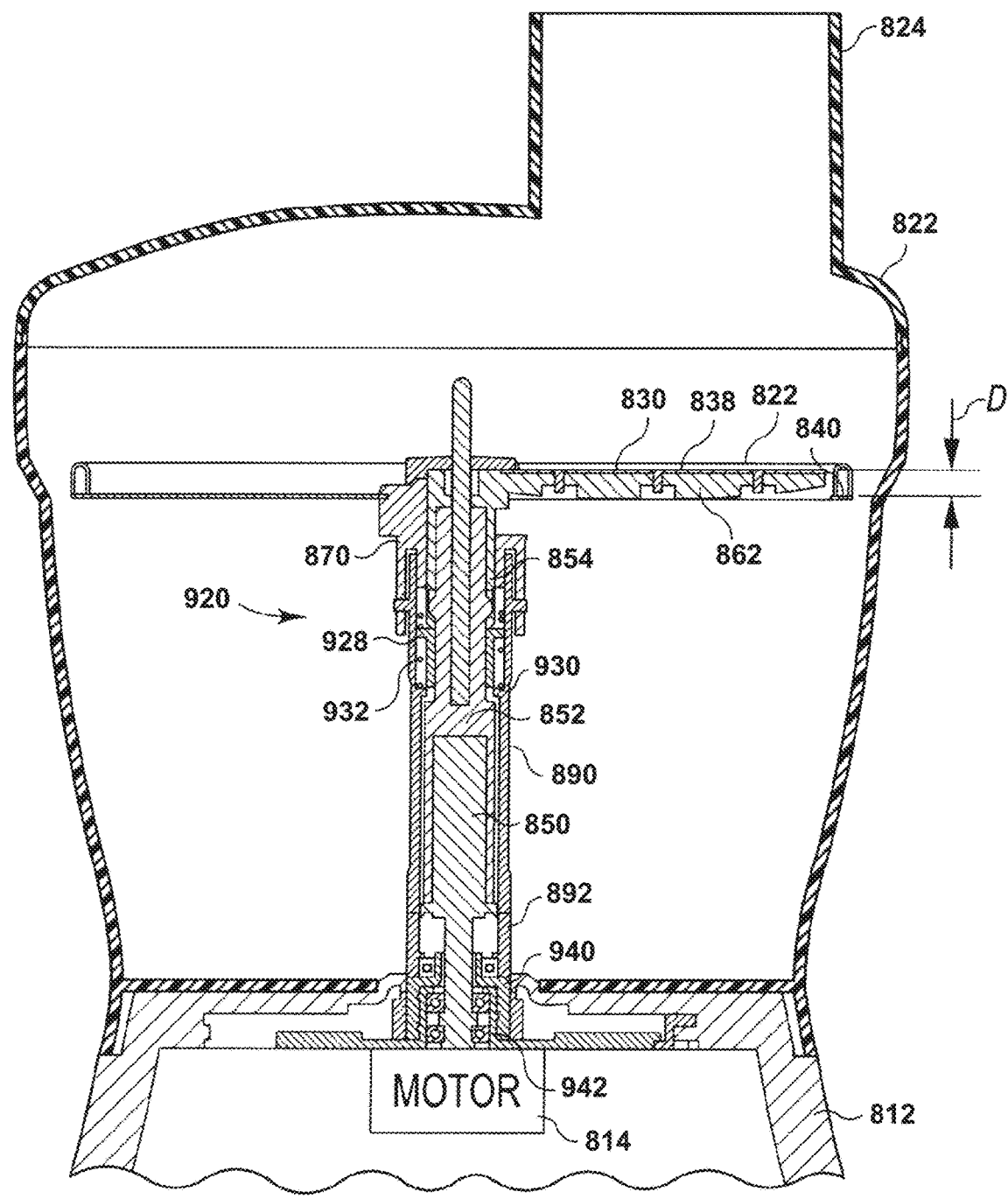
FIG. 26 is a view similar to FIG. 25 showing the rotating disk in another position relative to the cutting blade.

Referring now to FIGS. 24-26, the motor 14 includes an output shaft 850 extending upwardly from the base 812. The output shaft 850 is coupled to a drive stem 852, which is in turn coupled to a central shaft 854 of a blade assembly 856 of the cutting assembly 816. The central shaft 854 has a socket 858 formed in its lower end. A pair of tabs 860 extending from the upper end of the drive stem 852 is received in the socket 858, thereby coupling the drive stem 852 (and hence the output shaft 850 of the motor 814) to the central shaft 854 of the blade assembly 856. As such, rotation of the output shaft 850 causes rotation of the blade assembly 856. It should be appreciated that the position of the socket and the tabs may be reversed with the tabs being formed in the central shaft 854 and the socket being formed on the drive stem 852.

The blade assembly 856 also includes a mounting arm 862 that extends outwardly from the central shaft 854. The cutting blade 830 is secured to the upper surface of the mounting arm 862. In the exemplary embodiment, the central shaft 854 and the mounting arm 862 are formed from a metallic material as a single monolithic component. It should be appreciated that in other embodiments the shaft 854 and the arm 862 may be formed as separate components, which are then joined together during final assembly by an adhesive or other suitable fastener.

A number of fasteners 864 (i.e., screws) positioned at a rear edge 866 of the cutting blade 830 extend into the mounting arm 862, thereby rigidly securing the cutting blade 830 to the mounting arm 862. It will be appreciated that in other embodiments the fasteners 864 may take the form of T-stakes, pins, posts, or other structures capable of securing the cutting blade 830 to the arm 862. As best seen in FIG. 24, the arm 862 includes an overmold 868 that receives the cutting blade 830.

The rotating disk 832 includes a central hub 870, a planar body 872 extending radially outward the central hub 870, and a rim 874 extending upwardly from the outer perimeter of the planar body 872. The rotating disk 832 has a diameter that is slightly less than the inner diameter of the bowl 820 such that the rim 874 is positioned adjacent to, but is slightly spaced apart from, the inner wall of the bowl to permit rotation of the disk 832 within the bowl 820. In the exemplary embodiment described herein, the planar body 872 and the rim 874 are embodied as a monolithic structure (e.g., a single molded or cast part). However, it should be appreciated that all of the components of the rotating disk 832 (e.g., hub 870, body 872, and rim 874) may be integrated into a single monolithic structure or may be formed as separate components secured to one another by an adhesive or other suitable fastener.

The hub 870 of the rotating disk 832 has a sidewall 876 that defines a passageway 878 extending through the hub 870. The central shaft 854 of the blade assembly 856 is positioned in the passageway 878. The hub 870 also has a pocket 880 defined in the sidewall 876 that opens into the passageway 878. The mounting arm 862 of the blade assembly 856 is received in the pocket 880, thereby torsionally securing the blade assembly 856 to the rotating disk 832. As such, rotation of the blade assembly 856 by the output shaft 850 causes rotation of the rotating disk 832.

The mounting arm 862 extends outwardly from the pocket 880 and is positioned in an oblong opening 882 formed in the rotating disk 832. The rotating disk 832 is permitted to vertically slide relative to the mounting arm 862 and the blade 830. In use, when the cutting thickness is adjusted, the rotating disk 832 slides upwardly or downwardly relative to the blade assembly 856 (e.g., cutting blade 830). Because the blade assembly 856 is fixed to the drive stem 852, the cutting blade 830 is maintained in its vertical position such that, as the rotating disk 832 moves upwardly or downwardly, the distance D defined between the cutting edge 838 of the cutting blade 830 and the upper surface 840 of the rotating disk 832 changes, thereby changing the cutting thickness. As seen in FIG. 25, the distance D defined between the cutting edge 838 of the cutting blade 830 and the upper surface 840 of the rotating disk 832 is relatively small, resulting in thinner slices. Oppositely, as shown in FIG. 26, the distance D defined between the cutting edge 838 of the cutting blade 830 and the upper surface 840 of the rotating disk 832 is larger because the rotating disk 832 has moved downward relative to the cutting blade 830, which results in thicker slices.

As described above, the food processor 810 includes the thickness adjustment assembly 842, which is operable to move the rotating disk 832 relative to the cutting blade 830. The adjustment assembly 842 includes a two-piece adaptor 884 coupled to the hub 870 of the rotating disk 832, a lift device 886 supporting the adaptor 884 and the rotating disk 832, and a gear assembly 888 positioned in the base 812. The adaptor 884 includes an upper shaft 890 secured to the hub 870 of the rotating disk 832 and a lower shaft 892 rotatably coupled to the lift device 886. The upper shaft 890 has a cylindrical body 894 that extends from an upper end 896 to a lower end 898. The upper end 896 of the upper shaft 890 has a pair of tabs 900 extending outwardly therefrom. Each tab 900 is positioned in a corresponding slot 902 defined in the hub 870, thereby securing the shaft 890 to the rotating disk 832 such that rotation of the rotating disk 832 causes rotation of the shaft 890. At the lower end 898 of the shaft 890, a plurality of teeth 910 are formed in the body 894 to secure the upper shaft 890 to the lower shaft 892, as described in greater detail below.

The shaft 890 of the adaptor 884 also includes an opening 904 that is defined in the upper end 896 of the cylindrical body 894. The body 894 includes an inner wall 906 extending downwardly from the opening 904 and defining a passageway 908 through the body 894. When assembled, the shaft 890 is positioned over the drive stem 852 and the lower end of the central shaft 854 of the blade assembly 856 such that the stem 852 and shaft 854 are received in the passageway 908.

The lower shaft 892 of the adaptor 884 is torsionally secured to the lower end 898 of the shaft 890 such that the rotation of the shaft 890 causes rotation of the shaft 892. The lower shaft 892, like the upper shaft 890, has a cylindrical body 912 extending from an upper end 914 to a lower end 916. The body 912 includes a plurality of teeth 918, which are formed at the upper end 914. When the adaptor 84 is assembled, the teeth 918 of the lower shaft 892 are interdigitated with the teeth 910 of the upper shaft 890, thereby securing the shaft 890, 892 together. It will be appreciated that in other embodiments a combination of pins and slots as well as other fastening means may be used to torsionally secure the shafts 890 to the shaft 892.

As shown in FIGS. 25-26, the shaft 890 includes a biasing mechanism 920 positioned in the passageway 908, and the biasing mechanism 920 is configured to bias the upper shaft 890 into engagement with the lower shaft 892. The biasing mechanism 920 includes a sleeve 922 positioned in the middle of the passageway 908. The sleeve 922 has the drive stem 852 of the motor 814 extending therethrough.

The sleeve 922 includes an upper rim 924 that contacts the lower surface 926 of the central shaft 854 of the blade assembly 856 when the upper shaft 890 is secured to the rotating disk 832. A flange 928 extends outwardly from the upper rim 924. Similarly, the inner wall 906 of the upper shaft 890 includes an inner flange 930 extending inwardly into the passageway 908. A biasing element, such as a spring 932, is positioned between the flanges 928, 930. The spring 932 urges the shaft 890 downward to maintain engagement between the teeth 910, 918 such that the shafts 890, 892 remain coupled together.

The lift device 886 is operable to move the adaptor 884 (and hence rotating disk 832) upwardly and downwardly relative to the base. The lift device 886 includes a screw-type drive assembly having an internally-threaded upper sleeve 940 and an externally-threaded lower sleeve 942. The internal threads 944 of the upper sleeve 940 threadingly engage the external threads 946 of the lower sleeve 942 to move the upper sleeve 940 upwardly and downwardly relative to the base 812. For example, counter-clockwise rotation of the upper sleeve 940 may cause downward movement of the upper sleeve 940, while clockwise rotation of the upper sleeve 940 may cause upward movement of the upper sleeve 940.

The lower end 916 of the shaft 892 of the adaptor 884 is rotatably coupled to the upper sleeve 940 of the lift device 886 via a bearing 948. In that way, the shaft 892 (and hence cutting assembly 816) is permitted to rotate relative to the upper sleeve 940. At the same time, the bearing 948 fixes the axial position of the shaft 892 relative to the upper sleeve 940 such that upward and downward movement of the upper sleeve 940 causes upward and downward movement of the shaft 892.

In use, the thickness of food items being processed by the food processor 810 changes as the upper sleeve 940 translates upwardly and downwardly because the adaptor 884 moves with the upper sleeve 940. In particular, as the upper sleeve 940 moves downwardly along the lower sleeve 942, the lower shaft 892 of the adaptor 884 moves downwardly with the upper sleeve 940. The spring 832 within the upper shaft 890 urges the upper shaft 890 to move downwardly with the lower shaft 892. Because the upper shaft 890 is secured to the hub 870 of the rotating disk 832, that vertical movement of the upper shaft 890 of the adaptor 884 causes vertical movement of the rotating disk 832 relative to the cutting blade 830. As such, when the upper sleeve 940 is moved downwardly, the rotating disk 832 is moved downwardly, and the distance D between the cutting edge 838 of the cutting blade 830 and the upper surface 840 of the rotating disk 832 is increased, thereby producing thicker pieces of food items. Oppositely, as the upper sleeve 940 translates upwardly along the lower sleeve 942, the rotating disk 832 moves upwardly, and the distance D between the cutting edge 838 of the cutting blade 830 and the upper surface 840 of the rotating disk 832 decreases, thereby producing thinner pieces of food items.

While the lift device 886 is operable to change the vertical position of the rotating disk 832, the lift device 886 is isolated from the rotational force of the motor 814 such that the lift device 886 is not driven along with the cutting assembly 816. As described above, the adaptor 884, which rotates with the cutting assembly 816, is rotatably coupled to the upper sleeve 940 via the bearing 948. Additionally, in the illustrative embodiment, the upper sleeve 940 has a hollow passageway 950 extending therethrough. The output shaft 850 of the motor 814 is positioned in the hollow passageway 950, and the hollow passageway 950 is sized such that the output shaft 850 is spaced apart from the upper sleeve 940. The output shaft 850 is rotatably coupled to the lower sleeve 942 via a pair of bearings 952 such that the output shaft 850 is permitted to rotate relative to the lower sleeve 942. As such, rotational force from the output shaft 850 is not transmitted to the sleeves 940, 942 of the lift device 886.

The lower sleeve 942 is secured to the base 812 such that the sleeve 942 does not rotate. The base 812 has a compartment 960 that is defined by an outer wall 962. A platform 964 is positioned within the compartment 960, and the lower sleeve 942 is secured to the platform 964. As best seen in FIG. 24, the gear assembly 888 is also positioned within the compartment 960. The gear assembly 888 includes a drive gear 970 and a guide gear 972 that are pivotally coupled to the platform 964. Each of the gears 970, 972 is an external gear having a plurality of teeth 974, 976 defined on an outer surface 978, 980 thereof. The teeth 974, 976 are interdigitated such that rotation of the drive gear 970 causes rotation of the guide gear 972.

Figure 27:
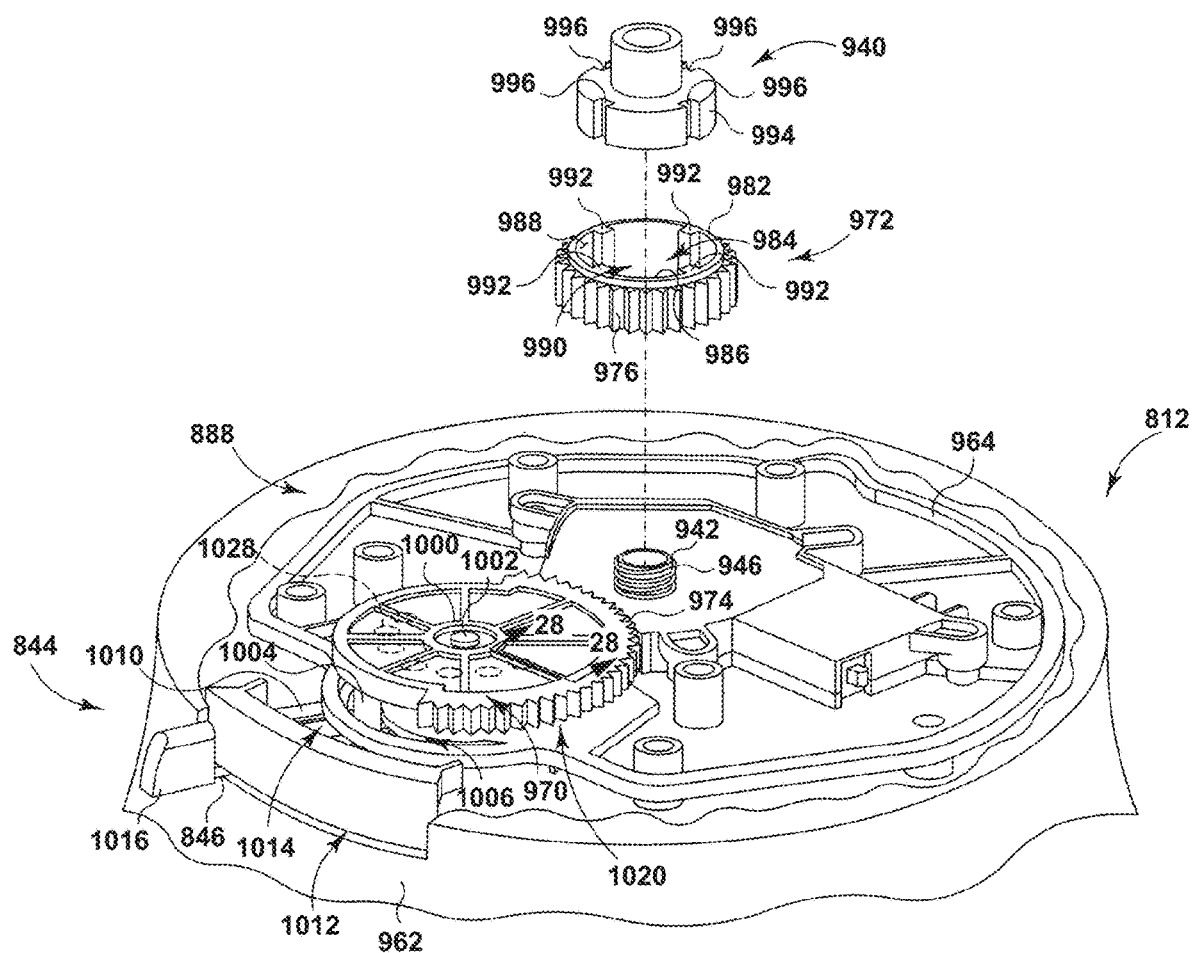
FIG. 27 is an exploded, partial cross-sectional perspective view of the base of the food processor of FIG. 23.

As best seen in FIG. 27, the guide gear 972 has a body 982 configured to be rotatably coupled to the platform 964. The body 982 includes an opening 984 defined in an upper surface 986 and an inner wall 988 extending downwardly from the opening 984. The inner wall 988 defines a passageway 990 extending through the body 982 of the gear 972. A plurality of splines 992 extend inwardly from the inner wall 988 into the passageway 990.

The upper sleeve 940 of the lift device 886 is movably coupled to the guide gear 972. The upper sleeve 940 includes an outer surface 994 having a plurality of grooves 996 defined therein. Each groove 996 is sized to receive one of the splines 992 of the gear 972, thereby coupling the sleeve 940 to the guide gear 972 and permitting the sleeve 940 to translate upwardly and downwardly relative to the gear 972. As such, rotation of the guide gear 972 causes rotation of the upper sleeve 940 relative to the lower sleeve 942. As described above, rotation of the upper sleeve 940 causes movement of the upper sleeve 940 upwardly or downwardly and changes the thickness of food items being processed by the food processor 810.

As best seen in FIG. 27, the drive gear 970 includes a body 1000 that is positioned in the compartment 960 of the base 812. The body 1000 is pivotally coupled to a platform 964 of the base 812 via a pivot pin 1002. The drive gear 970 includes a shaft 1004 that extends downwardly from the body 1000. The shaft 1004 extends through a curved slot 1006 defined in the platform 964.

The external control device 844 is configured to operate the lift device 886 and the gear assembly 888 to move the rotating disk 832 upwardly and downwardly and thereby change the thickness of food items processed by the food processor 810. The control lever 846 of the external control device 844 is coupled to the drive gear 970. The lever 846 includes an arm 1010 having a guide slot 1014 defined therein. The shaft 1004 of the gear 970 is positioned in the guide slot 1014, thereby coupling the lever 846 to the gear 970.

The arm 1010 extends outwardly through a horizontal track 1012 defined in the outer wall 962 of the base 812. A grip 1016 of the user-operated device 844 is secured at the end of the arm 1010 positioned outside the base 812. When the food processor is assembled, the grip 1016 is positioned below the removable bowl 820. The arm 1010, like the drive gear 970, is pivotally coupled to the platform 964 such that the grip 1016 is movable between a plurality of adjustment positions relative to the base 812.

In use, movement of the grip 1016 of the control lever 846 relative to the base 812 causes the arm 1010 to pivot and advance the shaft 1004 of the gear 970 along the slot 1006. As the shaft 1004 advances along the slot 1006, the drive gear 970 and guide gear 972 rotate. As described above, rotation of the guide gear 972 causes movement of the upper sleeve 940 upwardly or downwardly and changes the thickness of food items being processed by the food processor 810. Each adjustment position of the grip 1016 corresponds to one of the preset cutting positions of the cutting assembly 816.

Figure 28:
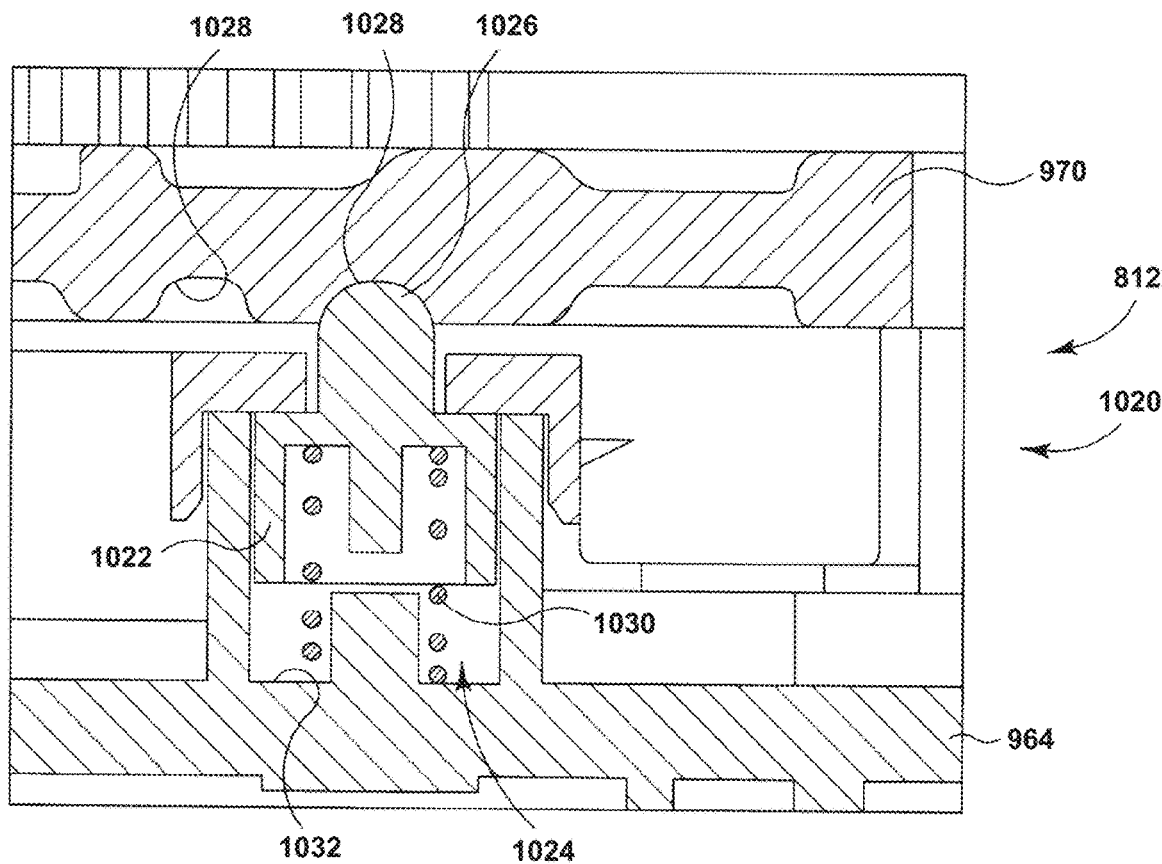
FIG. 28 is a partial cross-sectional view of the base of the food processor of FIG. 23 taken along the line 28-28 of FIG. 27.

Referring now to FIGS. 27 and 28, the food processor 810 includes a locking mechanism 1020 configured to inhibit movement of the control lever 846 relative to the base 812 and thereby maintain the cutting assembly 816 at its current cutting position. The locking mechanism 1020 includes a pin 1022 positioned in an aperture 1024 defined in the platform 964. The convex upper end 1026 of the pin 1022 is configured to be received in a plurality of concave notches 1028 defined in the bottom surface of the body 1000 of the drive gear 970. Each notch 1028 corresponds to an adjustment position of the control lever 846 and hence a cutting position of the cutting assembly 816.

As shown in FIG. 28, a biasing element, such as spring 1030, is positioned between the pin 1022 and the bottom surface 1032 of the aperture 1024. The spring 1030 urges the pin 1022 into engagement with the notch 1028 corresponding to the present adjustment position of the control lever 846. However, when the user desires to change the thickness of the food items being processed by the food processor 810, the user may grab the grip 1016 and advance the control lever 846 along the track 1012. Doing so moves the convex pin 1022 along the concave surface of the notch 1028 and overcomes the bias of the spring 1030, thereby moving the pin 1022 downward and permitting the pin 1022 to slide along the bottom surface of the gear 970 to the next notch 1028 corresponding to the next adjustment position.

In use, a user operates the controls 818 to energize the motor 814 to rotate the output shaft 850 and the drive stem 852. Because the cutting assembly 816 is secured to the drive stem 852 via the central shaft 854, rotation of the output shaft 850 causes rotation of the cutting assembly 816. While the motor 814 is energized, the user may advance food items into the processing chamber 826 through the feed tube 824 to be cut by the rotating cutting assembly 816.

If the user desires to change the cutting thickness during the cutting operation, the user may grab the grip 1016 and advance the control lever 846 along the track 1012 to another adjustment position. Movement of the control lever 846 causes the control lever 846 to pivot and rotate the drive gear 970 and guide gear 972. As described above, rotation of the guide gear 972 causes rotation of the upper sleeve 940 relative to the lower sleeve 942 and moves the upper sleeve 940 upwardly or downwardly relative to the base 812. Because the adaptor 884 is secured to both the upper sleeve 940 and the rotating disk 832, movement of the upper sleeve 940 causes movement of the disk 832 relative to the cutting blade 830, thereby changing the distance D between the cutting edge 838 of the cutting blade 30 and the upper surface 840 of the rotating disk 832 and, consequently, the thickness of food items being processed by the food processor 810.

Figure 29:
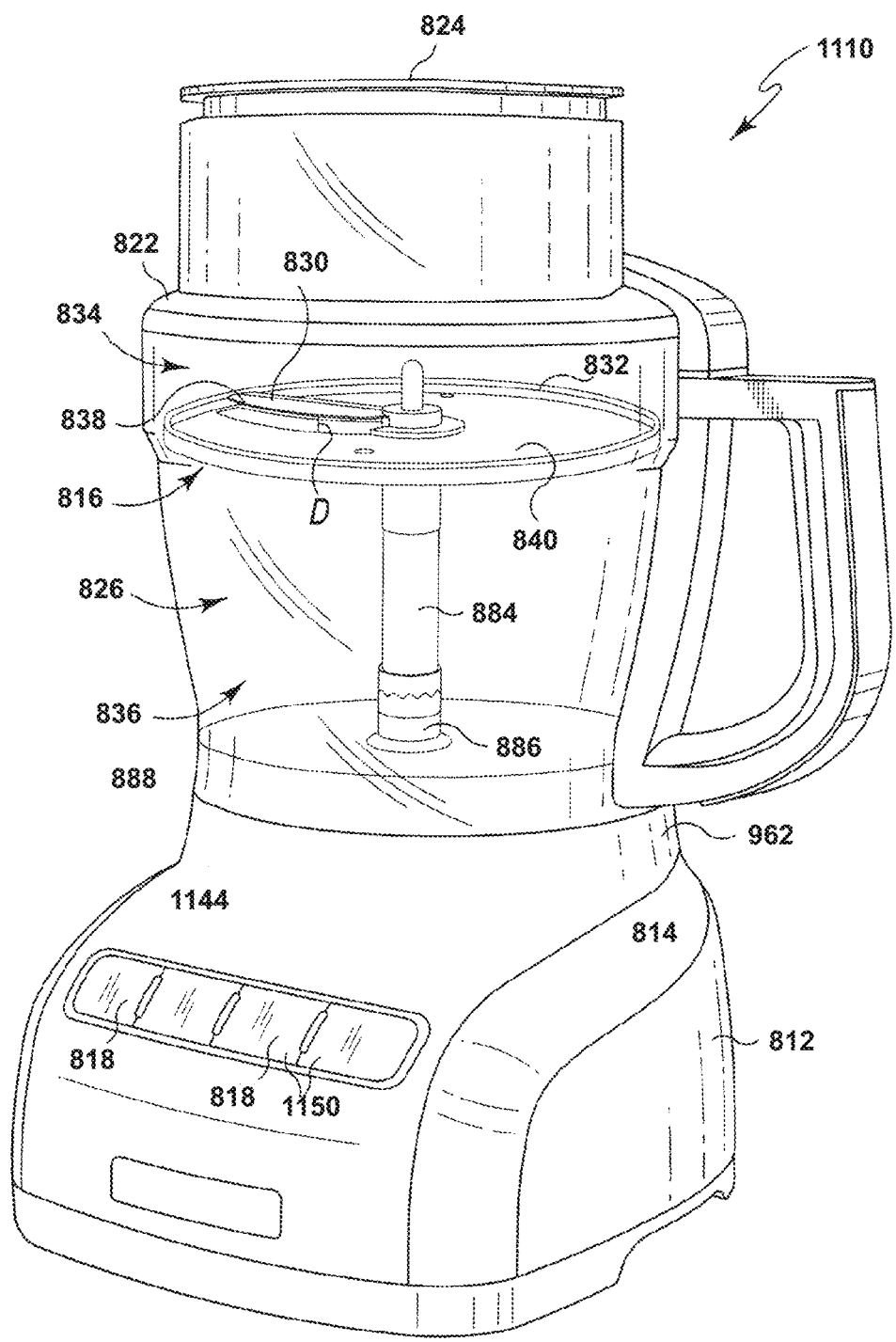
FIG. 29 is a perspective view of another embodiment of a food processor.

Referring now to FIG. 29, another embodiment of a food processor (hereinafter referenced as a food processor 1110) is shown. Some features of the embodiment illustrated in FIG. 29 are substantially similar to those discussed above in reference to the embodiment of FIGS. 23-28. Such features are designated in FIG. 29 with the same reference numbers as those used in FIGS. 23-28.

The food processor 1110 has a base 812 that houses a motor 814 and a control unit. Under the control of the control unit, the motor 814 drives a cutting assembly 816 to cut food items such as cheeses, meats, fruits, and vegetables. The base 812 also includes one or more buttons, switches, dials, or other types of controls 818. A user operates the controls 818 to control the operation of the motor 814 and hence the food processor 1110. For example, one of the controls 818 may be operable to turn the motor 814 on and off while another control 818 may change the motor's speed.

As will be understood by those skilled in the art, the control unit may comprise analog and/or digital circuitry to process electrical signals received from the motor 814 (or other components of the food processor 1110) and provide electrical control signals to the motor or other components of the food processor 1110. For example, the control unit may be embodied as a microcontroller that executes firmware routines to control the operation of the food processor 1110.

The food processor 1110 also includes a removable receptacle or bowl 820 secured to the base 812, and the bowl 820 has a removable lid 822 secured to its upper peripheral edge. Collectively, the lid 822 and the bowl 820 define a processing chamber 826 where food items are processed by the cutting assembly 816.

As shown in FIG. 29, the cutting assembly 816 includes a cutting blade 830 and a rotating disk 832. A vertical distance, D, between the cutting edge 838 of the cutting blade 830 and the upper surface 840 of the rotating disk 832 defines a cutting thickness of food items processed by the cutting assembly 816. In other words, the thickness of the pieces of food items cut by the food processor 810 is determined by the distance D between the cutting edge 838 of the cutting blade 830 and the upper surface 840 of the rotating disk 832.

The food processor 1110 also includes a thickness adjustment assembly 1142, which is operable by a user to vary the cutting thickness of the food processor 810 while the cutting assembly 816 is driven by the motor 814, thereby creating thicker or thinner pieces of cut food items during a cutting operation. Like the thickness adjustment assembly 842 of the embodiment of FIGS. 23-28, the thickness adjustment assembly 1142 includes a two-piece adaptor 884 coupled to the rotating disk 832, a lift device 886 supporting the adaptor 884 and the rotating disk 832, and a gear assembly 888 positioned in the base 812. The thickness adjustment assembly 1142 also includes a motor 1144 (shown in diagrammatic form) that is coupled to the gear assembly 888 and operable to rotate the drive gear 970 and guide gear 972 of the gear assembly 888 and thereby raise and lower the rotating disk 832 relative to the cutting blade 830. A user operates a pair of buttons 1150 of the controls 818 to control the operation of the motor 1144 and hence the thickness adjustment assembly 842. In that way, the motor 1144 and buttons 1150 replace the control lever 846 as the mechanism by which the gear assembly 888 and lift device 886 are operated to change the thickness of the processed food items.

In other embodiments, the adjustment assembly may include other electromechanical components such that the user may adjust the cutting thickness at the touch of a button while the cutting assembly 816 is driven by the motor 814. The electromechanical components may include, for example, a small motor that would directly operate a screw-type drive assembly without a gear assembly while the other motor drives the cutting assembly. The electromechanical components may also include control circuitry to process electrical signals received from the second motor and provide electrical control signals to the second motor. For example, the control circuitry may be embodied as a microcontroller that executes firmware routines to control the operation the second motor to adjust the cutting thickness of the cutting assembly. Additional controls or buttons to control the operation of the second motor may be added to the food processor.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 810 is herein illustrated as a conventional domestic food processor, the features and aspects disclosed herein can also be implemented in other types of food processing devices such as automatic food choppers, slicers, dicers, ice shavers and the like. Additionally, while the cutting assembly 816 was illustratively embodied as an adjustable slicing disk attachment, the concept of an adjustable cutting assembly 816 can also be implemented with other cutting attachments, such as, for example, a shredding disk, grate/shaving disk, julienne disk, and the like.

It will also be appreciated that in other embodiments the threaded sleeves 940, 942 of the lift device 886 may be replaced with a series of ramp structures or cams that slide relative to one another to change the position of the rotating disk 832 relative to the cutting blade 830. Additionally, it will also be appreciated that in other embodiments the rotating disk may be vertically fixed and the cutting blade may be configured to move relative to the rotating disk to change the cutting thickness.

Other embodiments of a food processor are shown in greater detail in FIGS. 30-42. Some features of the embodiments illustrated in FIGS. 30-42 are substantially similar to those discussed above in reference to the embodiments of FIGS. 23-29. Such features are designated in FIGS. 30-42 with the same reference numbers as those used in FIGS. 23-29.

Figure 30:
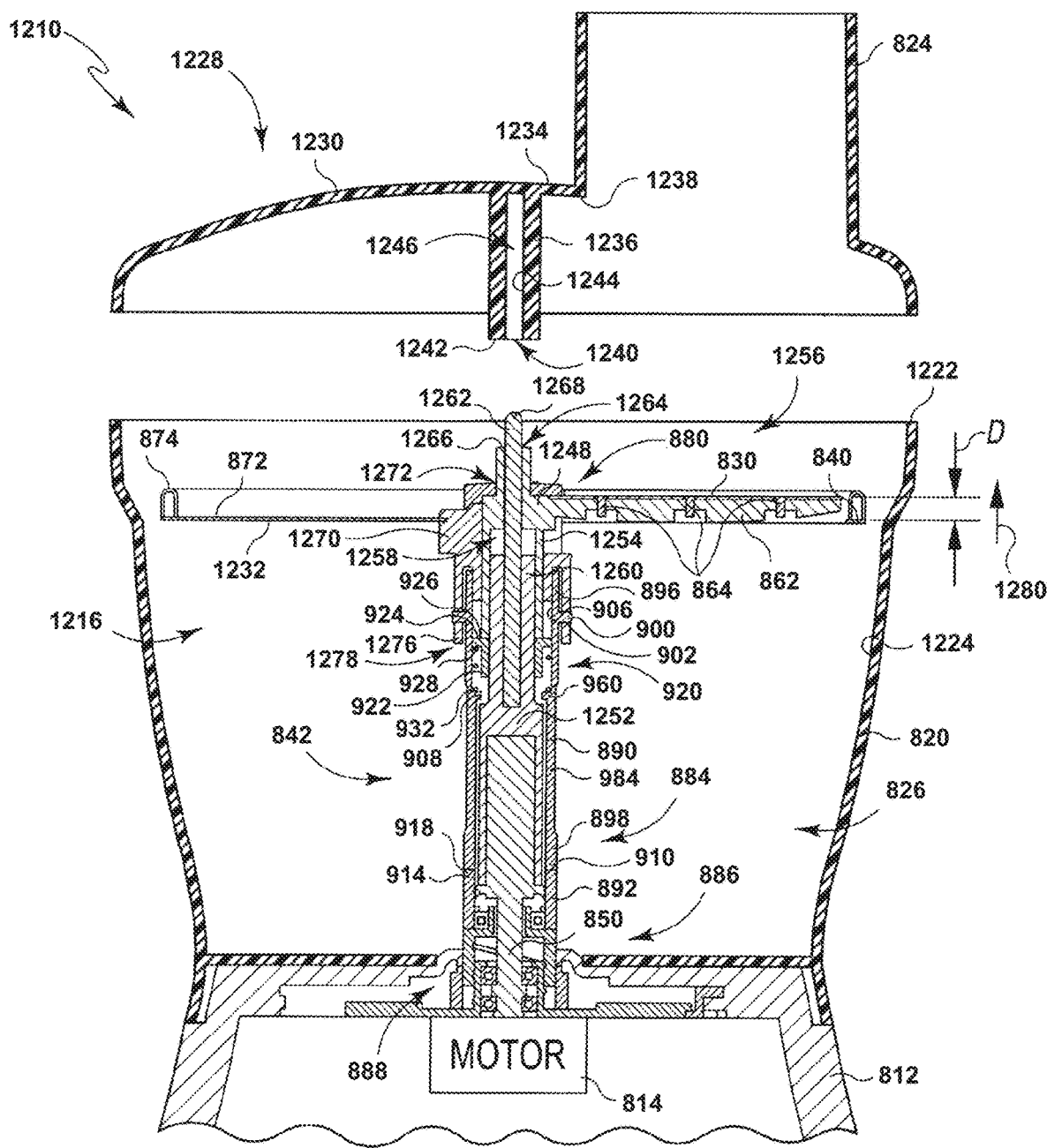
FIG. 30 is a partial cross-sectional side elevation view of the food processor of FIG. 23 including another embodiment of a cutting assembly and removable lid.
Figure 31:
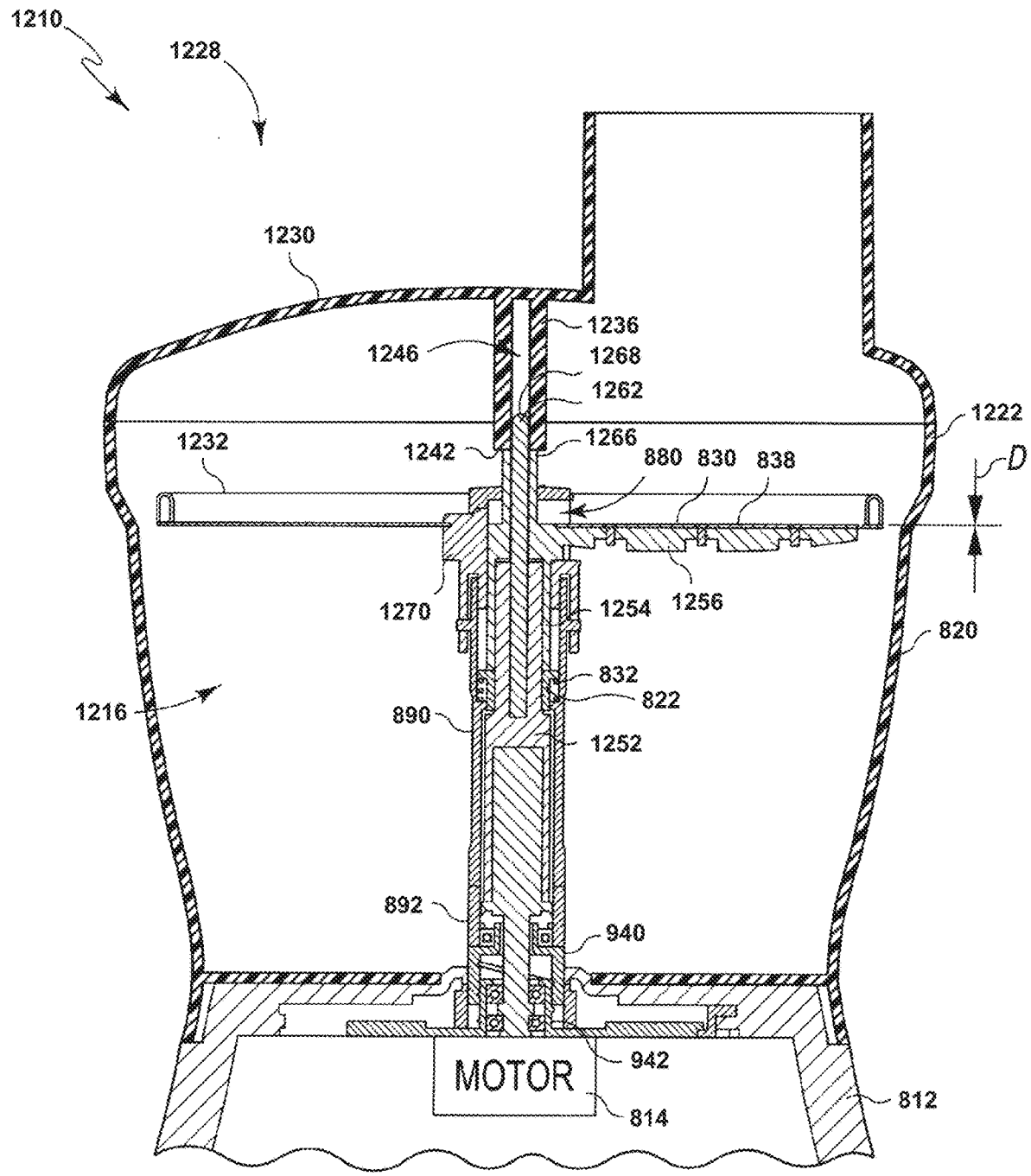
FIG. 31 is a partial cross-sectional side elevation view of the food processor similar to FIG. 30.

Referring now to FIGS. 30 and 31, another embodiment of a food processor (hereinafter food processor 1210) is shown. The food processor 1210 includes another embodiment of a cutting assembly (hereinafter cutting assembly 1216) and another embodiment of a removable lid (hereinafter lid 1228), which engages the cutting assembly to seat the cutting assembly on the drive stem, as described in greater detail below.

As shown in FIG. 30, the food processor 1210 has a base 812 that houses a motor 814 and a control unit (not shown). Under the control of the control unit, the motor 814 drives the cutting assembly 1216 to cut food items such as cheeses, meats, fruits, and vegetables. The food processor 1210 also includes a removable receptacle or bowl 820 that is secured to the base 812. The bowl 820 has an upper rim 1222 and an inner wall 1224 that extends downwardly from the upper rim 1222 to define part of a processing chamber 826 where food items may be processed by the cutting assembly 1216.

The removable lid 1228 is configured to be secured to the rim 1222 of the bowl 820. In that way, the removable lid 1228 and the bowl 820 cooperate to define the processing chamber 826. The lid 1228 also has a feed tube 824 formed thereon through which food items such as fruits and vegetables may be inserted into the bowl 820 to be processed by the food processor 810. The lid 1228 of the food processor 1210 includes a shell 1230, and the feed tube 824 extends upwardly from the outer surface 1234 of the shell 1230. The shell 1230 has a sleeve 1236 that extends downwardly from an inner surface 1238 thereof. The sleeve 1236 has an opening 1240 defined in a lower end 1242, and an inner wall 1244 that extends from the opening 1240 to define an aperture 1246 in the sleeve 1236.

As described above, the cutting assembly 1216 of the food processor 1210 is driven by the motor 814 to cut food items. The motor 814 includes an output shaft 850 extending upwardly from the base 812. The output shaft 850 is coupled to a drive stem 1252, which is in turn configured to be secured to the cutting assembly 1216. The cutting assembly 1216 includes a rotating disk 1232 and a blade assembly 1256, and the blade assembly 1256 includes a cutting blade 830 that is secured to a blade carrier 1248. The blade carrier 1248 has a central shaft 1254 and a mounting arm 862 that extends outwardly from the central shaft 1254. The cutting blade 830 is secured to the upper surface of the mounting arm 862 via a number of fasteners 864. Like the embodiments of FIG. 23-29, the rotating disk 1232 is configured to slide vertically relative to the cutting blade 830 to adjust the cutting thickness of the cutting assembly 1216, as described in greater detail below.

The central shaft 1254 of the blade carrier 1248 has a socket 1258 formed in its lower end, and the drive stem 1252 has an upper end 1260 that is keyed to match the configuration of the socket 1258. In the illustrative embodiment, the upper end 1260 includes two flat surfaces (not shown) connected at each end by a curved surface (not shown), and the socket 1258 has a corresponding geometric shape that is sized to receive the upper end 1260 of the drive stem 1252.

When the cutting assembly 1216 is seated on the drive stem 1252, as shown in FIG. 31, the keyed upper end 1260 of the stem 1252 is received in the socket 1258 of the central shaft 1254. As such, rotation of the output shaft 50 of the motor 14 causes rotation of the cutting assembly 1216.

It should be appreciated that in other embodiments the arrangement of the socket and keyed end may be reversed, with the keyed end being formed on the central shaft 1254 and the socket being defined in the drive stem 1252. It should also be appreciated that in other embodiments other methods of attachment may be used to secure the drive stem to the cutting assembly.

As shown in FIGS. 30 and 31, the drive stem 1252 of the food processor 1210 includes a center rod 1262 that extends outwardly through an opening 1264 defined in the upper end 1266 of the blade carrier 1248. The aperture 1246 of the sleeve 1234 of the lid 1228 is sized to receive the center rod 1262 such that the tip 1268 of the center rod 1262 may be positioned in the aperture 1246 when the lid 1228 is secured to the bowl 820, as shown in FIG. 31. Additionally, when the lid 1228 is secured to the bowl 820, the lower end 1242 of the sleeve 1234 of the lid 1228 engages the upper end 1260 of the blade carrier 1248 to seat the blade assembly 1256 on the drive stem 1252, as described in greater detail below.

The rotating disk 1232 of the cutting assembly 1216 includes a central hub 1270, a planar body 872 extending radially outward the central hub 1270, and a rim 874 extending upwardly from the outer perimeter of the planar body 872. The hub 1270 of the rotating disk 1232 has a sidewall 1276 that defines a passageway 1278 extending through the hub 1270. As shown in FIG. 30, the central shaft 1254 of the blade assembly 1256 is positioned in the passageway 1278, and the center rod 1262 of the drive stem 1252 extends outwardly through an upper opening 1272 of the passageway 1278. The hub 1270 also has a pocket 880 defined in the sidewall 1276 that opens into the passageway 1278. The mounting arm 862 of the blade assembly 856 is received in the pocket 880, thereby torsionally securing the blade assembly 1256 to the rotating disk 832. In the illustrative embodiment, the central shaft 1254, the mounting arm 862, and the hub 1270 are keyed such that the blade assembly 1256 is torsionally secured to the rotating disk 1232. As such, rotation of the output shaft 850 causes rotation of the rotating disk 1232 and the cutting blade 830.

The food processor 1210 also includes a thickness adjustment assembly 842, which is operable to move the rotating disk 1232 relative to the cutting blade 830. The adjustment assembly 842 includes a two-piece adaptor 884, a lift device 886 supporting the adaptor 884 and the rotating disk 1232, and a gear assembly 888 positioned in the base 812. The lift device 886 is operable to move the adaptor 884 (and hence rotating disk 1232) upwardly and downwardly relative to the base 812 of the food processor 1210, and the gear assembly 888 is configured to operate the lift device 886. As in the embodiment described above in regard to FIGS. 23-28, the food processor 1210 includes an external control device (not shown) that is configured to operate the lift device 886 and the gear assembly 888 to move the rotating disk 1232 upwardly and downwardly, thereby changing the thickness of food items processed by the food processor 1210.

As shown in FIGS. 30 and 31, the adaptor 884 of the adjustment assembly 842 includes an upper shaft 890 configured to be secured to the hub 1270 of the rotating disk 1232. The upper shaft 890 has a cylindrical body 894 that extends from an upper end 896 to a lower end 898. The upper end 896 of the upper shaft 890 has a pair of tabs 900 extending outwardly therefrom. When the upper shaft 890 is secured to the hub 1270, each tab 900 is positioned in a corresponding slot 902 defined in the hub 1270, as shown in FIGS. 30 and 31. In that way, the shaft 890 is secured to the rotating disk 832 such that rotation of the rotating disk 832 causes rotation of the shaft 890. At the lower end 898 of the shaft 890, a plurality of teeth 910 are formed in the body 894 and are configured to engage a plurality of teeth 918 formed on the lower shaft 892 to thereby torsionally secure the upper shaft 890 to the lower shaft 892.

The upper shaft 890 of the adaptor 884 also includes an inner wall 906 that defines a passageway 908 through the body 894. When assembled with the base 812 and the cutting assembly 1216, the upper shaft 890 is positioned over the drive stem 1252 and the lower end of the central shaft 1254 of the blade assembly 1256 such that the stem 1252 and the shaft 1254 are received in the passageway 808 of the upper shaft 890.

As shown in FIGS. 30 and 31, the upper shaft 890 includes a biasing mechanism 920 positioned in the passageway 908, and the biasing mechanism 920 is configured to bias the upper shaft 890 into engagement with the lower shaft 892. The biasing mechanism 920 includes a sleeve 922 positioned in the middle of the passageway 908. When attached to the base 812, the sleeve 922 has the drive stem 1252 of the motor 814 extending therethrough.

The sleeve 922 of the biasing mechanism 920 includes an upper rim 924 that contacts the lower surface 926 of the central shaft 1254 of the blade assembly 856 when the upper shaft 890 is secured to the rotating disk 832. A flange 928 extends outwardly from the upper rim 924 of the sleeve 922. Similarly, the inner wall 906 of the upper shaft 890 includes an inner flange 930 extending inwardly into the passageway 908. A biasing element, such as a spring 932, is positioned between the flanges 928, 930.

To assemble the food processor 1210 for use, the user may operate the thickness adjustment assembly 842 to position the lift device 886 in a position corresponding to the minimal cutting thickness, as shown in FIG. 30. The user may align the upper shaft 890 of the adaptor 884 in the bowl 820 and advance the upper shaft 890 downward so that the drive stem 1252 enters the passageway 908 of the upper shaft 890. The user may continue to advance the upper shaft 890 downward until the teeth 910 on the lower end 898 of the upper shaft 890 engage the teeth 918 on the upper end 914 of the lower shaft 892 of the adaptor 884.

The user may secure the upper shaft 890 of the adaptor 884 to the hub 1270 of the rotating disk 1232. To do so, the user may align the cutting assembly 1216 with the drive stem 1252 and advance the cutting assembly 1216 downward so that the drive stem 1252 enters the socket 1258 defined in the central shaft 1254 of the blade carrier 1248. The user may continue to advance the cutting assembly 1216 downward until the tabs 900 of the adaptor 884 are received in the slots 902 defined in the hub 1270, as shown in FIG. 30. In that position, the lower surface 926 of the central shaft 1254 contacts the upper rim 1224 of the sleeve 1222 of the biasing mechanism 920. Because the cutting blade 830 is not fixed axially, the cutting blade 830 is permitted to move in the direction indicated by the arrow 1280. As shown in FIG. 30, the spring 932 urges the cutting blade 830 into a position in which the distance D defined between the cutting edge 838 of the cutting blade 830 and the upper surface 40 of the rotating disk 832 is increased.

The user may attach the lid 1228 to the upper rim 1222 of the bowl 820. To do so, the user aligns the sleeve 1234 of the lid 1228 with the tip 1268 of the center rod 1262 of the drive stem 1252. The user then advances the lid 1228 downward such that the lower end 1242 of the sleeve 1234 engages the upper end 1260 of the blade carrier 1248. As the user continues to advance the lid 1228 downward, the bias exerted by the spring 932 is overcome, and the cutting blade 830 is moved downward such that the distance D defined between the cutting edge 838 of the cutting blade 830 and the upper surface 840 of the rotating disk 832 is decreased. As shown in FIG. 31, when the shell 1230 of the lid 1228 contacts the upper rim 1222 of the bowl 820, the distance D defined between the cutting edge 838 of the cutting blade 830 and the upper surface 840 of the rotating disk 832 is relatively minimal, corresponding to the minimal cutting thickness of the cutting assembly 1216.

It should be appreciated that the user may also attach the upper shaft 890 of the adaptor 884 to the cutting assembly 1216 prior to attaching the assembly to the lower shaft 892 of the adaptor 884. Additionally, it should also be appreciated that the food processor 1210 may be assembled with the lift device 886 in a position corresponding to any cutting thickness, including, for example, the maximum cutting thickness, rather than the minimal cutting thickness as shown in the illustrative embodiment.

Figure 32:
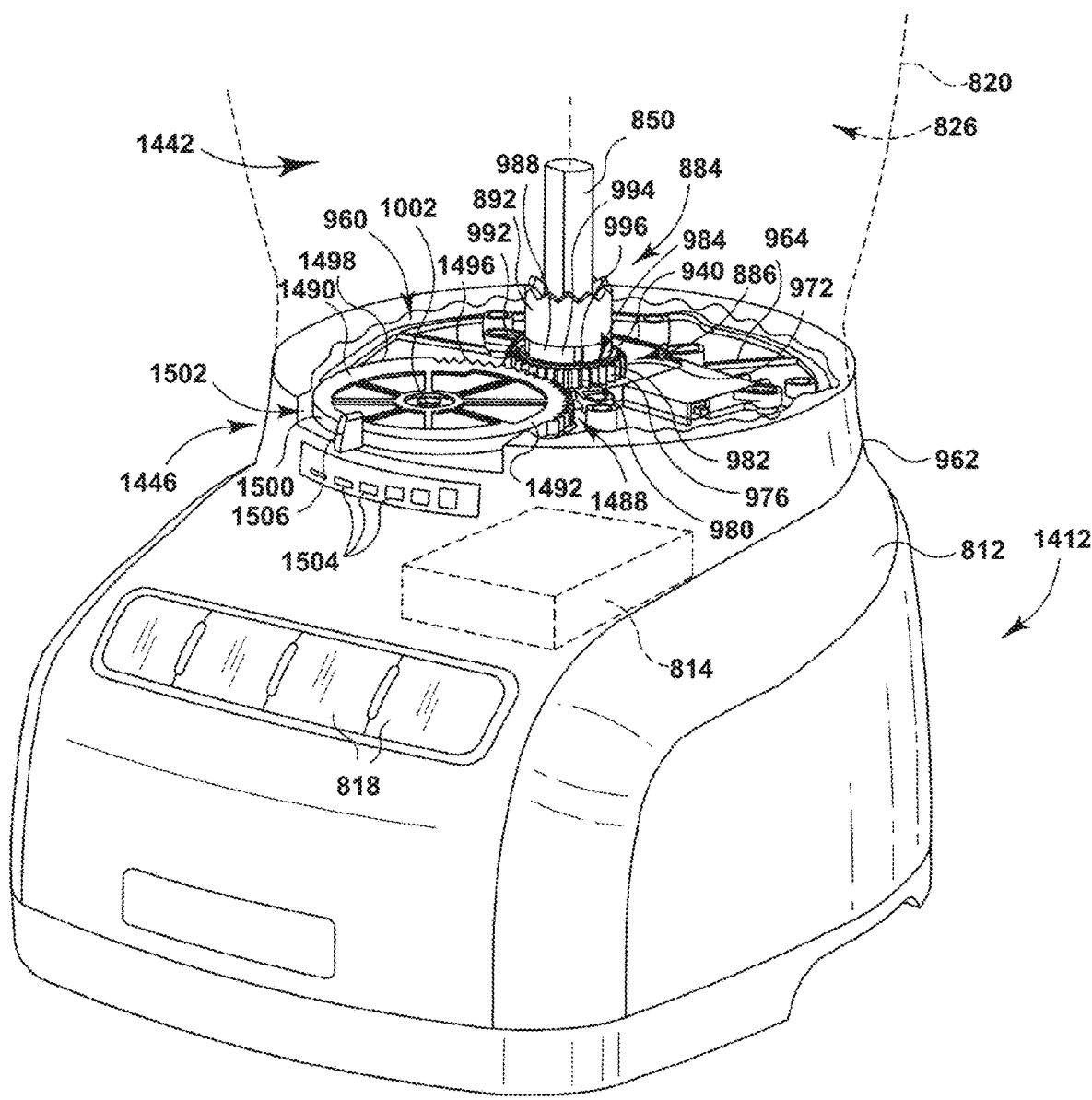
FIG. 32 is a partial cross-sectional perspective view of another embodiment of a base for a food processor.

Referring now to FIG. 32, another embodiment of a base (hereinafter base 1412) is shown. The base 1412 may be used with, for example, the other components of the food processor 810 described above in regard to FIGS. 23-28 or the components of the food processor 1210 described above in regard to FIGS. 30 and 31. The base 1412 includes another embodiment of a thickness adjustment assembly (hereinafter adjustment assembly 1442). The adjustment assembly 1442 includes a user-control device 1444 that is embodied as a thumbwheel 1446 that can be turned by a user to adjust the cutting thickness of the food processor 810, as described in greater detail below.

The base 1412 houses a motor 814 and a control unit. A bowl 820 may be secured to the base 1412, and a lid (not shown) may be secured to the bowl 820. Collectively, the lid and the bowl 820 define a processing chamber 826. Under the control of the control unit, the motor 814 drives a cutting assembly, such as, for example, the cutting assembly 816, which was described above in reference to FIGS. 23-28, or the cutting assembly 1216, which was described above in reference to FIGS. 30 and 31, to cut food items such as cheeses, meats, fruits, and vegetables in the processing chamber 826. The base 1412 also includes one or more buttons, switches, dials, or other types of controls 818. A user operates the controls 818 to control the operation of the motor 814 and hence the food processor.

The motor 814 includes an output shaft 850 extending upwardly from the base 812. The output shaft 850 is coupled to a drive stem (not shown), which is in turn configured to be secured to the cutting assembly. As described above in reference to FIGS. 23-28, the cutting assembly includes a cutting blade and a rotating disk configured to move upwardly and downwardly relative to the cutting blade to adjust the cutting thickness of the cutting assembly.

The thickness adjustment assembly 1442, like the adjustment assembly 842 of FIGS. 23-28, includes a two-piece adaptor 884 configured to be coupled to the cutting assembly and a lift device 886 supporting the adaptor 884. The lift device 886 is operable to move the adaptor 884 upwardly and downwardly relative to the base 1412, and, in that way, change the position of the rotating disk of the cutting assembly relative to the cutting blade of the cutting assembly, thereby adjusting the cutting thickness.

The adjustment assembly 1442 also includes a gear assembly 1488 is positioned in the base 1412. Similar to the gear assembly 888 described above in reference to FIGS. 23-28, the gear assembly 1488 is configured to operate the lift device 886. The thumbwheel 1446 is configured to operate the gear assembly 1488 (and hence the lift device 886) to change the thickness of the food items produced by the food processor.

The lift device 886 of the adjustment assembly 1442 includes a screw-type drive assembly that may be operated to adjust the position of the rotating disk of the cutting assembly relative to the base 812. As described above, it should be appreciated that in other embodiments the lift device may take the form of, for example, a series of ramp structures or cams that slide relative to one another to change the cutting thickness of the cutting assembly. The screw-type drive assembly includes an internally-threaded upper sleeve 940 that threadingly engages an externally-threaded lower sleeve (not shown) such that the upper sleeve 940 may be moved upwardly or downwardly relative to the base 812 by rotating the upper sleeve 940. For example, counter-clockwise rotation of the upper sleeve 940 may cause downward movement of the upper sleeve 940, while clockwise rotation of the upper sleeve 940 may cause upward movement of the upper sleeve 940.

As shown in FIG. 32, the adaptor 884 of the adjustment assembly 1442, like the adaptor 884 of FIGS. 23-28, includes an upper shaft (not shown) that is secured to the cutting assembly and a lower shaft 892 that is configured to be torsionally secured to the upper shaft. The lower shaft 892 is rotatably coupled to the upper sleeve 940 of the lift device 886. In that way, when the upper shaft is secured to the lower shaft 892, the assembled adaptor 884 (and hence the cutting assembly) is permitted to rotate relative to the upper sleeve 940. The lower shaft 892 is fixed axially relative to the upper sleeve 940 such that upward and downward movement of the upper sleeve 940 causes upward and downward movement of the lower shaft 892 of the adaptor 884. As described above in reference to FIGS. 23-28, when the adaptor 884 is assembled and the cutting assembly is secured thereto, the upward and downward movement of the upper sleeve 940 is thereby translated to the cutting assembly such that the rotating disk of the cutting assembly slides relative to the cutting blade to change the cutting thickness of the cutting assembly.

As shown in FIG. 32, the adjustment assembly 1442 also includes a gear assembly 1488 that is configured to operate the lift device 886. The base 1412 has a compartment 960 that is defined by an outer wall 962, and the gear assembly 1488 is positioned in the compartment 960. The gear assembly 1488 includes a drive gear 1490 and a guide gear 972 that are pivotally coupled to a platform 964 of the base 1412. The drive gear 1490 includes a body 1492 that is pivotally coupled to a platform 964 of the base 1412 via a pivot pin 1002. The body 1492 of the gear 1490 has a plurality of teeth 1496 defined on at least a portion of an outer surface 1498 thereof.

The guide gear 972 of the gear assembly 1488 has a body 982 configured to be rotatably coupled to the platform 964. The body 982 of the gear 972 has a plurality of teeth 976 defined on an outer surface 980 thereof. A number of the teeth 1496 of the drive gear 1490 are interdigitated with a number of the teeth 976 of the guide gear 972 such that rotation of the drive gear 1490 causes rotation of the guide gear 972.

The upper sleeve 940 of the lift device 886 is movably coupled to the guide gear 972. The body 982 of the guide gear 972 includes an opening 984 and an inner wall 188 extending downwardly from the opening 984. A plurality of splines 992 extend inwardly from the inner wall 988 of the gear 972. The upper sleeve 940 of the lift device 886 includes an outer surface 994 that has a plurality of grooves 996 defined therein, and each groove 996 is sized to receive one of the splines 992 of the gear 972, thereby coupling the sleeve 940 to the guide gear 972. As such, rotation of the guide gear 972 causes rotation of the upper sleeve 940 relative to the lower sleeve, which results in the sleeve 940 translating upwardly or downwardly relative to the base 1412.

As described above, the adjustment assembly 1442 includes a thumbwheel 1446 that is configured to operate the gear assembly 1288 (and hence the lift device 886) to change the thickness of the food items produced by the food processor. In the illustrative embodiment, the thumbwheel 1446 includes a grip 1500 defined on a portion of the outer surface 1498 of the drive gear 1490. As shown in FIG. 32, the outer wall 962 of the base 1412 has a slot 1502 defined therein, and the grip 1500 extends outwardly through the slot 1502 such that a user may access the grip 1500 to operate the gear assembly 1488.

As shown in FIG. 32, the base 1412 has a plurality of position markings 1504 defined thereon. Each position marking 1504 corresponds to an adjustment position of the adjustment assembly 1442, which in turn corresponds to one of a number of preset cutting positions of the cutting assembly. The grip 1500 of the control device 1444 also includes an indicator 1506 that may be aligned with one of the position markings 1504 to indicate the present position of the adjustment assembly 1442 and hence the cutting position of the cutting assembly. It should be appreciated that the base 1412, like the base 812 described above in regard to FIGS. 23-28, may include a locking mechanism configured to inhibit movement of the thumbwheel 1446 and thereby maintain the cutting assembly at a particular cutting position.

In use, a user operates the controls 818 to energize the motor 814 to rotate the output shaft 850. When the cutting assembly is secured the output shaft 850 via the drive stem, rotation of the output shaft 850 causes rotation of the cutting assembly. While the motor 814 is energized, the user may advance food items into the processing chamber 826 to be cut by the rotating cutting assembly.

If the user desires to change the cutting thickness during the cutting operation, the user may grasp the grip 1500 and rotate the thumbwheel 1446. As described above, rotation of the grip 1500 causes rotation of the drive gear 1490. As the drive gear 1490 is rotated, the guide gear 972 is also rotated, which causes the upper sleeve 940 of the lift device 886 to rotate and translate upwardly or downwardly relative to the base 1412. As described above, the vertical movement of the upper sleeve 940 moves the adaptor 884 and the rotating disk relative to the cutting blade and the base 1412 while the cutting blade remains fixed vertically. In that way, the thickness of food items cut by the cutting assembly may be adjusted while the cutting assembly is driven by the motor 814.

Figure 33:
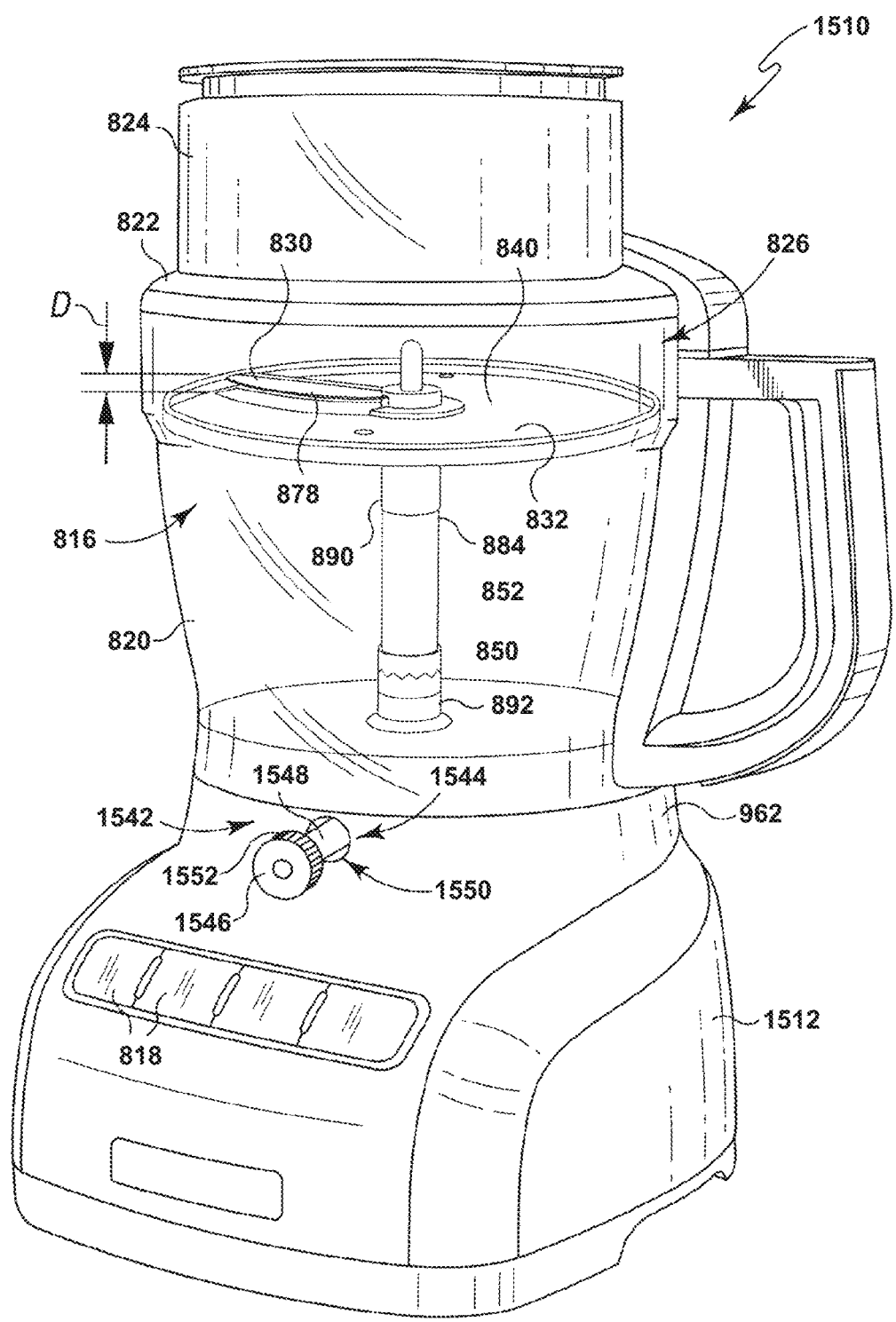
FIG. 33 is a perspective view of another embodiment of a food processor.
Figure 34:
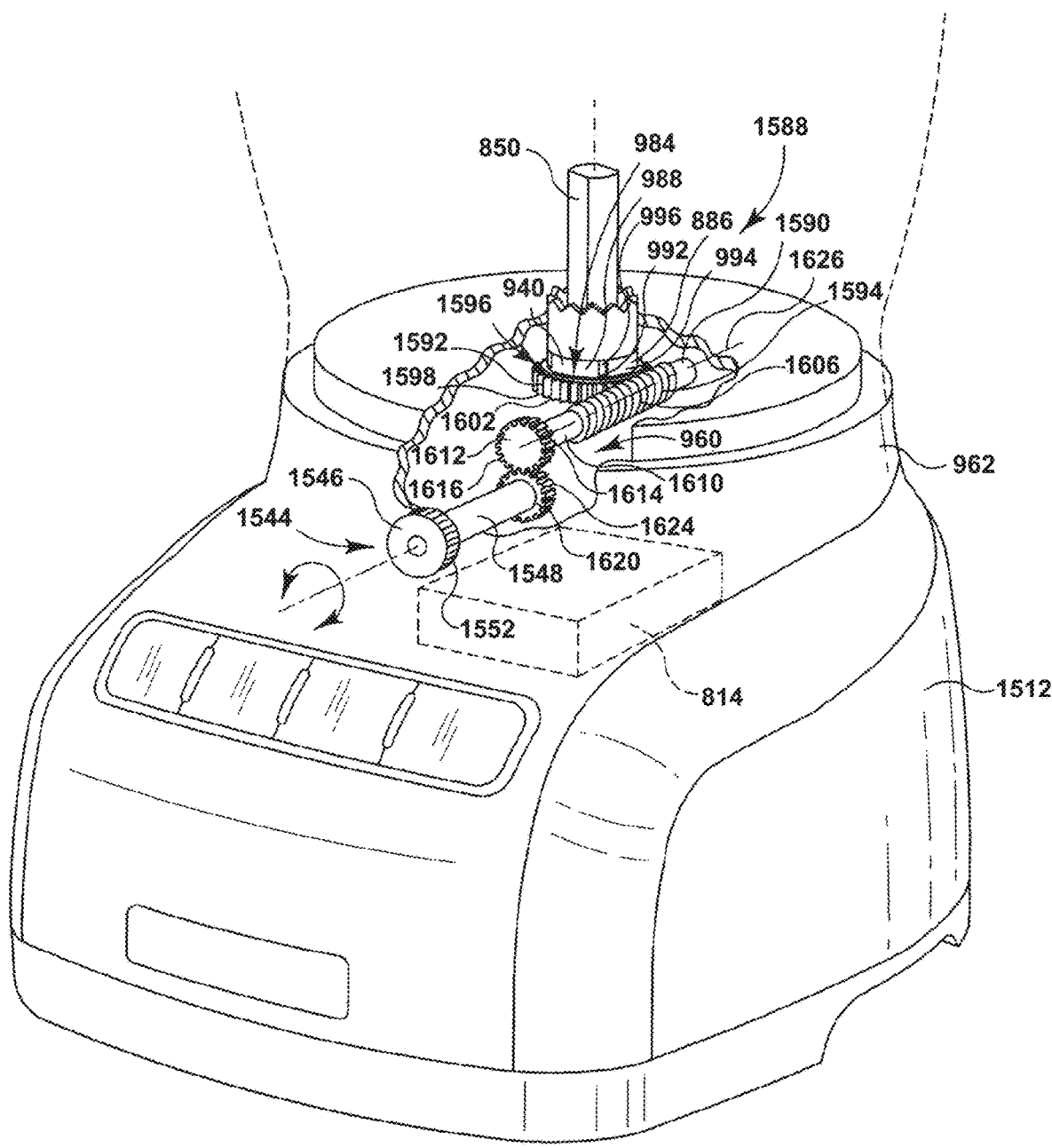
FIG. 34 is a partial cross-sectional perspective view of the food processor of FIG. 33.

Referring now to FIGS. 33 and 34, another embodiment of a food processor (hereinafter food processor 1510) is shown. In the food processor 1510, the base 812 described above in regard to FIGS. 23-28 has been replaced by a base 1512 that houses a motor 814 and a control unit. The food processor 1510, like the food processor 810 described above in regard to FIGS. 23-28, also includes a bowl 820 that is secured to the base 1512 and a lid 822 that is configured to be secured to the bowl 820. Collectively, the lid 822 and the bowl 820 define a processing chamber 826.

Under the control of the control unit, the motor 814 drives a cutting assembly 816 to cut food items such as cheeses, meats, fruits, and vegetables in the processing chamber 826. In other embodiments, the food processor 1510 may include another cutting assembly, such as, for example, the cutting assembly 1416, which was described above in reference to FIGS. 30 and 31. The base 1512 also includes one or more buttons, switches, dials, or other types of controls 818. A user operates the controls 818 to control the operation of the motor 814 and hence the food processor 1510.

The cutting assembly 816 of the food processor 1510 is driven by the motor 814 to cut food items. The motor 814 includes an output shaft 850 extending upwardly from the base 812. The output shaft 850 is coupled to a drive stem 852, which is in turn configured to be secured to the cutting assembly 816. As described above in reference to FIGS. 23-28, the cutting assembly 816 includes a cutting blade 830 and a rotating disk 832 configured to move upwardly and downwardly relative to the cutting blade 830 to adjust the cutting thickness of the cutting assembly 816.

The food processor 1510 includes another embodiment of a thickness adjustment assembly (hereinafter adjustment assembly 1542) that is operable by a user to vary the cutting thickness of the cutting assembly 816 during a cutting operation. The adjustment assembly 1542 includes a user-operated control device 1544 that is located outside of the processing chamber 826 of the food processor 1510. In the illustrative embodiment of FIGS. 33 and 34, the control device 1544 is embodied as a control knob 1546 that is positioned above the controls 818 of the base 1512. A shaft 1548 extends inwardly from the control knob 1546 through an opening 1550 defined in an outer wall 962 of the base 1512. The control knob 1546 includes a grip 1552, and a user may grasp the grip 1552 to rotate the control knob 1546 clockwise or counter-clockwise to change the distance D defined between a cutting edge 838 of a cutting blade 830 and an upper surface 840 of the rotating disk 832 of the cutting assembly 816.

The thickness adjustment assembly 1542 also includes a two-piece adaptor 884 that is coupled to the cutting assembly 816, as shown in FIG. 33. The adaptor 884 is supported by a lift device 886, which is operable to move the adaptor 884 upwardly or downwardly relative to the base 1512 of the food processor 1510. As described above in reference to FIGS. 23-28, the rotating disk 832 of the cutting assembly 816 is also moved upwardly or downwardly with the adaptor 884 such that the distance D (and hence the cutting thickness) is increased or decreased. The adjustment assembly 1542 also includes a gear assembly 1588 positioned in the base 1512. The gear assembly 1588 is configured to operate the lift device 886. The control knob 1546 is configured to operate the gear assembly 1588 (and hence the lift device 886) to change the thickness of the food items produced by the food processor 1510.

The lift device 886 of the adjustment assembly 1542 includes a screw-type drive assembly that may be operated to adjust the position of the rotating disk of the cutting assembly relative to the base 812. The screw-type drive assembly includes an internally-threaded upper sleeve 940 (see FIG. 34) that threadingly engages an externally-threaded lower sleeve (not shown) such that the upper sleeve 940 may be moved upwardly or downwardly relative to the base 812 by rotating the upper sleeve 940.

As shown in FIG. 33, the adaptor 884 of the adjustment assembly 1542 includes an upper shaft 890 that is secured to the rotating disk 832 of the cutting assembly 816, and a lower shaft 892 that is rotatably coupled to the upper sleeve 940 of the lift device 886. In that way, the adaptor 884 (and hence the cutting assembly) is permitted to rotate relative to the upper sleeve 940. The lower shaft 892 is fixed axially relative to the upper sleeve 940 such that upward and downward movement of the upper sleeve 940 of the lift device 886 causes upward and downward movement of the lower shaft 892 of the adaptor 884.

As shown in FIG. 34, the adjustment assembly 1542 also includes a gear assembly 1588 that is configured to operate the lift device 886. The base 1512 has a compartment 960 that is defined by the outer wall 962, and the gear assembly 1588 is positioned in the compartment 960. The gear assembly 1588 includes a drive gear 1590 and a guide gear 1592. In the illustrative embodiment the drive gear 1590 includes a worm or screw 1594, and the guide gear 1592 is a worm gear 1596 that meshes with the screw 1594.

The worm gear 1596 of the gear assembly 1588 has a body 1598 that is rotatably coupled to the base 1512. The body 1598 of the gear 1596 has a plurality of teeth 1602 defined thereon. The screw 1594 of the drive gear 1590 also includes a plurality of teeth 1606 that are interdigitated with a number of the teeth 1602 of the worm gear 1596. As a result, rotation of the drive gear 1490 causes rotation of the worm gear 1596.

The upper sleeve 940 of the lift device 886 is movably coupled to the worm gear 1596. As shown in FIG. 34, the body 1598 of the worm gear 1596 includes an opening 984 and an inner wall 988 extending downwardly from the opening 984. A plurality of splines 992 extend inwardly from the inner wall 988 of the worm gear 1596. The upper sleeve 940 of the lift device 886 includes an outer surface 994 that has a plurality of grooves 996 defined therein, and each groove 996 is sized to receive one of the splines 992 of the worm gear 1596, thereby coupling the sleeve 940 to the worm gear 1596. As such, rotation of the worm gear 1596 causes rotation of the upper sleeve 940 relative to the lower sleeve 942, which results in the sleeve 940 translating upwardly or downwardly relative to the base 1512.

The gear assembly 1588 also includes a drive shaft 1510 connected to the screw 1594. The shaft 1510 has an external gear, such as, for example, a spur gear 1512 attached at an end 1514 thereof. As shown in FIG. 34, the spur gear 1612 has a plurality of teeth 1616 defined thereon. The gear assembly 1588 includes another external gear, such as, for example, a spur gear 1620, which is attached at an end 1622 of the shaft 1548 of the control device 1544. The spur gear 1620 has a plurality of teeth 1624 defined thereon that are interdigitated with the teeth 1616 of the spur gear 1612 of the drive shaft 1610. In that way, the control knob 1546 of the control device 1544 is connected to the gear assembly 1588 such that rotation of the control knob 1546 results in rotation of the screw 1594 and the gears 1596, 1612, and 1620.

In use, a user may operate the controls 818 to energize the motor 814 to rotate the output shaft 850. Because the cutting assembly 816 is secured the output shaft 850 via the drive stem 852, rotation of the output shaft 850 causes rotation of the cutting assembly 816. While the motor 814 is energized, the user may advance food items into the processing chamber 826 to be cut by the rotating cutting assembly.

If the user desires to change the cutting thickness during the cutting operation, a user may grasp the grip 1552 of the control knob 1546 and rotate the control knob 1546 clockwise or counter-clockwise while the cutting assembly 816 is driven by the motor 814. As the control knob 1546 is rotated, the spur gear 1620 on the shaft 1548 acts on the spur gear 1512 of the drive gear 1590 to rotate the drive gear 1590 about its longitudinal axis 1626. Rotation of the drive gear 1590 causes the screw 1594 to act on the worm gear 1596, which results in rotation of the worm gear 1596. As described above, rotation of the worm gear 1596 causes rotation of the upper sleeve 940, and the sleeve 940 (and hence the adaptor 884 and the rotating disk 832) translates upwardly or downwardly relative to the base 1512. In that way, the distance D defined between a cutting edge 838 of a cutting blade 830 and an upper surface 840 of the rotating disk 832 of the cutting assembly 816 may be changed, resulting in thicker or thinner food items.

It should be appreciated that the food processor 1510 may include one or more position markings that correspond to preset cutting positions for the cutting assembly 816. It should also be appreciated that the food processor 1510, like the food processor 810 described above in regard to FIGS. 23-28, may include a locking mechanism configured to inhibit movement of the control knob 1546 and thereby maintain the cutting assembly 816 at a particular cutting position. In other embodiments, the gear assembly may include other gear arrangements to translate the rotation of the control knob 1546 into movement of the rotating disk. For example, referring now to FIG. 35, another embodiment of a gear assembly (hereinafter gear assembly 988) is shown.

Similar to the gear assembly 1588, the gear assembly 1688 is configured to operate the lift device 886. The gear assembly 1688 is positioned in the compartment 960 of the base 1512, and the gear assembly 1688 includes a guide gear 1690, a rack gear 1692, and a pinion gear 1694 that are movably coupled to the base 1512. The guide gear 1690 of the gear assembly 1688 has a body 982 configured to be rotatably coupled to the base 1512. The body 982 of the gear 1590 has a plurality of teeth 976 defined on an outer surface 980 thereof.

Figure 35:
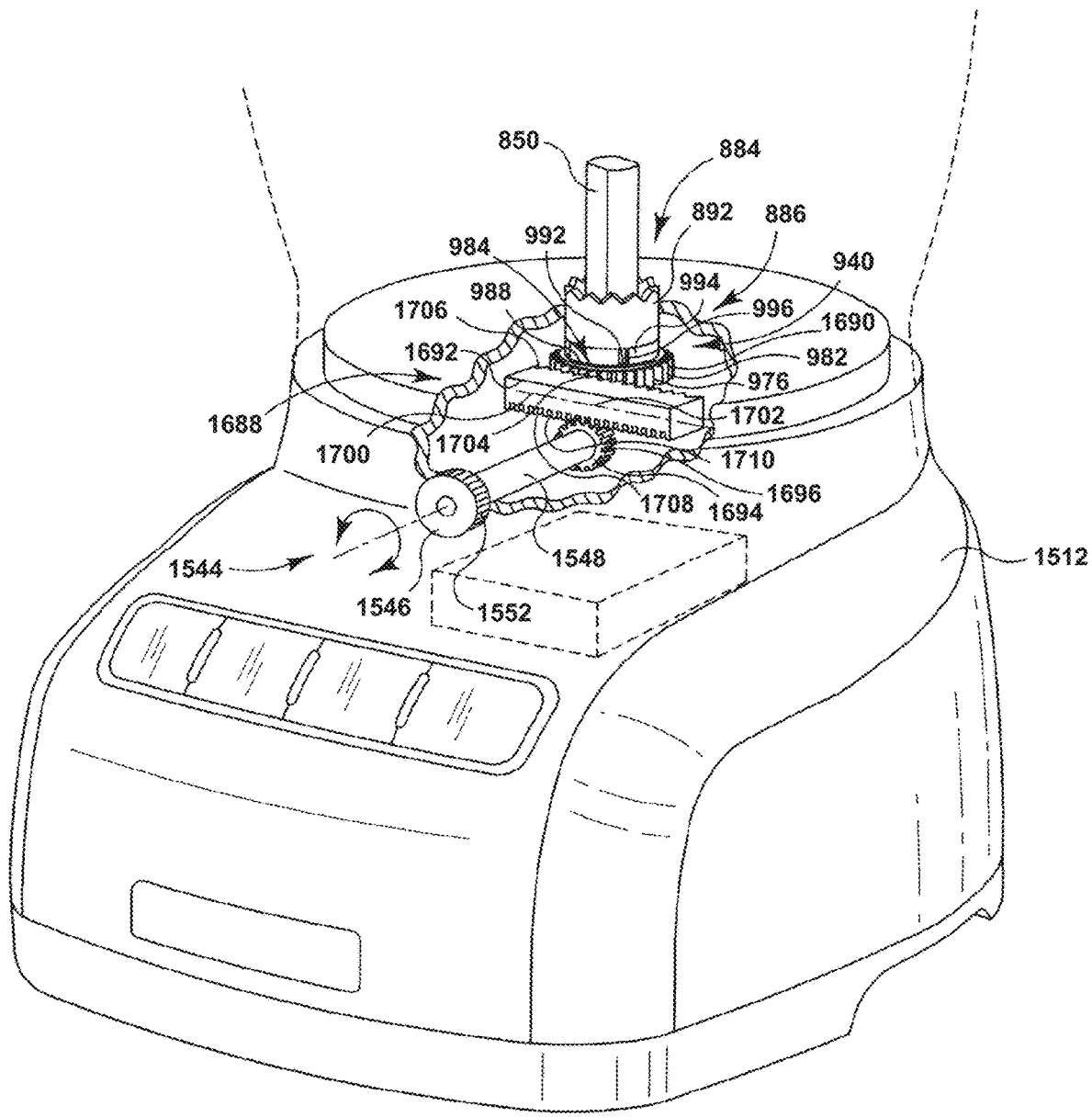
FIG. 35 is a partial cross-sectional perspective view of another embodiment of a base for the food processor of FIG. 33.

As shown in FIG. 35, the upper sleeve 940 of the lift device 886 is movably coupled to the guide gear 1590. The body 982 of the guide gear 1590 includes an opening 984 and an inner wall 988 extending downwardly from the opening 984. A plurality of splines 992 extend inwardly from the inner wall 988 of the gear 1590. The upper sleeve 940 of the lift device 886 includes an outer surface 994 that has a plurality of grooves 996 defined therein, and each groove 996 is sized to receive one of the splines 992 of the gear 1590, thereby coupling the sleeve 940 to the guide gear 1590. As such, rotation of the guide gear 1690 causes rotation of the upper sleeve 940 relative to the lower sleeve 942, which results in the sleeve 940 translating upwardly or downwardly relative to the base 1512.

As described above, the external control device 1544 of the food processor 1510 includes a control knob 1546 and a shaft 1548 extending inwardly from the control knob 1546 into the base 1512. The shaft 1548 has the pinion gear 1694 of the gear assembly 1688 secured at an end 1622 thereof. The pinion gear 1694 is an external gear that has a plurality of teeth 1696 defined on an outer surface thereof.

The pinion gear 1694 of the gear assembly 1688 meshes with the rack gear 1692. The rack gear 1692 includes a rectangular body 1700 that is configured to slide along a longitudinal axis 1702. The rack gear 1692 has a plurality of teeth 1704 defined on one side 1706 of the body 1700 and another plurality of teeth 1708 defined on a bottom side 1810. As shown in FIG. 35, a number of the teeth 1704 of the rack gear 1692 are interdigitated with a number of the teeth 976 of the guide gear 1690. Additionally, a number of the teeth 1708 of the rack gear 1692 are interdigitated with a number of the teeth 1696 of the pinion gear 1694. As a result, when the pinion gear 1694 is rotated, the rack gear 1692 is moved along the axis 1702, thereby causing the guide gear 1690 to rotate such that the upper sleeve 940 rotates and translates upwardly or downwardly relative to the base 1512.

In use, while the cutting assembly is driven by the motor 814, a user may grasp the grip 1552 of the control knob 1546 and rotate the control knob 1546 clockwise or counterclockwise while the cutting assembly 816 is driven by the motor 814. As the control knob 1546 is rotated, the pinion gear 1594 of the gear assembly 1688 is rotated. Rotation of the pinion gear 1694 causes the rack gear 1692 to slide along the axis 1702 and thereby rotate the guide gear 1690. As described above, rotation of the guide gear 1690 causes rotation of the upper sleeve 940, and the sleeve 940 (and hence the adaptor 884 and the rotating disk 832) translates upwardly or downwardly relative to the base 1512. In that way, the distance D defined between a cutting edge 838 of a cutting blade 830 and an upper surface 840 of the rotating disk 832 of the cutting assembly 816 may be changed, resulting in thicker or thinner food items.

Figure 36:
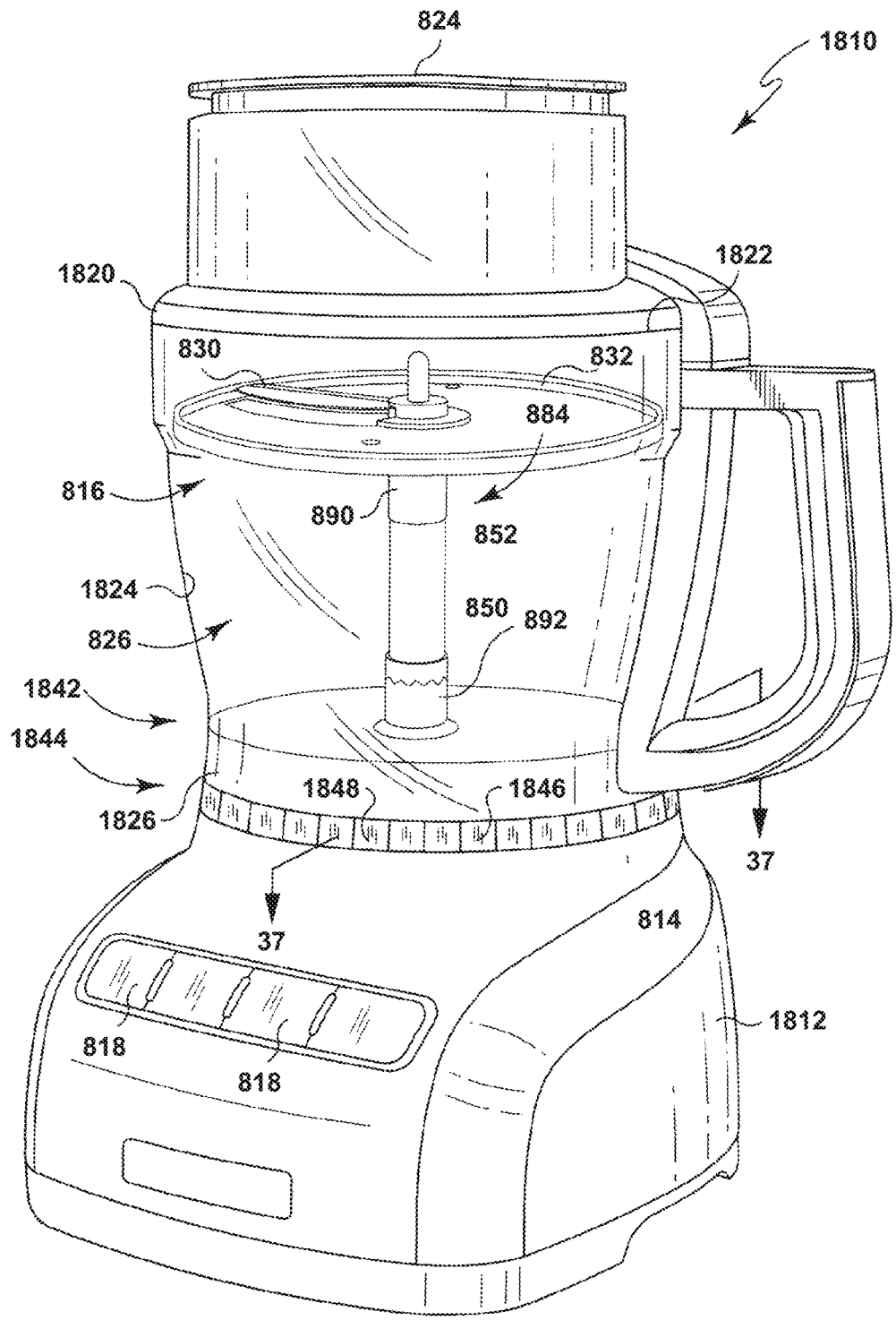
FIG. 36 is a perspective view of another embodiment of a food processor.
Figure 37:
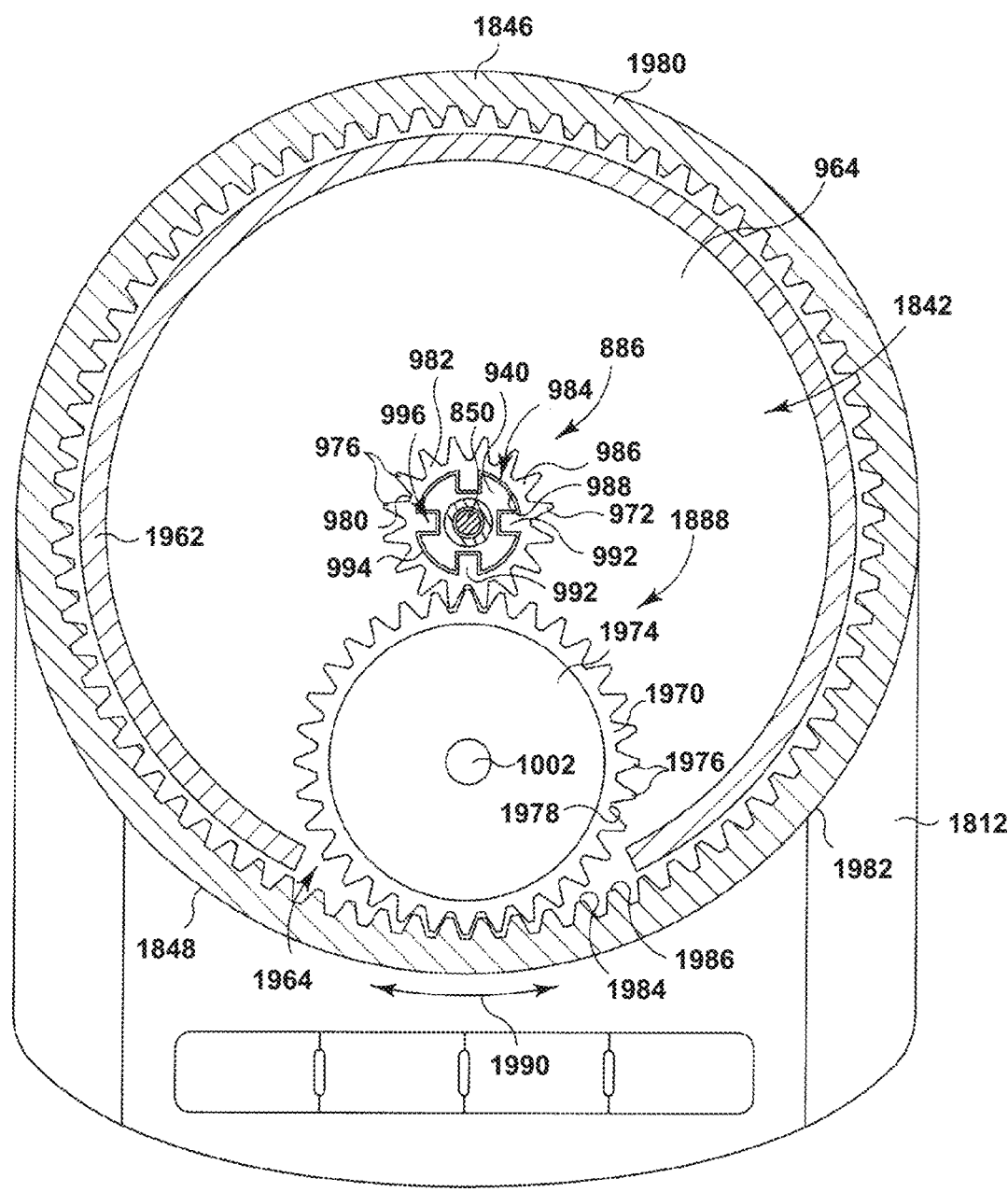
FIG. 37 is a cross-sectional top plan view of the food processor of FIG. 36.

Referring now to FIGS. 36 and 37, another embodiment of a food processor (hereinafter food processor 1810) is shown. In the food processor 1810, the base 812 and the bowl 820 described above in regard to FIGS. 23-28 have been replaced by a base 1812 and a bowl 1820 that includes another embodiment of a thickness adjustment assembly (hereinafter adjustment assembly 1842). The adjustment assembly 1842 includes a user-control device 1844 that is embodied as a control strip 1846 rotatably coupled to the bowl 1820. The strip 1846 includes a grip 1848 that can be operated by a user to adjust the cutting thickness of the food processor 1810, as described in greater detail below.

The base 1812 of the food processor 1810 houses a motor 814 and a control unit. Under the control of the control unit, the motor 814 drives a cutting assembly 816 to cut food items such as cheeses, meats, fruits, and vegetables. The base 1812 also includes one or more buttons, switches, dials, or other types of controls 818. A user operates the controls 818 to control the operation of the motor 814 and hence the food processor 1810.

The removable receptacle or bowl 1820 is secured to the base 1812 and has a removable lid 822 secured thereto. The bowl 1820 has an upper rim 1822 and an inner wall 1824 that extends downwardly from the upper rim 1822 to define part of a processing chamber 826 where food items may be processed by the cutting assembly 816. The removable lid 822 is secured to the rim 1822 of the bowl 1820. In that way, the removable lid 822 and the bowl 1820 cooperate to define the processing chamber 826.

The bowl 1820 of the food processor 1810 has a lower rim 1826 that is positioned below the processing chamber 826. The strip 1846 of the control device 1844 is attached to the lower rim 1826, and is configured to rotate relative to the lower rim 1826. In the illustrative embodiment, a portion of the strip 1846 is received in a track (not shown) defined in the lower rim 1826 such that the strip 1846 is rotatably coupled to the bowl 1820. It should be appreciated that in other embodiments the strip 1846 may be secured to the bowl 1820 by any combination of pins, tabs, slots, or openings that permit the strip 1846 to rotate relative to the bowl 1820. It should also be appreciated that in other embodiments the control strip may be rotatably coupled to the base rather than the bowl or may be a separate component.

The cutting assembly 816 of the food processor 1810 is driven by the motor 814 to cut food items. The motor 814 includes an output shaft 850 extending upwardly from the base 812. The output shaft 850 is coupled to a drive stem 852, which is in turn configured to be secured to the cutting assembly 816. As described above in reference to FIGS. 23-28, the cutting assembly 816 includes a cutting blade 830 and a rotating disk 832 configured to move upwardly and downwardly relative to the cutting blade 830 to adjust the cutting thickness of the cutting assembly 1816.

As shown in FIGS. 36 and 37, the adjustment assembly 1842 of the food processor 1810 includes a two-piece adaptor 884 coupled to the cutting assembly 816, a lift device 86 supporting the adaptor 884 and the cutting assembly 816, and a gear assembly 1888 positioned in the base 1812. The lift device 886 is operable to move the adaptor 884 upwardly and downwardly relative to the base 1812, and, in that way, change the thickness of food items cut by the cutting assembly. The gear assembly 1888 is configured to operate the lift device 886, and the control strip 1846 is configured to operate the gear assembly 1888 (and hence the lift device 886) to change the thickness of the food items produced by the food processor 1810.

The lift device 886 of the adjustment assembly 1842 includes a screw-type drive assembly that may be operated to adjust the position of the rotating disk of the cutting assembly relative to the base 1812. The screw-type drive assembly includes an internally-threaded upper sleeve 940 that threadingly engages an externally-threaded lower sleeve (not shown) such that the upper sleeve 940 may be moved upwardly or downwardly relative to the base 1812 by rotating the upper sleeve 940.

As shown in FIG. 36, the adaptor 884 of the adjustment assembly 1842 includes an upper shaft 890 that is secured to the rotating disk 832 of the cutting assembly 816, and a lower shaft 892 that is rotatably coupled to the upper sleeve 940 of the lift device 886. In that way, the adaptor 884 (and hence the cutting assembly) is permitted to rotate relative to the upper sleeve 940. The lower shaft 892 is fixed axially relative to the upper sleeve 940 such that upward and downward movement of the upper sleeve 840 of the lift device 886 causes upward and downward movement of the lower shaft 892 of the adaptor 884.

As shown in FIG. 37, the adjustment assembly 1842 also includes a gear assembly 1888 that is configured to operate the lift device 886. The base 1812 has a compartment 960 that is defined by an outer wall 1962, and the gear assembly 1888 is positioned in the compartment 960. The gear assembly 1888 includes a drive gear 1970 and a guide gear 972 that are pivotally coupled to a platform 964 of the base 1912. A slot 1964 is defined in the outer wall 1962 of the base 1912, and the drive gear 1970 includes a body 1974 that is partially positioned in the slot 1964. The body 1974 of the drive gear 1970 is pivotally coupled to a platform 964 of the base 1812 via a pivot pin 1002. The body 1974 also has a plurality of teeth 1976 defined on an outer surface 1978 thereof.

The guide gear 972 of the gear assembly 1888 has a body 982 that is configured to be rotatably coupled to the platform 964. The body 982 of the gear 972 has a plurality of teeth 976 defined on an outer surface 980 thereof. A number of the teeth 1976 of the drive gear 1970 are interdigitated with a number of the teeth 976 of the guide gear 972 such that rotation of the drive gear 1970 causes rotation of the guide gear 972.

The upper sleeve 940 of the lift device 886 is movably coupled to the guide gear 972. The body 982 of the guide gear 972 includes an opening 984 defined in an upper surface 986 and an inner wall 988 extending downwardly from the opening 984. A plurality of splines 992 extend inwardly from the inner wall 988 of the gear 972. The upper sleeve 940 of the lift device 886 includes an outer surface 994 that has a plurality of grooves 996 defined therein, and each groove 996 is sized to receive one of the splines 992 of the gear 972, thereby coupling the sleeve 940 to the guide gear 972. As such, rotation of the guide gear 972 causes the rotation of the upper sleeve 940 relative to the lower sleeve 942, which results in the sleeve 940 translating upwardly or downwardly relative to the base 1912.

As shown in FIG. 37, the control strip 1846 includes a ring body 1980 that extends around the outer circumference of the wall 1962. The ring body 1980 has an outer surface 1982 and an inner surface 1984 positioned opposite the outer surface 1982. A plurality of teeth 1986 are defined on the inner surface 1984, and a number of the teeth 1986 are interdigitated with a number of the teeth 1976 of the drive gear 1970. As such, rotation of the control strip 1846 in either direction indicated by arrow 1990 causes the rotation of the drive gear 1970 and the guide gear 972. The grip 1848 of the control strip 1846 is defined on the outer surface 1982 of the ring body 1980, and, as described above, the grip 1848 may be utilized by a user to operate the adjustment assembly 1842.

In use, a user may operate the controls 818 to energize the motor 814 to rotate the output shaft 850. Because the cutting assembly 816 is secured the output shaft 850 via the drive stem 852, rotation of the output shaft 850 causes rotation of the cutting assembly. While the motor 814 is energized, the user may advance food items into the processing chamber 826 to be cut by the rotating cutting assembly.

To adjust the cutting thickness while the cutting assembly 816 is driven by the motor 814, the user may grasp the grip 1848 to rotate the control strip 1846. The control strip 1046 acts on the drive gear 1970 and thereby causes the drive gear 1970 to begin rotating. The rotation of the drive gear 1970 causes the rotation of the guide gear 972, which results in the upper sleeve 940 of the lift device 886 to rotate and translate upwardly or downwardly relative to the base 1812. As described above, the vertical movement of the upper sleeve 940 moves the adaptor 884 and the rotating disk 832 relative to the base 1412 while the cutting blade 830 remains fixed vertically. In that way, the thickness of food items cut by the cutting assembly may be adjusted while the cutting assembly is driven by the motor 814.

It should be appreciated that the food processor 1810 may include a locking mechanism similar to the locking mechanism 1020 described above in reference to FIGS. 23-28, which is configured to inhibit movement of the control strip 1846 and thereby maintain the cutting assembly 816 at a particular cutting position. Additionally, it should also be appreciated that the bowl or base may include one or more locating features to guide a user in properly positioning the bowl on the base. The food processor 1810 may also include position markings that indicate the cutting thickness of the cutting assembly 816.

Figure 38:
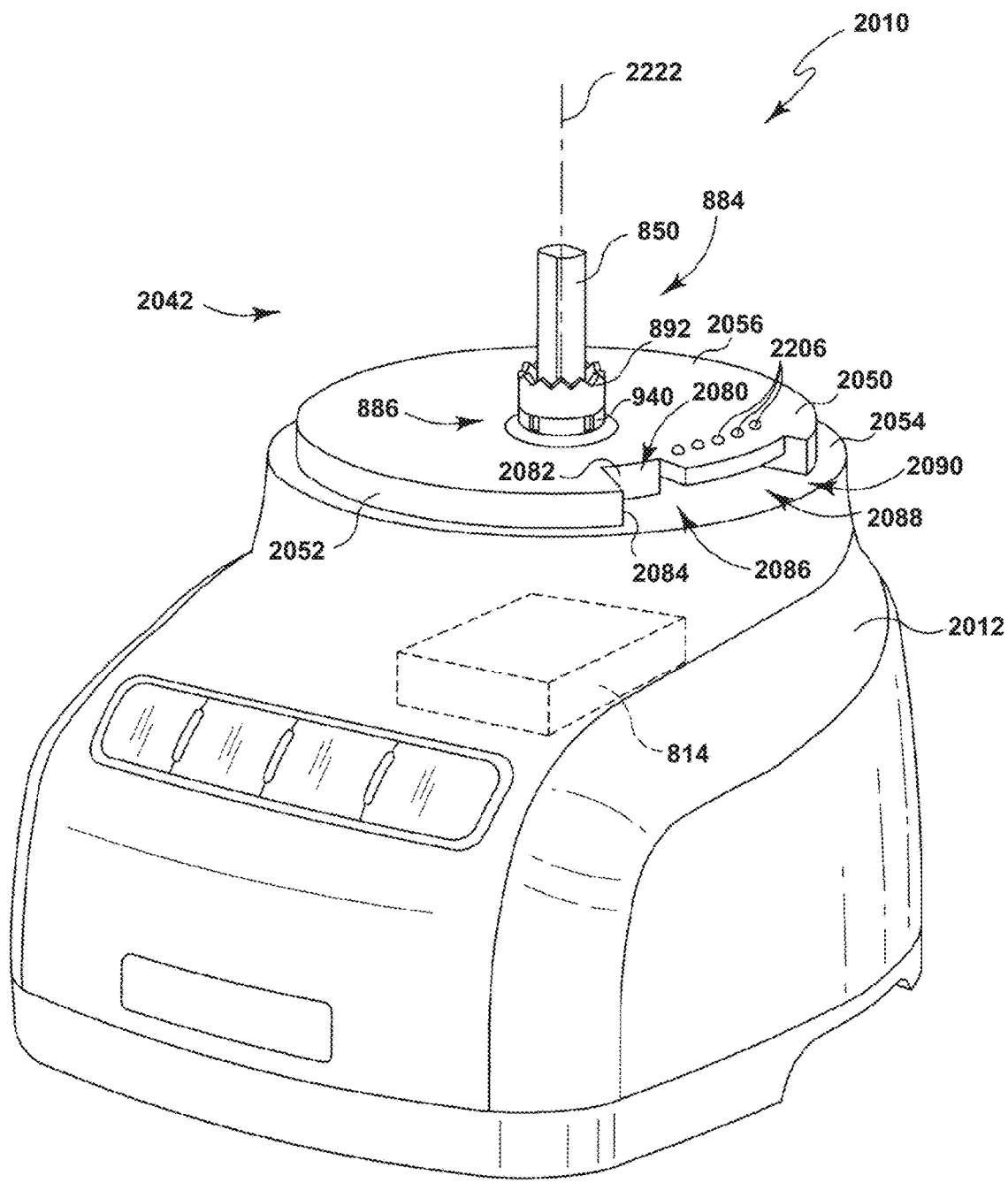
FIG. 38 is a perspective view of another embodiment of a food processor showing another embodiment of a base.
Figure 39:
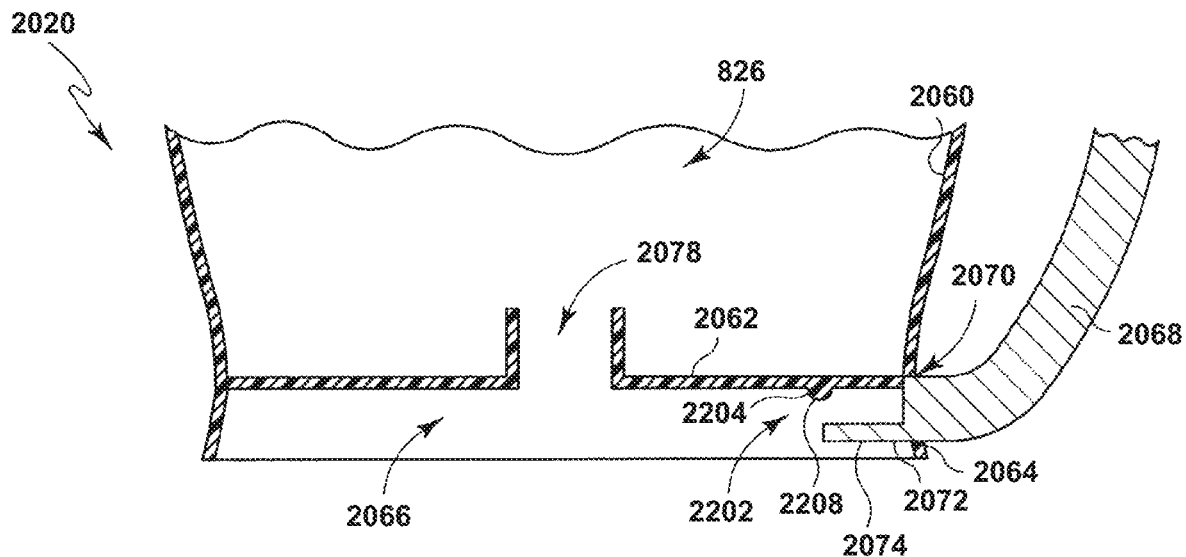
FIG. 39 is a cross-sectional side elevation view of another embodiment of a removable bowl for use with the base of FIG. 38.

Referring now to FIGS. 38-39, another embodiment of a food processor (hereinafter food processor 2010) is shown. The food processor 2010 includes another embodiment of a base (hereinafter base 2012) and another embodiment of a bowl (hereinafter bowl 2020). The food processor 2010 also includes another embodiment of a thickness adjustment assembly (hereinafter adjustment assembly 2042) that is operable to change the thickness of cut food items produced by the food processor 2010. To operate the adjustment assembly 2042, a user rotates the bowl 2020 about an axis 2222 relative to the base 2012, as described in greater detail below.

The base 2012, like the base 812 described above in reference to FIGS. 23-28, houses a motor 814 and a control unit. Under the control of the control unit, the motor 814 drives a cutting assembly to cut food items such as cheeses, meats, fruits, and vegetables. The cutting assembly may be, for example, the cutting assembly 816, which was described above in reference to FIGS. 23-28, or the cutting assembly 1216, which was described above in reference to FIGS. 30 and 31.

The base 2012 of the food processor 2010 includes one or more buttons, switches, dials, or other types of controls 818. A user operates the controls 818 to control the operation of the motor 814 and hence the food processor 2010. The motor 814 includes an output shaft 850 that is configured to be coupled to a drive stem (not shown), which is in turn configured to be secured to the cutting assembly. In that way, driving force generated by the motor 814 may be transferred to the cutting assembly. As shown in FIG. 38, the base 2012 also includes a mounting platform 2050 configured to receive the bowl 2020 thereon, and the output shaft 850 extends upwardly from the mounting platform 2050. The mounting platform 2050 has an outer wall 2052 that extends upwardly from a rim surface 2054 of the base 2012 and an upper surface 2056.

Figure 40:
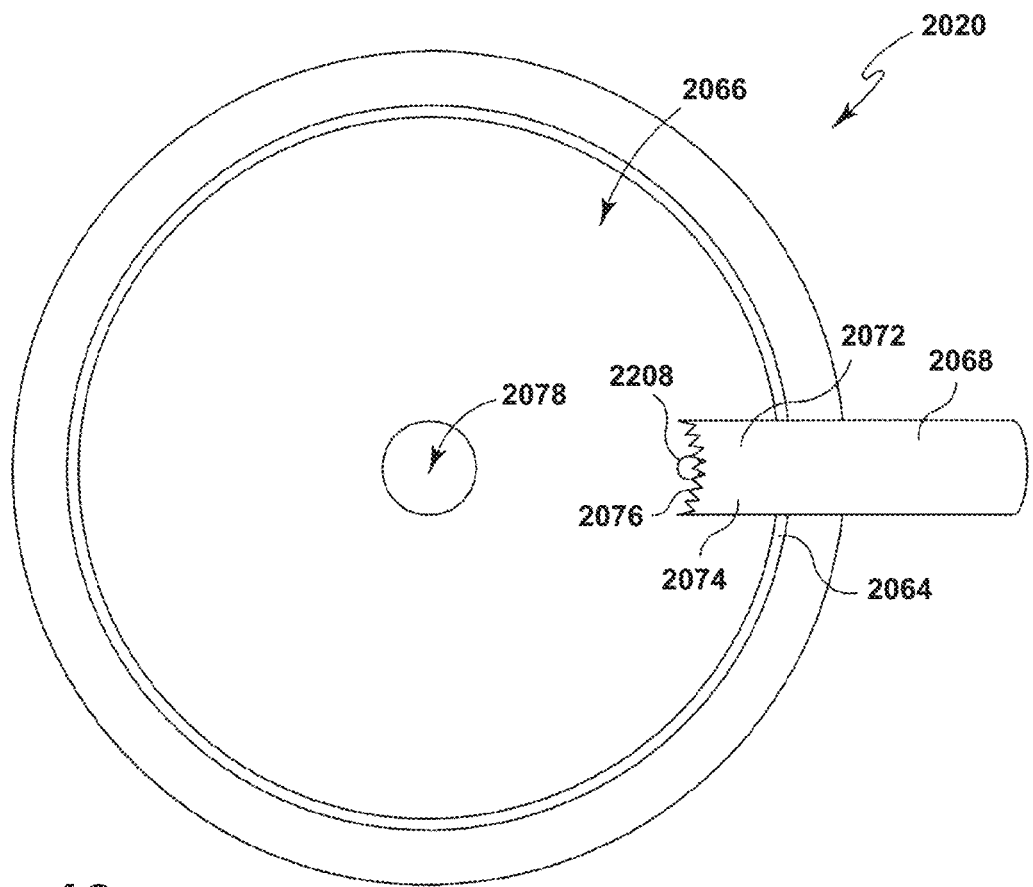
FIG. 40 is a bottom plan view of the removable bowl of FIG. 39.

As shown in FIGS. 39 and 40, the bowl 2020 of the food processor 2010 has an inner wall 2060 that extends downwardly from an upper rim (not shown) to a bottom wall 2062. The inner wall 2060 and the bottom wall 2062 cooperate to define part of a processing chamber 826 where food items may be processed by the cutting assembly. A removable lid, such as, for example, the lid 822 described above in reference to FIGS. 23-28, may be secured to the bowl 2020. Collectively, the lid 822 and the bowl 2020 cooperate to define the processing chamber 826. The bottom wall 2062 also includes an opening 2078 sized such that the output shaft 850 and part of the adjustment assembly 2042 may extend therethrough.

The bowl 2020 also includes a lower wall 2064 that is positioned below the processing chamber 826. The lower wall 2064 and the bottom wall 2062 define a lower chamber 2066 that is sized to receive the mounting platform 2050 of the base 2012. The bowl 2020 has a handle 2068 that facilitates placement of the bowl 2020 on the base 2012, and the handle 2068 is received in an opening 2070 defined in the lower wall 2064. The handle 2068 has an arm 2072 that extends inwardly from the lower wall 2064 to an end 2074. As shown in FIG. 40, the end 2074 of the arm 2072 has a plurality of teeth 2076 defined thereon.

Returning to FIG. 38, the upper surface 2056 of the mounting platform 2050 has an opening 2080 defined therein. Inner walls 2082, 2084 extend downwardly from the opening 2080 to define a pocket 2086 in the mounting platform 2050. The pocket 2086 is sized to receive the arm 2072 of the bowl 2020. The mounting platform 2050 also has a track 2088 defined in the outer wall 2052, and the track 2088 is similarly sized to receive the arm 2072. As shown in FIG. 28, the track 2088 is connected to the pocket 2086, and the pocket 2086 and the track 2088 cooperate to form a slot 2090 in the mounting platform 2050.

The thickness adjustment assembly 2042, like the adjustment assembly 842 of FIGS. 23-28, includes a two-piece adaptor 884 configured to be coupled to the cutting assembly and a lift device 886 supporting the adaptor 884. The lift device 886 is operable to move the adaptor 884 upwardly and downwardly relative to the base 2012, and, in that way, change the position of the rotating disk of the cutting assembly relative to the cutting blade of the cutting assembly, thereby adjusting the cutting thickness.

The adjustment assembly 2042 of the food processor 2010 also includes a gear assembly 2188 positioned in the base 2012 Similar to the gear assembly 888 described above in reference to FIGS. 23-28, the gear assembly 2188 is configured to operate the lift device 886 to lower and raise the adaptor 884. The bowl 2020 is configured to engage the gear assembly 2188 so that a user may change the thickness of the food items produced by the food processor 1010 while the cutting assembly is driven by the motor 814.

The lift device 886 of the adjustment assembly 2042 includes a screw-type drive assembly that may be operated to adjust the position of the rotating disk of the cutting assembly relative to the cutting blade and to the base 812. The screw-type drive assembly includes an internally-threaded upper sleeve 940 that threadingly engages an externally-threaded lower sleeve (not shown) such that the upper sleeve 940 may be moved upwardly or downwardly relative to the base 2012 by rotating the upper sleeve 940.

As shown in FIG. 38, the adaptor 884 of the adjustment assembly 2042 includes an upper shaft (not shown) that is secured to the cutting assembly and a lower shaft 892 that is configured to be torsionally secured to the upper shaft. The lower shaft 892 is rotatably coupled to the upper sleeve 940 of the lift device 886. In that way, when the upper shaft is secured to the lower shaft 892, the assembled adaptor 884 (and hence the cutting assembly) is permitted to rotate relative to the upper sleeve 940. The lower shaft 892 is fixed axially relative to the upper sleeve 940 such that upward and downward movement of the upper sleeve 940 causes upward and downward movement of the lower shaft 892 of the adaptor 884. As described above in reference to FIGS. 23-28, when the adaptor 884 is assembled and the cutting assembly is secured thereto, the upward and downward movement of the upper sleeve 940 is thereby translated to the cutting assembly such that the rotating disk of the cutting assembly slides relative to the cutting blade to change the cutting thickness of the cutting assembly.

Figure 41:
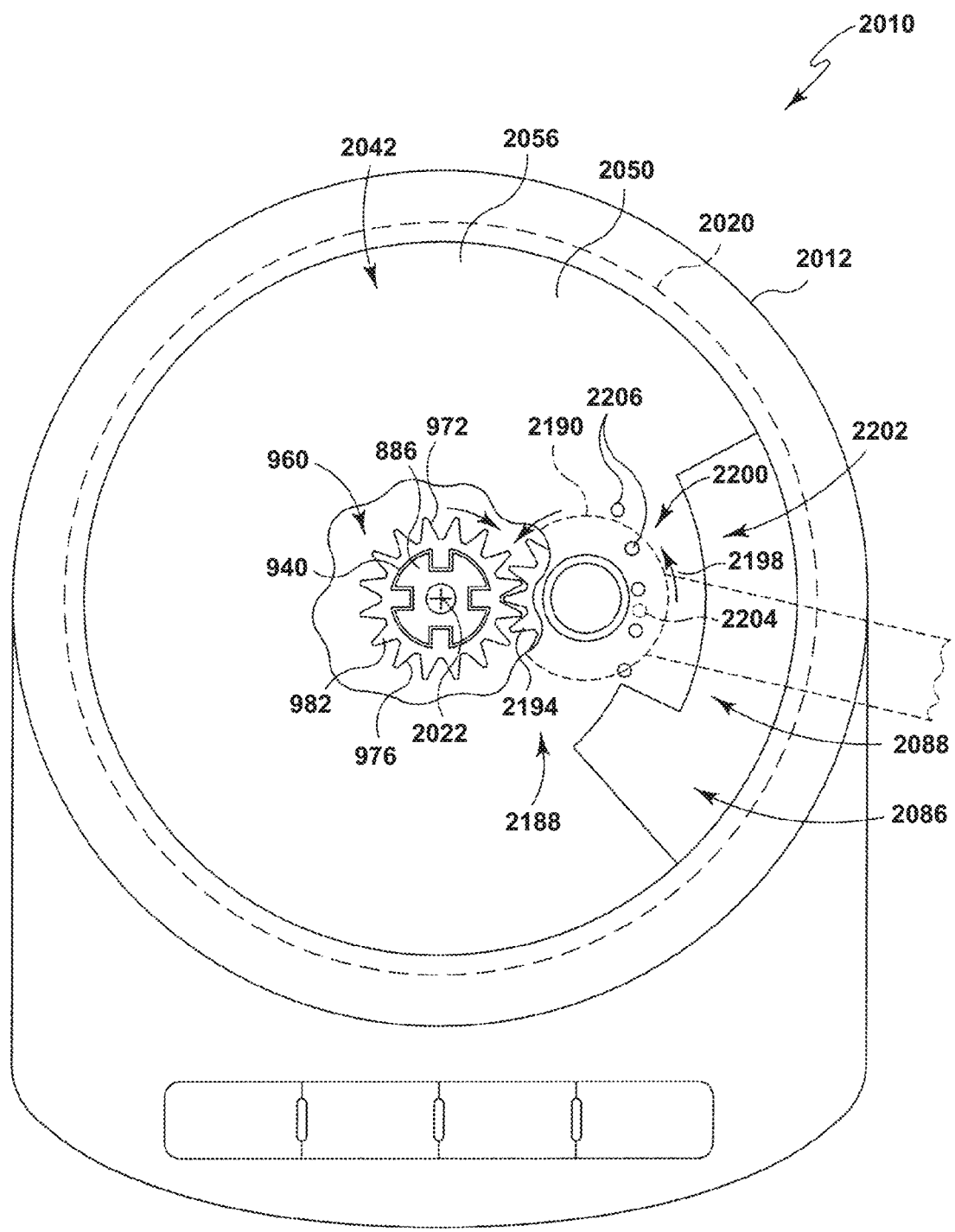
FIG. 41 is a top plan view of the removable bowl of FIG. 39 attached to the base of FIG. 38.

As shown in FIG. 41, the adjustment assembly 2042 also includes a gear assembly 2188 that is configured to operate the lift device 886. The base 2012 has a compartment 960, and the gear assembly 2188 is positioned in the compartment 960. The gear assembly 2188 includes a drive gear 2190 and a guide gear 972 that are pivotally coupled to the base 2012. The drive gear 2190 includes a body 2192 that has a plurality of teeth 2194 defined thereon.

The guide gear 972 of the gear assembly 2188 has a body 982 configured to be rotatably coupled to the base 2012. The body 982 of the gear 972 has a plurality of teeth 976 defined on an outer surface 980 thereof. A number of the teeth 2194 of the drive gear 2190 are interdigitated with a number of the teeth 976 of the guide gear 972 such that rotation of the drive gear 2190 causes rotation of the guide gear 972.

As in the embodiment of FIGS. 23-28, the upper sleeve 940 of the lift device 886 is movably coupled to the guide gear 972 such that rotation of the guide gear 972 causes rotation of the upper sleeve 940 relative to the lower sleeve 942. As described above, the rotation of the sleeve 940 results in the sleeve 940 translating upwardly or downwardly relative to the base 2012.

As shown in FIGS. 38-41, the food processor 2010 also includes a locking mechanism 2200 configured to inhibit movement of the bowl 2020 relative to the base 2012 and thereby maintain the cutting assembly in a particular cutting position. In the illustrative embodiment, the locking mechanism 2200 is embodied as a detent device 2202. As shown in FIGS. 39 and 40, the detent device 2202 includes a pin 2204 that extends downwardly from the bottom wall 2062 of the bowl 2020 and, as shown in FIG. 38, a plurality of notches 2206 that are defined in the upper surface 2056 of the base 2012. Each notch 2206 corresponds to a preset cutting position of the cutting assembly, and the convex lower end 2208 of the pin 2204 is configured to be received in each of the notches 2206 as the bowl 2020 is rotated about the axis 2022.

In use, a user may align the arm 2072 of the bowl 2020 with the opening 2080 of the base 2012. The bowl 2020 may be advanced downward such that the arm 2072 is received in the pocket 2086 and the lower wall 2064 of the bowl 2020 is advanced into contact with the rim surface 2054 of the base 2012. When the arm 2072 is positioned in the pocket 2086, the teeth 2076 of the arm 2072 are spaced apart from and not in contact with the teeth 2194 of the drive gear 2190. The user may grasp the handle 2068 and rotate the bowl 2020 in the direction indicated by arrow 2198 so that the arm 2072 is advanced into the track 2088. As the bowl 2020 is rotated, the teeth 2076 of the arm 2072 mesh with a number of the teeth 2194 of the drive gear 2190, thereby rotating the drive gear 2190. The rotation of the drive gear 2190 causes the guide gear 972 to rotate. As described above, rotation of the guide gear 972 causes downward movement of the upper sleeve 940. When the bowl 1220 is rotated to one of the preset positions, the convex lower end 2208 of the pin 2204 is received the notch 2206 corresponding to that position, and further movement of the bowl 2020 is inhibited.

A user may operate the controls 818 to energize the motor 814 to rotate the output shaft 850. Because the cutting assembly is secured the output shaft 850 via the drive stem, rotation of the output shaft 850 causes rotation of the cutting assembly. While the motor 814 is energized, the user may advance food items into the processing chamber 826 to be cut by the rotating cutting assembly.

If the user desires to change the cutting thickness during the cutting operation, the user may lift the bowl 2020 to remove the pin 2204 from that notch 2206 and then rotate the bowl 2020 to the next position. As the bowl 2020 is rotated, the teeth 2076 of the arm 2072 mesh with a number of the teeth 2194 of the drive gear 2190, thereby rotating the drive gear 2190. The rotation of the drive gear 2190 causes the guide gear 972 to rotate. As described above, rotation of the guide gear 972 causes movement of the upper sleeve 940 upwardly or downwardly and changes the thickness of food items being processed by the food processor 2010.

Figure 42:
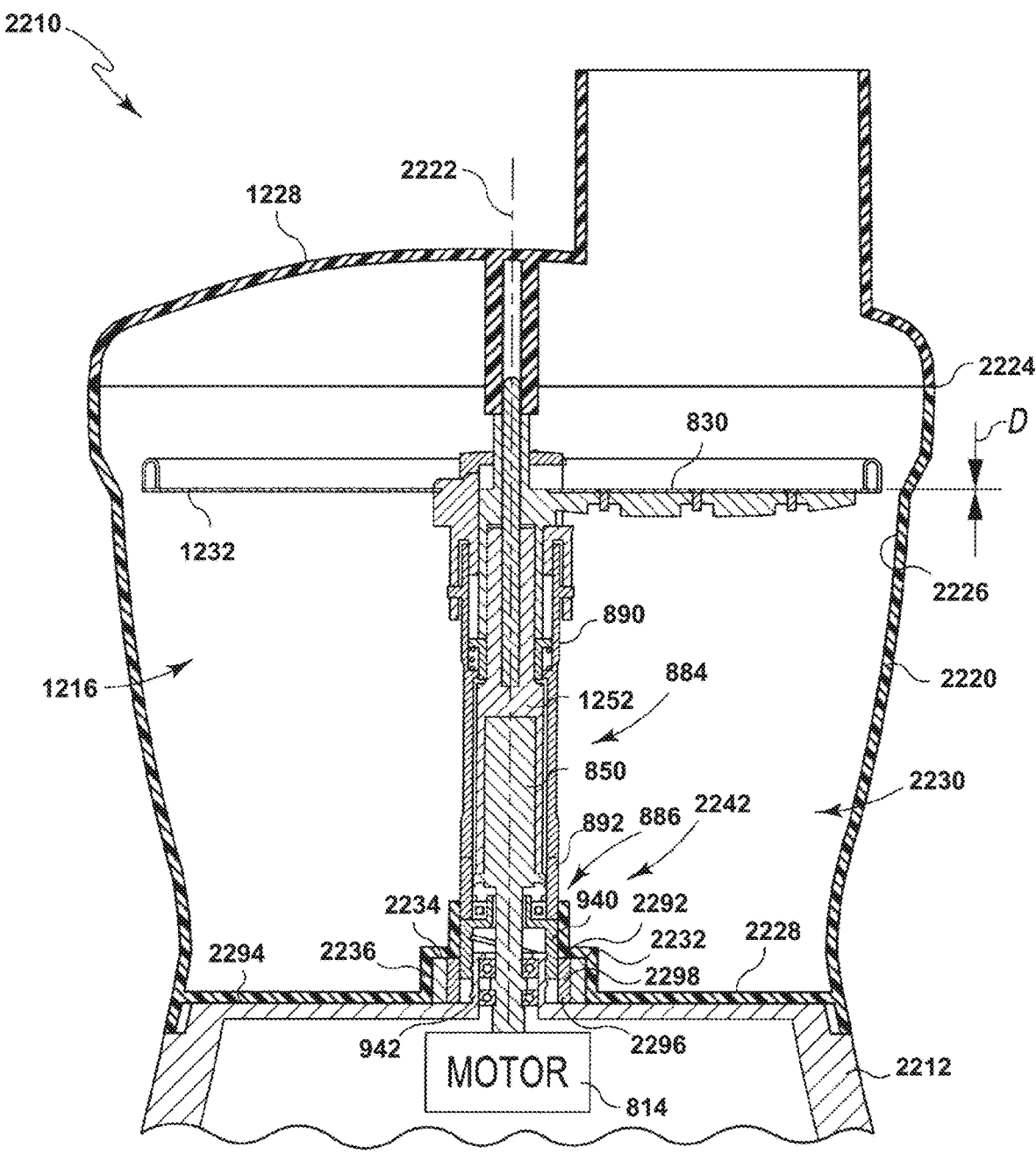
FIG. 42 is a cross-sectional elevation view of another embodiment of a food processor.

Referring now to FIG. 42, another embodiment of a food processor (hereinafter food processor 2210) is shown. The food processor 2210 includes the cutting assembly 1216 and the removable lid 1228, which were described above in reference to FIGS. 30 and 31. The food processor also includes another embodiment of a base (hereinafter base 2212) and a removable bowl (hereinafter bowl 2220). The food processor 2210 includes another embodiment of a thickness adjustment assembly (hereinafter adjustment assembly 2242) that is operable to change the thickness of cut food items produced by the food processor 2010. To operate the adjustment assembly 2242, a user rotates the bowl 2220 about an axis 2222 relative to the base 2212, as described in greater detail below.

The base 2212 houses a motor 814 and a control unit (not shown). Under the control of the control unit, the motor 814 drives the cutting assembly 1216 to cut food items such as cheeses, meats, fruits, and vegetables. The bowl 2220 is rotatably coupled to the base 812. The bowl 820 has an upper rim 2224 and an inner wall 2226 that extends downwardly from the upper rim 2224 to a bottom wall 2228 to define part of a processing chamber 2230 where food items may be processed by the cutting assembly 1216. The removable lid 1228 is secured to the rim 2224 of the bowl 2220. In that way, the removable lid 1228 and the bowl 2220 cooperate to define the processing chamber 2230.

As shown in FIG. 42, the bowl 2220 also includes an inner wall 2232 that defines a cavity 2234 below the processing chamber 2230. An external gear 2236 is secured to the inner wall 2232 of the bowl 2220. The external gear 2236 has a plurality of teeth (not shown) defined on an inner surface (not shown).

As described above, the cutting assembly 1216 of the food processor 2210 is driven by the motor 814 to cut food items. The motor 814 includes an output shaft 850 extending upwardly from the base 2212. The output shaft 850 is coupled to a drive stem 1252, which is in turn configured to be secured to the cutting assembly 1216. As described above in reference to FIGS. 30 and 31, the cutting assembly 1216 includes a cutting blade 830 and a rotating disk 1232 configured to slide vertically relative to the cutting blade 830.

The food processor 2210 also includes a thickness adjustment assembly 2242, which is operable to move the rotating disk 1232 relative to the cutting blade 830. The adjustment assembly 2242 includes a two-piece adaptor 884, a lift device 886 supporting the adaptor 884 and the rotating disk 1232, and a gear assembly 2288 attached to the base 2212. The lift device 886 is operable to move the adaptor 884 (and hence rotating disk 1232) upwardly and downwardly relative to the base 2212 of the food processor 2210, and the gear assembly 2288 is configured to operate the lift device 886.

The lift device 886 of the adjustment assembly 2242 includes a screw-type drive assembly that may be operated to adjust the position of the rotating disk of the cutting assembly relative to the base 812. The screw-type drive assembly includes an internally-threaded upper sleeve 940 that threadingly engages an externally-threaded lower sleeve 942 such that the upper sleeve 940 may be moved upwardly or downwardly relative to the base 2212 by rotating the upper sleeve 940.

As shown in FIG. 42, the adaptor 884 of the adjustment assembly 2242 includes an upper shaft 890 that is secured to the rotating disk 1232 of the cutting assembly 1216, and a lower shaft 892 that is rotatably coupled to the upper sleeve 940 of the lift device 886. In that way, the adaptor 884 (and hence the cutting assembly) is permitted to rotate relative to the upper sleeve 940. The lower shaft 892 is fixed axially relative to the upper sleeve 940 such that upward and downward movement of the upper sleeve 940 of the lift device 886 causes upward and downward movement of the lower shaft 892 of the adaptor 884. When the adaptor 884 is assembled and the cutting assembly 1216 is secured thereto, the upward and downward movement of the upper sleeve 940 is thereby translated to the cutting assembly 1216 such that the rotating disk 1232 slides relative to the cutting blade 830 to change the cutting thickness of the cutting assembly 416.

The gear assembly 2288 of the adjustment assembly 2242 includes a guide gear 2292 that is positioned on a top surface 2294 of the base 2212. The upper sleeve 940 of the lift device 886 is movably coupled to the guide gear 2292. Like the embodiment of FIGS. 23-28, rotation of the guide gear 2292 causes rotation of the upper sleeve 940 relative to the lower sleeve 942, which results in the sleeve 940 translating upwardly or downwardly relative to the base 2212.

The guide gear 2292 has a body 2296 rotatably coupled to the base 2212. The body 2296 has a plurality of teeth 2298 defined on an outer surface thereof. A number of the teeth 2298 of the guide gear 2292 are interdigitated with a number of the teeth of the bowl 2220 when the bowl 2220 is positioned on the base 2212 such that rotation of the bowl 2220 causes rotation of the guide gear 2292.

In use, a user may position the bowl 2220 over the output shaft 850 and advance the bowl 2220 into contact with the base 2212. The teeth of the bowl 2220 mesh with the teeth 2298 of the guide gear 2292. The user may grasp the bowl handle (not shown) and rotate the bowl 2220 about the axis 2222. As the bowl 2220 is rotated, the guide gear 2292 is rotated. As described above, rotation of the guide gear 2292 causes downward movement of the upper sleeve 940 and hence movement of the rotating disk 1232 relative to the cutting blade 830.

A user may operate the controls 818 to energize the motor 814 to rotate the output shaft 850. Because the cutting assembly 1216 is secured on the output shaft 850 via the drive stem 1252, rotation of the output shaft 850 causes rotation of the cutting assembly. While the motor 814 is energized, the user may advance food items into the processing chamber 826 to be cut by the rotating cutting assembly 1216. While the cutting assembly 1216 is driven by the motor 814, the user may rotate the bowl 2220 to move the rotating disk 1232 relative to the cutting blade 30, thereby changing the cutting thickness of the cutting assembly 1216.

It should be appreciated that the food processor 2210 or any of the food processors described above may include a locking mechanism configured to inhibit movement of the bowl relative to the base and thereby maintain the cutting assembly at a particular cutting position. It should also be appreciated that the gear assembly may include other gear arrangements to translate the rotation of the bowl into movement of the rotating disk or the cutting blade to adjust the cutting thickness of the cutting assembly.

Additionally, as described above, the adjustment assemblies may include electromechanical components such that the user may adjust the cutting thickness at the touch of a button while the cutting assembly is driven by the motor. It should therefore be appreciated that any of the embodiments described above in which the user manually adjusts the cutting thickness of the cutting assembly (e.g., the embodiments of FIGS. 23-28 and 30-42) may be modified to include electronic means such as, for example, an electronic motor or other electromechanical device, that change the cutting thickness of the cutting assembly in response to the user pressing a button or interacting with another control. In such embodiments, a motor may provide a force which acts on the adjustment assemblies described above to change the cutting thickness. As described above, it should be appreciated that the addition of such electronic components may require additional controls or buttons, such as, for example, a keypad, to control the operation of the additional electronic components.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A food processor comprising:
   a base having a motor positioned therein;
   a bowl removably coupled to the base;
   a lid removably coupled to the bowl so as to define a processing chamber, the lid having a feed tube that opens into the bowl;
   a cutting assembly positioned in the processing chamber and driven by the motor to cut food items advanced through the feed tube, the cutting assembly including a rotating disk and a blade having a cutting edge that is spaced an adjustable vertical distance from an upper surface of the rotating disk, the cutting edge being positionable between a plurality of user-selected cutting positions relative to the upper surface of the rotating disk to adjust the vertical distance to produce cut food items of varying thicknesses corresponding to vertical distances; and
   an adjustment assembly comprising (i) a gear assembly positioned in the base, wherein the gear assembly is configured to move the cutting edge between the plurality of cutting positions to adjust the vertical distance while the cutting assembly is driven by the motor, and (ii) a user-operated control device configured to operate the gear assembly to move the cutting assembly between the plurality of cutting positions to adjust the vertical distance, and the thickness of cut food items.

2. The food processor of claim 1, wherein:
the user-operated control device comprises a thumbwheel.

3. The food processor of claim 2, wherein:
the adjustment assembly includes a sleeve rotatively coupled to the base; and
wherein movement of the thumbwheel operates the gear assembly and rotates the sleeve.

4. The food processor of claim 3, wherein:
rotation of the sleeve in a first direction causes upward movement of the upper surface of the rotating disk relative to the cutting edge, and rotation of the sleeve in a second direction causes downward movement of the upper surface of the rotating disk relative to the cutting edge.

5. The food processor of claim 4, wherein:
the gear assembly comprises:
(i) a first gear including a first plurality of teeth, the first gear being moveably coupled to the sleeve such that rotation of the first gear causes rotation of the sleeve, and
(ii) a second gear including a second plurality of teeth interdigitated with the first plurality of teeth such that rotation of the second gear causes rotation of the first gear.

6. The food processor of claim 5, wherein:
the first gear is a worm gear.

7. The food processor of claim 5, wherein:
the user-operated control device includes a grip formed on the second gear, the grip being operable by a user to rotate the second gear.

8. The food processor of claim 5, wherein:
the user-operated control device includes a ring having a third plurality of teeth defined on an inner surface, the third plurality of teeth being interdigitated with a number of the second plurality of teeth such that rotation of the ring causes rotation of the second gear.

9. The food processor of claim 8, wherein:

the ring has a grip formed thereon operable by a user to rotate the ring;

the bowl includes a lower wall and the ring is rotatively coupled to the lower wall of the bowl.

10. The food processor of claim 1, wherein:

the user-operated control device includes a lever extending outwardly from the base and movable relative to the base, the lever being coupled to the gear assembly such that movement of the lever relative to the base causes the gear assembly to rotate the sleeve.

11. The food processor of claim 1, wherein:

the user-operated control device includes a shaft extending outwardly from the base and a control knob coupled to the shaft, wherein rotation of the control knob causes the cutting edge to move between the plurality of user-selected cutting positions to adjust the vertical distance.

12. A food processor comprising:

a base having a motor positioned therein;

a removable bowl coupled to the base;

a removable lid coupled to the bowl so as to define a processing chamber having an upper compartment and a lower compartment, the lid having a feed tube that opens into the bowl;

a cutting blade positioned in the bowl and driven by the motor to cut food items advanced through the feed tube;

a rotating disk having an upper surface, wherein at least a portion of the upper surface is movable relative to the cutting blade to adjust the vertical distance therebetween, and wherein the upper surface and the cutting blade are configured such that food items inserted through the feed tube are urged into contact with the upper surface while being cut by the cutting blade, and wherein the thickness of the pieces of food items being cut is determined by the vertical distance between the upper surface and cutting blade, and wherein the rotating disk is disposed between the upper compartment and a lower compartment of the processing chamber; and an adjustment assembly operable to move at least the movable portion of the upper surface of the rotating disk relative to the cutting blade to adjust the vertical distance therebetween and the thickness of pieces of food being cut, the adjustment assembly including a user-operated control device that is movable by a user to adjust the vertical distance, and wherein the adjustment assembly is configured to retain at least the movable portion of the upper surface of the rotating disk at any one of a plurality of non-equal positions relative to the cutting blade, and to prevent upward and downward movement of at least the movable portion of the rotating disk at any one of the plurality of non-equal positions relative to the cutting blade while the food processor is being used to cut food items.

13. The food processor of claim 12, including:

a ramp positioned below the cutting blade to guide food items from the upper compartment into the lower compartment.

14. The food processor of claim 13, wherein:

the upper surface of the rotating disk is upwardly and downwardly movable relative to the cutting blade.

15. The food processor of claim 12, wherein:

the user-operated control device is positioned above the rotating disk.

16. The food processor of claim 12, wherein:

the user-operated control device is positioned on the base.

17. The food processor of claim 16, wherein:

the user-operated control device comprises an external lever that is movable to adjust the distance.

18. The food processor of claim 12, wherein:

the user-operated control device includes (i) an internally-threaded control knob coupled to the blade and (ii) an externally threaded sleeve coupled to the rotating disk and positioned in the control knob, and wherein rotation of the control knob in a first direction causes upward movement of the rotating disk, and rotation of the control knob in a second direction causes downward movement of the rotating disk.

19. The food processor of claim 12, wherein:

the user-operated control device comprises a user-operated pin that is movable between (i) a first position in which the rotating disk is prevented from moving upwardly and downwardly relative to the cutting blade, and (ii) a second position in which the rotating disk is permitted to move upwardly and downwardly relative to the cutting blade, and wherein the rotating disk includes a sleeve extending downwardly from a lower surface thereof, the sidewall of the sleeve including a first plurality of teeth, and wherein an outer surface of the pin has a second plurality of teeth extending therefrom and wherein a number of the first plurality of teeth are engaged with the second plurality of teeth when the user-operated pin is in the first position.

20. The food processor of claim 12, wherein:

the adjustment assembly is positioned in the base, the adjustment assembly including a screw-type drive assembly comprising an externally-threaded first sleeve and an internally threaded second sleeve positioned over the first sleeve;

the rotating member comprises a rotating disk that is supported by the second sleeve;

rotation of the second sleeve in a first direction causes upward movement of the second sleeve and the rotating disk, and rotating of the second sleeve in a second direction causes downward movement of the second sleeve and the rotating disk;

the adjustment assembly further comprises a gear assembly positioned in the base and coupled to the second sleeve, the gear assembly being configured to rotate the second sleeve relative to the first sleeve, the gear assembly including first and second gears, the first gear having a first plurality of teeth engaging a second plurality of teeth of the second gear;

the user-operated control device includes a lever extending outwardly from the base and positionable between a plurality of adjustment positions relative to the base, the lever being coupled to the second gear such that movement of the lever between the plurality of adjustment positions causes rotation of the second sleeve relative to the first sleeve to move the cutting assembly between the plurality of cutting positions; and including:

a locking mechanism to inhibit movement of the lever.

21. The food processor of claim 12, wherein:

the adjustment assembly comprises a gear assembly comprising first and second gears having first and second pluralities of teeth, respectively, wherein the gear assembly is operated by the user-operated control device;

and wherein the user-operated control device is selected from a group consisting of (i) a control knob having a grip and a shaft extending inwardly from the control knob into the base, (ii) a grip formed on the second gear, (iii) a ring having a grip and a plurality of teeth defined on an inner surface of the ring that engage the second plurality of teeth, and (iv) a thumbwheel positioned in a slot defined in the base.

* * * * *